(12) United States Patent
Itoyama

(10) Patent No.: US 6,502,563 B2
(45) Date of Patent: Jan. 7, 2003

(54) DIESEL ENGINE CONTROL

(75) Inventor: Hiroyuki Itoyama, Yokohama (JP)

(73) Assignee: Nissan Motor Co., Ltd., Yokohama (JP)

(*) Notice: Subject to any disclaimer, the term of this patent is extended or adjusted under 35 U.S.C. 154(b) by 43 days.

(21) Appl. No.: 09/979,139

(22) PCT Filed: May 15, 2001

(86) PCT No.: PCT/JP01/04049
§ 371 (c)(1),
(2), (4) Date: Nov. 19, 2001

(87) PCT Pub. No.: WO01/88358
PCT Pub. Date: Nov. 22, 2001

(65) Prior Publication Data
US 2002/0170546 A1  Nov. 21, 2002

(30) Foreign Application Priority Data
May 18, 2000 (JP) .................................. 2000-146265

(51) Int. Cl.[7] .............................................. F02M 25/07
(52) U.S. Cl. .................................. 123/568.21; 701/108
(58) Field of Search ..................... 123/568.21; 60/605.2; 701/108

(56) References Cited

U.S. PATENT DOCUMENTS

| 6,032,656 | A | | 3/2000 | Itoyama et al. ........ | 123/568.21 |
| 6,227,182 | B1 | * | 5/2001 | Muraki et al. .......... | 123/568.21 |
| 6,230,697 | B1 | * | 5/2001 | Itoyama et al. ........ | 123/568.21 |
| 6,289,883 | B1 | * | 9/2001 | Wakutani et al. ...... | 123/568.21 |

FOREIGN PATENT DOCUMENTS

| JP | 61-212659 | 9/1986 |
| JP | 8-86251 | 4/1996 |
| JP | 8-128361 | 5/1996 |
| JP | 10-288071 | 10/1998 |

OTHER PUBLICATIONS

Ito et al., "Injection Rate Shaping Technology with Common Rail Fuel System," EDC–U2, Lecture Papers of the 13th Symposium on the Internal Combustion Engine, pp. 73–77 (Jul. 9–11, 1996).

* cited by examiner

Primary Examiner—Paul J. Hirsch
(74) Attorney, Agent, or Firm—Foley & Lardner

(57) ABSTRACT

In a diesel engine provided with an exhaust gas recirculation valve (6), a target exhaust gas recirculation amount determined based on the engine running condition is compared with a maximum recirculation amount of the valve (6) (S28). When the target exhaust gas recirculation amount exceeds the maximum recirculation amount, the target exhaust gas recirculation amount is limited to the maximum flowrate (S28). By maintaining the opening of the exhaust gas recirculation valve (6) at an opening corresponding to the maximum recirculation amount for a predetermined time even after the target exhaust recirculation amount has fallen below the maximum flowrate (S26), the exhaust gas recirculation amount is made to promptly follow the target amount.

13 Claims, 56 Drawing Sheets

DIESEL ENGINE CONTROL

This invention relates control of a diesel engine provided with an exhaust gas recirculation device.

BACKGROUND OF THE INVENTION

Tokkai Hei 8-128361 published by the Japanese Patent Office in 1996 discloses an exhaust gas recirculation (EGR) device which suppresses a combustion temperature of a diesel engine by recirculating part of the exhaust gas to the intake air. This EGR device varies an exhaust gas recirculation amount (EGR amount) according to the opening of an exhaust gas recirculation valve (EGR valve), and when the EGR valve is operated using an actuator, a delay occurs from when a command signal is input to the actuator to when the EGR valve starts operating. In this connection, in the aforesaid prior art, advance processing corresponding to this delay is applied to the command signal of the actuator to enhance the precision of EGR control.

SUMMARY OF THE INVENTION

EGR control has characteristics such that, for example, the EGR amount is increased during vehicle deceleration and the EGR amount is decreased during vehicle acceleration. When the diesel engine is running in the transient state, the EGR amount must be varied with good response so as to obtain an appropriate EGR amount according to these control characteristics. In the prior art, the response delay of the actuator is compensated by advance processing, but the time required for the exhaust gas to travel from the EGR valve to the cylinder of the engine was not compensated.

Further, according to the prior art device, the command value of the EGR amount is calculated by a control unit, but as no physical limit is set on the command value obtained, it is possible that a command value which exceeds the maximum EGR amount which can physically be reached by the EGR valve, or a command value below the minimum EGR amount which can physically be reached by the EGR valve will be set, and as a result the response of the EGR control will be impaired.

It is therefore an object of this invention to eliminate the delay of EGR control due to the time required for exhaust gas to flow from the EGR valve to the cylinder of the engine, and to improve the ability of the EGR amount to track the target value.

It is a further object of this invention to prevent the command value of the EGR amount from exceeding the physical limits of the EGR valve.

In order to achieve the above objects, this invention provides a control device for such an engine that comprises a combustion chamber, an intake passage which aspirates air into the combustion chamber, an exhaust passage which discharges exhaust gas from the combustion chamber, and an exhaust gas recirculation valve which recirculates part of the exhaust gas of the exhaust passage into the combustion chamber.

The control device comprises a sensor which detects a running condition of the engine and a microprocessor programmed to set a target exhaust gas recirculation amount based on the running condition, determine a maximum recirculation amount of the exhaust gas recirculation valve; compare the target exhaust gas recirculation amount with the maximum recirculation amount, limit the target exhaust gas recirculation amount to be equal to the maximum recirculation amount when the target exhaust gas recirculation amount exceeds the maximum recirculation amount, control the opening of the exhaust gas recirculation valve based on the target exhaust gas recirculation amount, and maintain the opening of the exhaust gas recirculation valve at an opening corresponding to the maximum recirculation amount for a predetermined time after the target exhaust gas recirculation amount has fallen below the maximum recirculation amount.

This invention also provides a control device comprising a mechanism for detecting which a running condition of the engine, a mechanism for setting a target exhaust gas recirculation amount based on the running condition, a mechanism for determining a maximum recirculation amount of the exhaust gas recirculation valve, a mechanism for comparing the target exhaust gas recirculation amount with the maximum recirculation amount, a mechanism for limiting the target exhaust gas recirculation amount to be equal to the maximum recirculation amount when the target exhaust gas recirculation amount exceeds the maximum recirculation amount, a mechanism for controlling the opening of the exhaust gas recirculation valve based on the target exhaust gas recirculation amount, and a mechanism for maintaining the opening of the exhaust gas recirculation valve at an opening corresponding to the maximum recirculation amount for a predetermined time after the target exhaust gas recirculation amount has fallen below the maximum recirculation amount.

This invention also provides a control method for the engine comprising, setting a target exhaust gas recirculation amount based on the running condition, determining a maximum recirculation amount of the exhaust gas recirculation valve, comparing the target exhaust gas recirculation amount with the maximm recirculation amount, limiting the target exhaust gas recirculation amount to be equal to the maximum recirculation amount when the target exhaust gas recirculation amount exceeds the maximum recirculation amount, controlling the opening of the exhaust gas recirculation valve based on the target exhaust gas recirculation amount, and maintaining the opening of the exhaust gas recirculation valve at an opening corresponding to the maximum recirculation amount for a predetermined time after the target exhaust gas recirculation amount has fallen below the maximum recirculation amount.

The details as well as other features and advantages of this invention are set forth in the remainder of the specification and are shown in the accompanying drawings.

DESCRIPTION OF THE PREFERRED EMBODIMENTS

Figure 1:
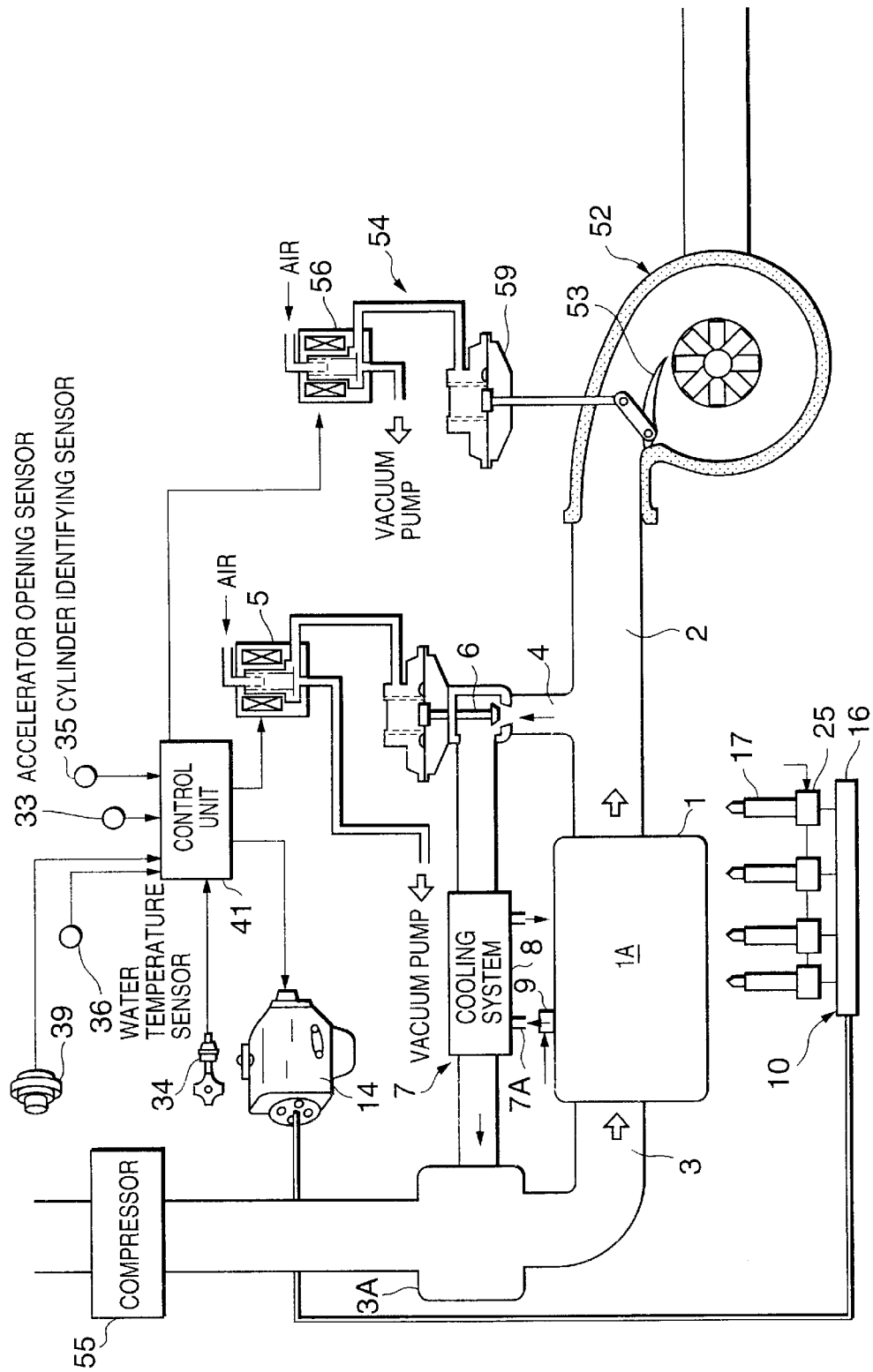
FIG. 1 is a schematic diagram of a control device for a diesel engine according to this invention.

Referring to FIG. 1 of the drawings, a diesel engine 1 comprises an intake passage 3 and exhaust passage 3. The diesel engine 1 is a multi-cylinder diesel engine so constructed that the pattern of heat release is single stage combustion due to performing low temperature pre-mixture combustion. Such a diesel engine is disclosed by Tokkai Hei 8-86251 published by the Japanese Patent Office in 1999. Intake air of the intake air passage 3 is supplied to each cylinder of the diesel engine 1 via a collector 3A. A compressor 55 of a variable capacity turbocharger 50 is installed in the intake passage 3 upstream of the collector 3A.

A swirl control valve is provided in an intake port leading from the intake passage 3 to each cylinder. When the diesel engine 1 is running at low rotation speed on low load, the swirl control valve closes part of the passage and sets up a swirl in the flow of air flowing into the combustion chamber 1A of the diesel engine 1.

The combustion chamber 1A comprises a large diameter toroidal combustion chamber. This is a combustion chamber wherein a cylindrical cavity of the same diameter is formed on a piston from a cap surface to a base. A conical part is formed at the base of the cavity. As a result, resistance to the swirl flowing in from the outside of the cavity is reduced, and mixing of air and fuel is promoted. Also, due to the shape of the cavity, the swirl diffuses from the center of the cavity to the outside as the piston descends.

The diesel engine 1 comprises a common rail type fuel injection mechanism 10.

Figure 2:
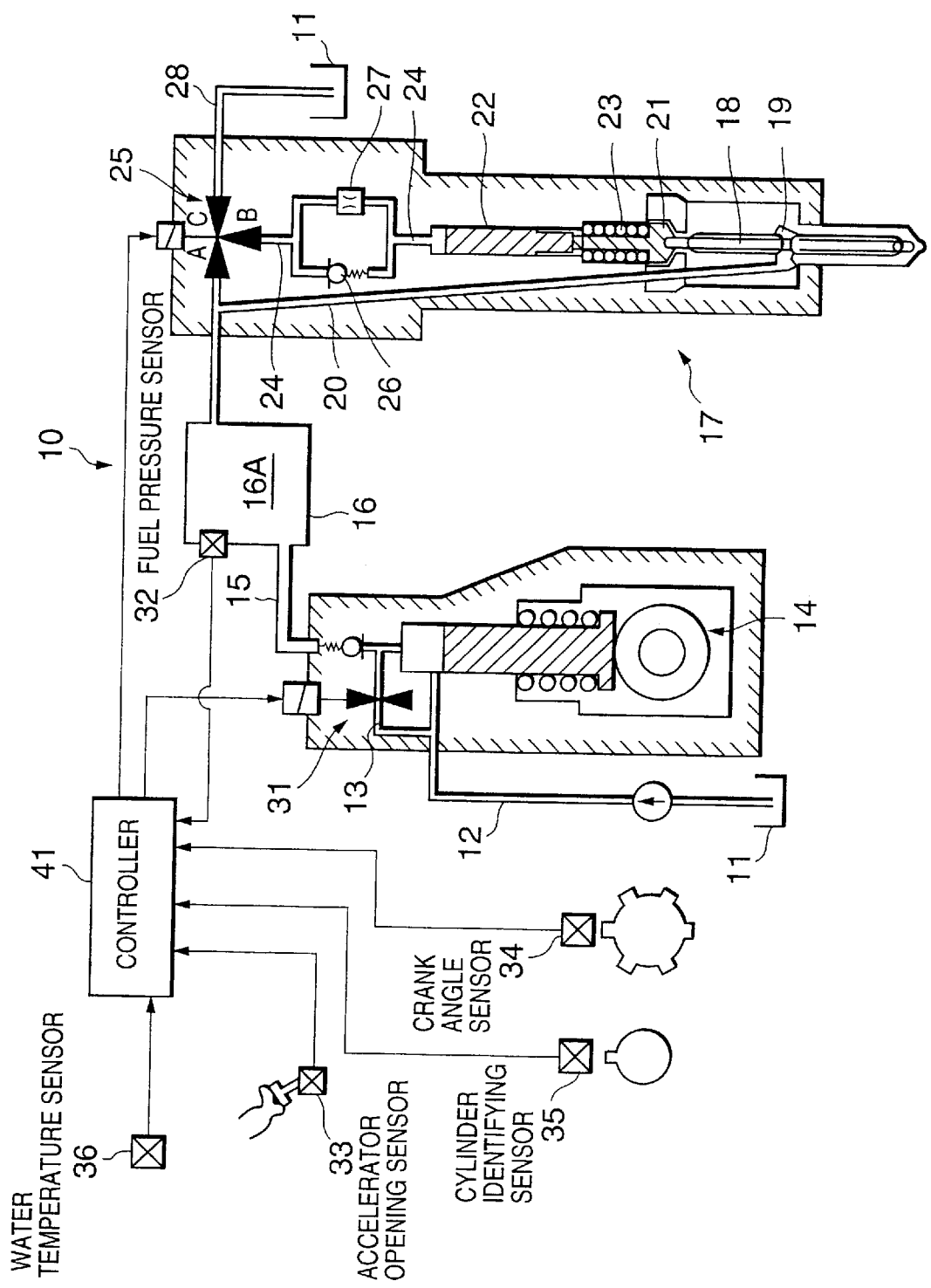
FIG. 2 is a schematic diagram of a common rail fuel injection mechanism with which the diesel engine is provided.

Referring to FIG. 2, a fuel injection mechanism 10 comprises a fuel tank 11, fuel supply passage 12, supply pump 14, pressure accumulating chamber 16A formed in a common rail 16, and a nozzle 17 which is provided for every cylinder. After the fuel supplied from the supply pump 14 is stored in a pressure accumulator 16A via a high pressure fuel passage 15, it is distributed to each of the nozzles 17.

The nozzle 17 comprises a needle valve 18, nozzle chamber 19, fuel passage 20 to the nozzle chamber 19, retainer 21, hydraulic piston 22, return spring 23, fuel passage 24 which leads high pressure fuel to the hydraulic piston 22, and three-way solenoid valve 25 interposed in the fuel passage 24. A check valve 26 and an orifice 27 are also provided in parallel in the fuel passage 24. The return spring 23 pushes the needle valve 18 in the closing direction of the lower part of the figure via the retainer 21. The hydraulic piston 22 comes in contact with the upper edge of the retainer 21.

The three-way valve 25 comprises a port A connected to the pressure accumulating chamber 16A, port B connected to the fuel passage 24 and port C connected to a drain 28. When the three-way valve 25 is OFF, ports A and B are connected and ports B and C are shut off. As a result, the fuel passages 20 and 24 are connected, and high pressure fuel is led to both the upper part of the hydraulic piston 22 and the nozzle chamber 19 from the pressure accumulating chamber 16A. As the pressure-receiving surface area of the hydraulic piston 22 is larger than the pressure-receiving surface area of the needle valve 18, in this state, the needle valve 18 sits in the valve seat, and the nozzle 17 is thereby closed.

In the state where the three-way valve 25 is ON, the ports A and B are shut off, and the ports B and C are connected. Consequently, the fuel pressure of the fuel passage 24 which pushes the hydraulic piston 22 downward is released to the fuel tank 11 via the drain 28, the needle valve 18 lifts due to the fuel pressure of the nozzle chamber 19 which acts on the needle valve 18 in an upward direction, and the fuel of the nozzle chamber 19 is injected from the hole at the end of the nozzle 17. If the three-way valve 25 is returned to the OFF state, the fuel pressure of the pressure accumulating chamber 16A again acts downward on the hydraulic piston 22, the needle valve 18 sits in the valve seat, and fuel injection is terminated.

That is, fuel injection start timing is adjusted by the change-over timing from OFF to ON of the three-way valve 25, and fuel injection amount is adjusted by the duration of the ON state. Therefore, if the pressure of the pressure accumulating chamber 16A is the same, the fuel injection amount increases the longer the ON time of the three-way valve 25.

Further, to adjust the pressure of the pressure accumulating chamber 16A, the fuel injection mechanism 10 comprises a return passage 13 which returns the surplus fuel discharged by the supply pump 14 to the fuel supply passage 12. The return passage 13 is provided with a pressure regulating valve 31. The pressure regulating valve 31 opens and closes the return passage 13, and adjusts the pressure of the pressure accumulating chamber 16A by varying the fuel injection amount to the pressure accumulating chamber 16A.

The fuel pressure of the pressure accumulating chamber 16A is equal to the fuel injection pressure of the nozzle 17, and the fuel injection rate is higher the higher the fuel pressure of the pressure accumulating chamber 16. The three-way valve 25 and the pressure regulating valve 31 function according to the input signal from a control unit 41.

The above construction of the fuel injection mechanism 10 is disclosed and known from pp. 73–77, Lecture Papers of the 13th Symposium on the Internal Combustion Engine.

Now, referring again to FIG. 1, after the exhaust gas in the exhaust passage 2 drives an exhaust gas turbine 52 of the variable capacity turbocharger 50, it is discharged into the atmosphere. The variable capacity turbocharger 50 comprises the exhaust gas turbine 52 and the compressor 55 which compresses air by the rotation of the exhaust gas turbine 52. The intake passage 3 supplies turbocharged air by the compressor 55 to the diesel engine 1. A variable nozzle 53 driven by a pressure actuator 54 is provided at an inlet to the exhaust gas turbine 52.

The pressure actuator 54 comprises a diaphragm actuator 59 which drives the variable nozzle 53 according to a signal pressure, and a pressure control valve 56 which generates the signal pressure according to a duty signal input from the control unit 41. The control unit 41 generates the duty signal so that an opening of the variable nozzle 53 is equal to a target opening Rvnt. Based on the target opening Rvnt, the control unit 41 controls the variable nozzle 53 to reduce the nozzle opening when the rotation speed of the diesel engine 1 is low. As a result, the flow velocity of exhaust gas introduced to the exhaust gas turbine 52 is increased so that a predetermined supercharging pressure is attained. On the other hand, the control unit 41 controls the variable nozzle 53 to fully open, when the rotation speed of the diesel engine 1 is high, in order to introduce exhaust gas into the exhaust gas turbine 52 without resistance.

When the air-fuel mixture is burnt in the diesel engine 1, noxious nitrogen oxides (NOx) are formed. The NOx amount largely depends on the combustion temperature, and the generation amount of NOx can be suppressed by making the combustion temperature low. This diesel engine 1 reduces the oxygen concentration in the combustion chamber 1A by exhaust recirculation (EGR), and thereby realizes low-temperature combustion. For this purpose, the diesel engine 1 comprises an exhaust gas recirculation (EGR) passage 4 which connects the exhaust passage 2 upstream of the exhaust gas turbine 52 and a collector 3A of the intake passage 3. The EGR passage 4 is provided with a diaphragm type exhaust gas recirculation (EGR) valve 6 which responds to a control negative pressure provided from a negative pressure control valve 5 and a cooling system 7.

The negative pressure control valve 5 generates a negative pressure in response to a duty signal input from the controller 41, and thereby varies the rate of exhaust gas recirculation (EGR rate) via the EGR valve 6. For example, in the low rotation speed, low load range of the diesel engine 1, the EGR rate is a maximum 100 percent, and as the rotation speed and load of the diesel engine 1 increase, the EGR rate is decreased. On high load, since the exhaust gas temperature is high, intake air temperature will rise if a large amount of EGR is performed. If the intake air temperature rises, NOx will no longer decrease, the ignition delay of injected fuel becomes shorter, and it becomes impossible to achieve pre-mixture combustion. Therefore, the EGR rate is made to decrease in stages as the rotation speed and load of the diesel engine 1 increase.

The cooling system 7 leads part of the engine cooling water to a water jacket 8 surrounding the EGR passage 4, and cools the recirculated exhaust gas in the EGR passage 4. A cooling water inlet 7A of the water jacket 8 is provided with a flow control valve 9 which adjusts the recirculating amount of cooling water according to a signal from the control unit 41.

The pressure regulating valve 31, the three-way valve 25, the negative pressure control valve 5, the pressure actuator 54 and the flow control valve 9 are respectively controlled by signals from the control unit 41. The control unit 41 comprises a microcomputer equipped with a central processing unit (CPU), random access memory (RAM), read-only memory (ROM) and input/output interface (I/O interface).

Signals corresponding to detection values are input to the control unit 41 from a pressure sensor 32 which detects a fuel pressure of the pressure accumulating chamber 16A, an accelerator opening sensor 33 which detects an opening Cl of a vehicle accelerator pedal, a crank angle sensor 34 which detects a rotation speed Ne and crank angle of the diesel engine 1, a cylinder identifying sensor 35 which identifies cylinders of the diesel engine 1, a water temperature sensor 36 which detects a cooling water temperature Tw of the diesel engine 1, and an air flow meter 39 which detects an intake air flowrate of the intake passage 3 upstream of the compressor 55.

Based on the rotation speed Ne of the diesel engine 1 and accelerator opening Cl, the control unit 41 calculates a target fuel injection amount of the nozzle 17 and target pressure of the pressure accumulating chamber 16A. The fuel pressure of the pressure accumulating chamber 16A is feedback controlled by opening and closing the pressure regulating valve 31 so that the actual pressure of the pressure accumulating chamber 16A detected by the pressure sensor 32 coincides with the target pressure.

The control unit 41 also controls an ON time of the three-way valve 25 according to the calculated target fuel injection amount, and a fuel injection start timing in response to the running conditions of the diesel engine 1 by the change-over timing to ON of the three-way valve 25. For example, when the diesel engine 1 is in a low rotation speed, low load state under a high EGR rate, the fuel injection start timing is delayed near top dead center (TDC) of the piston so that the ignition delay of injected fuel is long. Due to this delay, the combustion chamber 1A temperature at the time of ignition is lowered, and the generation of smoke due to the high EGR rate is suppressed by increasing the premixture combustion ratio. On the other hand, the injection start timing is advanced as the rotation speed and load of the diesel engine 1 increase. This is due to the following reason. Specifically, even if the ignition delay period is constant, the ignition delay crank angle obtained by converting the ignition delay period increases in proportion to the increase in engine speed. Therefore, in order to fire the injected fuel at a predetermined crank angle, the injection start timing needs to be advanced at high rotation speed.

The control unit 41 also controls the turbocharging pressure and EGR amount.

If the EGR amount is varied, as already stated, the turbocharging pressure will also vary. Conversely if the turbocharging pressure is varied, as the exhaust gas pressure varies, the EGR amount varies. Therefore, the turbocharging pressure and EGR amount cannot be controlled independently, and may cause an external control disturbance to each other.

If it is attempted to keep the turbocharging pressure constant when changing the EGR amount, the opening of the variable nozzle 53 of the turbocharger 50 must be readjusted. Also, if it is attempted to keep the EGR amount constant when changing the turbocharging pressure, the opening of the EGR valve 6 must be readjusted. In such a method, it is difficult to ensure control precision during a transient state of the engine 1.

A control unit 41 according to this invention calculates a target intake air amount tQac of an intake passage 3 according to vehicle running conditions, and sets a target opening Rvnt of a variable nozzle 53, which is an operating target value of a turbocharger 50, from the target intake air amount tQac, a real EGR amount Qec per cylinder in the position of an intake valve of the diesel engine 1 and an EGR rate Megrd of intake air through the intake valve of the diesel engine 1. Megrd is also referred to as a real EGR rate. A duty value Dtyvnt applied to a pressure control valve 56 is then determined using the routine shown in FIG. 15, and a corresponding command signal is output to the pressure control valve 56 so that the variable nozzle 53 attains the target opening Rvnt. In this way, the control unit 41 controls a turbocharging pressure of the turbocharger 50.

The control unit 41 also calculates a required EGR amount Mqec of the EGR valve 6 based on a target EGR rate Megr determined according to the running conditions of the vehicle. Considering the time required for the exhaust gas to travel from the EGR valve 6 to an intake valve of the diesel engine 1 via the collector 3A, a delay processing is applied to the required EGR amount Mqec to calculate an intermediate value Rqec that represents a required EGR amount per cylinder in the position of the intake valve. Further, the control unit 41 performs an advance processing of the intermediate value Rqec to compensate the response delay of the negative pressure control valve 5 and EGR valve 6 as in the prior art. A target EGR amount Tqec per cylinder is calculated in this way.

However, due to the physical limit of the negative pressure control valve 5 or EGR valve 6, it is possible that the target EGR amount Tqec cannot be reached even if a command signal corresponding to the target EGR amount Tqec is output to the negative pressure control valve 5.

In this connection, a control unit 41 performs the following processing (A)–(F), which are the essential features of this invention.

(A) The maximum value of the EGR amount which can physically be reached is set according to an EGR valve flow velocity Cqe as a physical upper limit Tqelmh. The EGR valve flow velocity Cqe is a flow velocity of the exhaust gas passing through the EGR valve 6.

(B) The minimum value of the EGR amount which can physically be reached is set as a physical lower limit Tqelml. The physical lower limit Tqelml is set for example to 0.

(C) An excess amount relative to the physical upper limit Tqelmh of the target EGR amount Tqec, or a deficiency amount relative to the physical lower limit Tqelml, is calculated as an excess/deficiency amount Dtqec for each output of the command signal. An added value Tqec1 is calculated by adding an excess/deficiency amount Dtqecn−1 calculated on the immediately preceding occasion the command signal was output, to the target EGR amount Tqec calculated on the present occasion the command signal is output.

(D) A limited target EGR amount Tqecf is calculated by applying the physical upper limit Tqelmh and physical lower limit Tqelml to the added value Tqec1, and a command signal corresponding to the limited target EGR amount Tqecf is output to the negative pressure control valve 5.

(E) A value obtained by subtracting the limited target EGR amount Tqecf from the added value Tqec1, is calculated as the excess/deficiency amount $Dtqec_{n-1}$ for outputting the signal on the next occasion.

The above control performed by the control unit 41 will be described referring to the flowcharts. Of all the routines shown in the flowcharts, independent routines are performed at intervals which are described separately below, and subroutines are performed at the execution intervals of the parent routines.

FIG. 3, FIG. 4 and FIGS. 8–14 are known from Tokkai Hei 10-288071 published by the Japanese Patent Office in 1998.

The routine for calculating common parameters used for control of turbocharging pressure and the EGR amount will first be described. The common parameters are a target fuel injection amount Qsol of a fuel injection device 10, the target EGR rate Megr of the EGR valve 6, a time constant equivalent value Kkin, the real EGR rate Megrd, a cylinder intake fresh air amount Qac, an intake fresh air flowrate Qas0 of the intake passage 3 and the real EGR amount Qec. The time constant equivalent value Kkin is a value representing an EGR control delay due to the collector 3A interposed between the EGR valve 6 and the intake valve of the diesel engine 1. The real EGR rate Megrd shows the EGR rate of the intake air which passes through the intake valve of the diesel engine 1. The real EGR rate Megrd varies with a first order delay relative to the target EGR rate Megr. The calculation of these parameters is performed independently of the turbocharging pressure control routine, and the EGR amount control routine.

Figure 3:
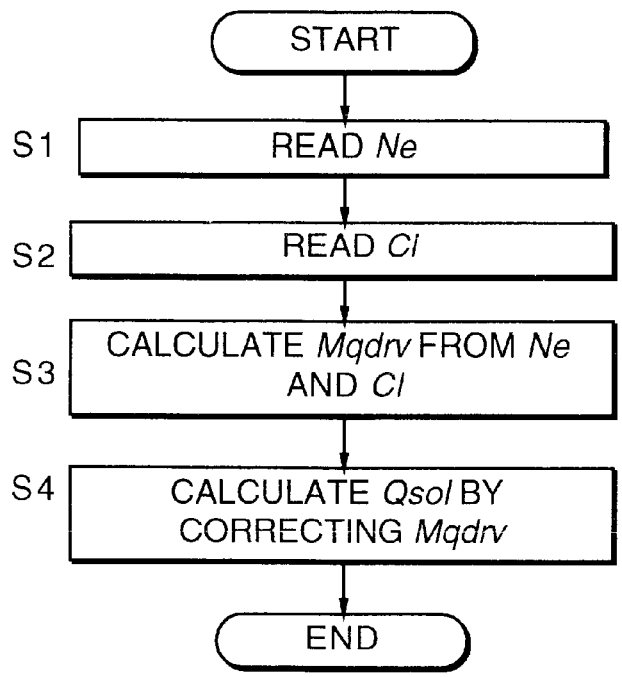
FIG. 3 is a flowchart describing a routine for calculating a target fuel injection amount Qsol performed by a controller according to this invention.

First, referring to FIG. 3, the routine for calculating the target fuel injection amount Qsol will be described. This routine is performed in synchronism with a REF signal output by the crank angle sensor 34 for each reference position of the combustion cycle of each cylinder. In the case of a four-stroke cycle engine, the REF signal is output every 180 degrees for a four cylinder engine, and every 120 degrees for a six cylinder engine.

First, in a step S1, the engine speed Ne is read, and in a step S2, the accelerator opening Cl is read.

Figure 4:
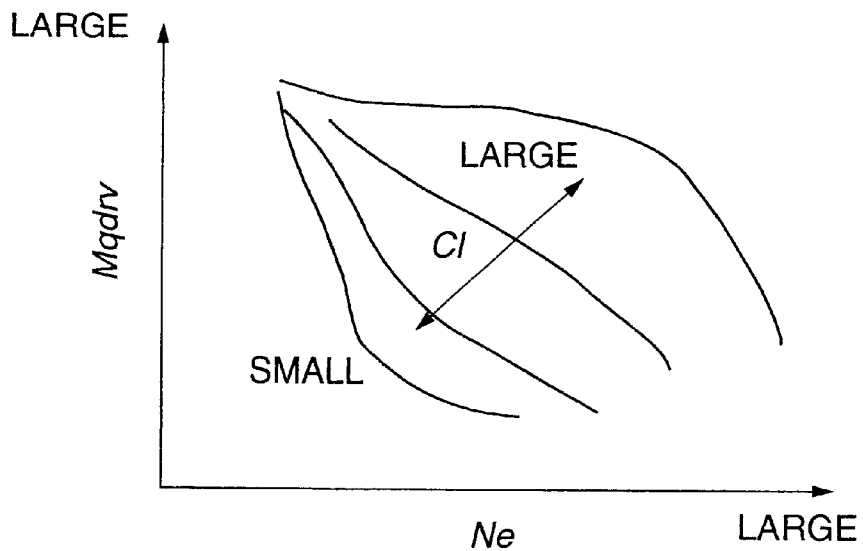
FIG. 4 is a diagram describing the contents of a basic fuel injection amount map stored by the controller.

In a step S3, a basic fuel injection amount Mqdrv is calculated by looking up a map shown in FIG. 4 based on the engine rotation speed Ne and the accelerator opening Cl. This map is stored beforehand in the memory of the control unit 41.

In a step S4, the target fuel injection amount Qsol is calculated by adding an increase correction based on an engine cooling water temperature Tw, etc., to the basic fuel injection amount Mqdrv.

Next, referring to FIG. 11, a routine for calculating the target EGR rate Megr will be described. This routine is also performed in synchronism with the REF signal.

The control unit 41 first reads the engine rotation speed Ne, the target fuel injection amount Qsol and the engine cooling water temperature Tw in a step S51.

Figure 12:
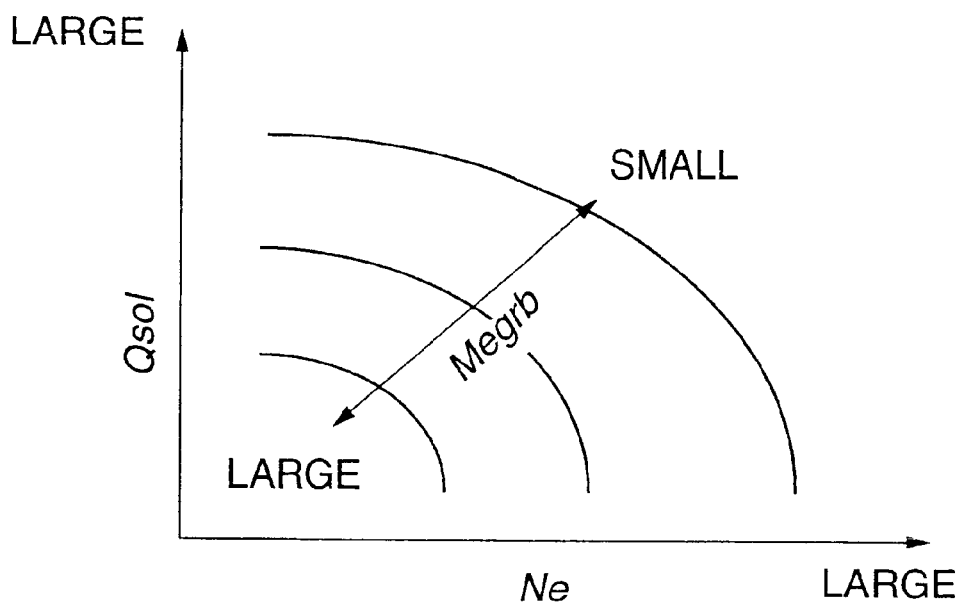
FIG. 12 is a diagram describing the contents of a map of a basic target EGR rate Megrb stored by the controller.

In a step S52, referring to a map shown in FIG. 12, the basic target EGR rate Megrb is calculated from the engine rotation speed Ne and the target fuel injection amount Qsol. This map is stored beforehand in the memory of the control unit 41. In this map, the basic target EGR rate Megrb is set larger in a region where the operating frequency of the engine is higher. This region corresponds to a region where both the rotation speed Ne and the load are small. In this map, the load is represented by the target fuel injection amount Qsol. When the engine output is high, smoke tends to be generated, so in such a region, the basic target EGR rate Megrb is set to have small values.

Figure 13:
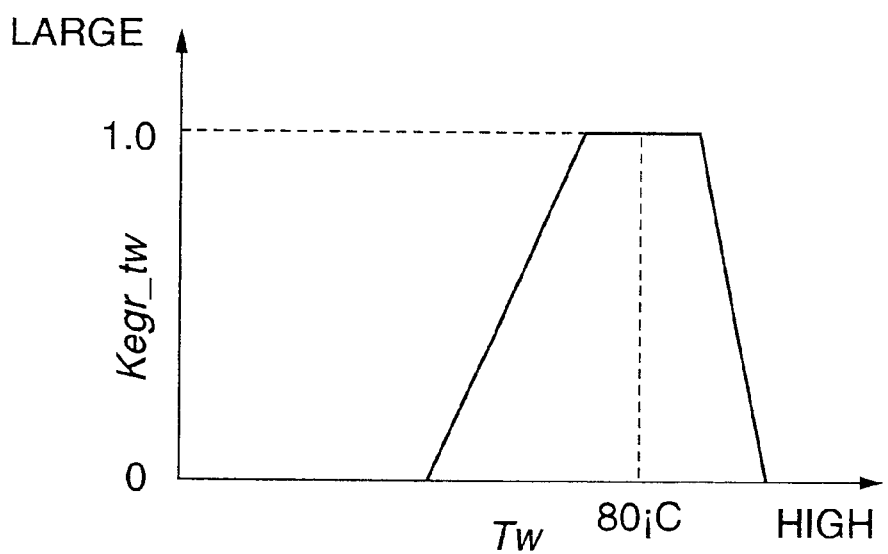
FIG. 13 is a diagram describing the contents of a map of a water temperature correction coefficient Kegr_tw stored by the controller.

In a step S53, referring to a map shown in FIG. 13, a water temperature correction coefficient Kegr_Tw of the basic target EGR rate Megrb is calculated from the cooling water temperature Tw. This map is also stored beforehand in the memory of the control unit 41.

In a step S54, the target EGR rate Megr is calculated by the following equation (1) from the basic target EGR rate Megrb and water temperature correction coefficient Kegr_Tw.

$$Megr = Megrb \cdot Kegr\_Tw \tag{1}$$

Figure 14:
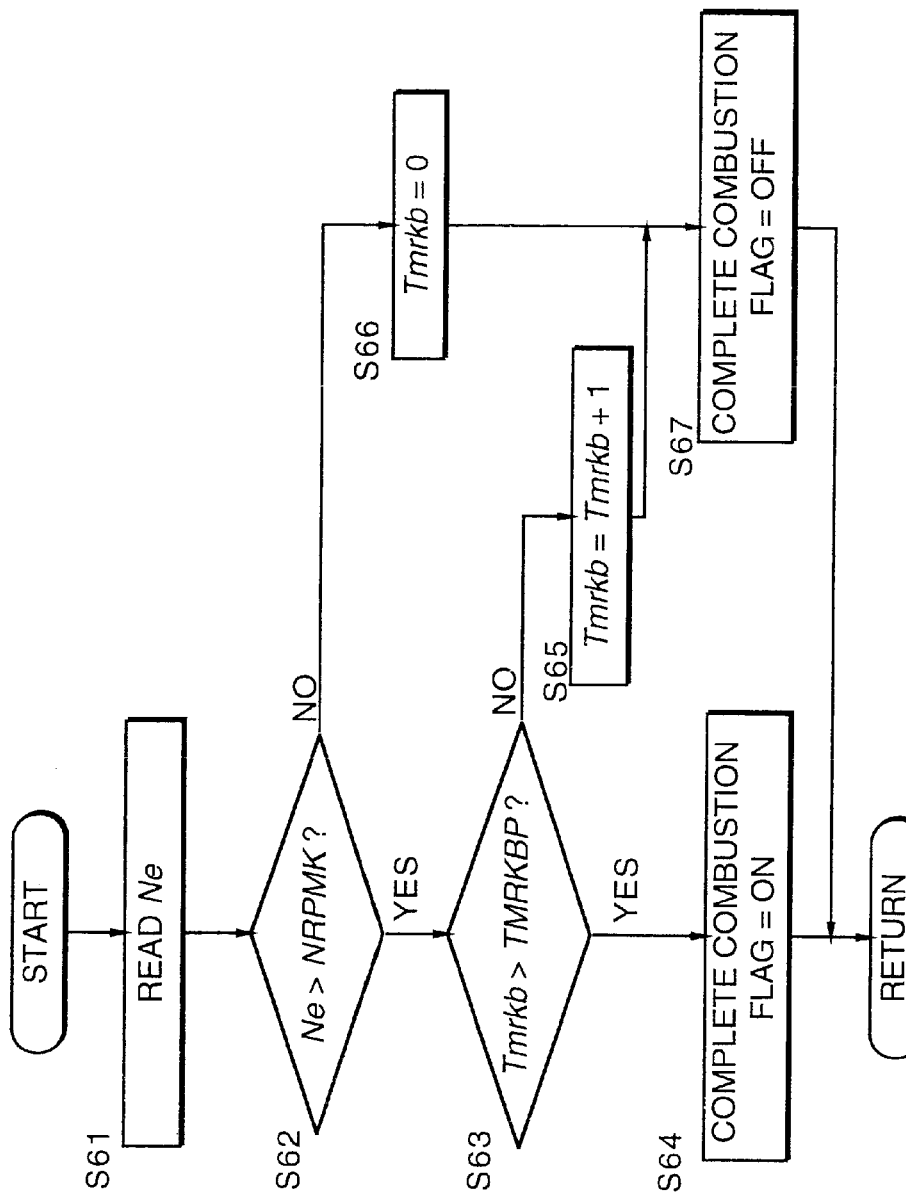
FIG. 14 is a flowchart describing a complete combustion determining routine performed by the controller.

In a step S55, a subroutine shown in FIG. 14 which determines whether or not the diesel engine 1 is in a complete combustion state, is performed.

Describing this subroutine, firstly in a step S61, the engine rotation speed Ne is read, and in a step S62, the engine rotation speed Ne and a complete combustion determining slice level NRPMK corresponding to a complete combustion rotation speed are compared.

The slice level NRPMK is set, for example, to 400 rpm. When the engine rotation speed Ne exceeds the slice level NRPMK, the routine proceeds to a step S63.

Here, a counter value Tmrkb is compared with a predetermined time TMRKBP, and when the counter value Tmrkb is larger than the predetermined time TMRKBP, a complete combustion flag is turned ON in a step S64, and the subroutine is terminated.

When the engine rotation speed Ne is below the slice level NRPMK in the step S62, the subroutine proceeds to a step S66. Here, the counter value Tmrkb is cleared to 0, the complete combustion flag is turned OFF in a next step S67, and the subroutine is terminated.

When the counter value Tmrkb is below the predetermined time TMRKBP in the step S63, the counter value Tmrkb is incremented in a step S65 and the subroutine is terminated.

In this subroutine, even if the engine rotation speed Ne exceeds the slice level NRPMK, the complete combustion flag does not turn ON immediately, and the complete combustion flag only changes to ON after this state has continued for the predetermined time TMRKBP.

Referring again to FIG. 11, after performing the subroutine of FIG. 14, the control unit 41 determines the complete combustion flag in a step S56. When the complete combustion flag is ON, the subroutine of FIG. 11 is terminated.

Figure 11:
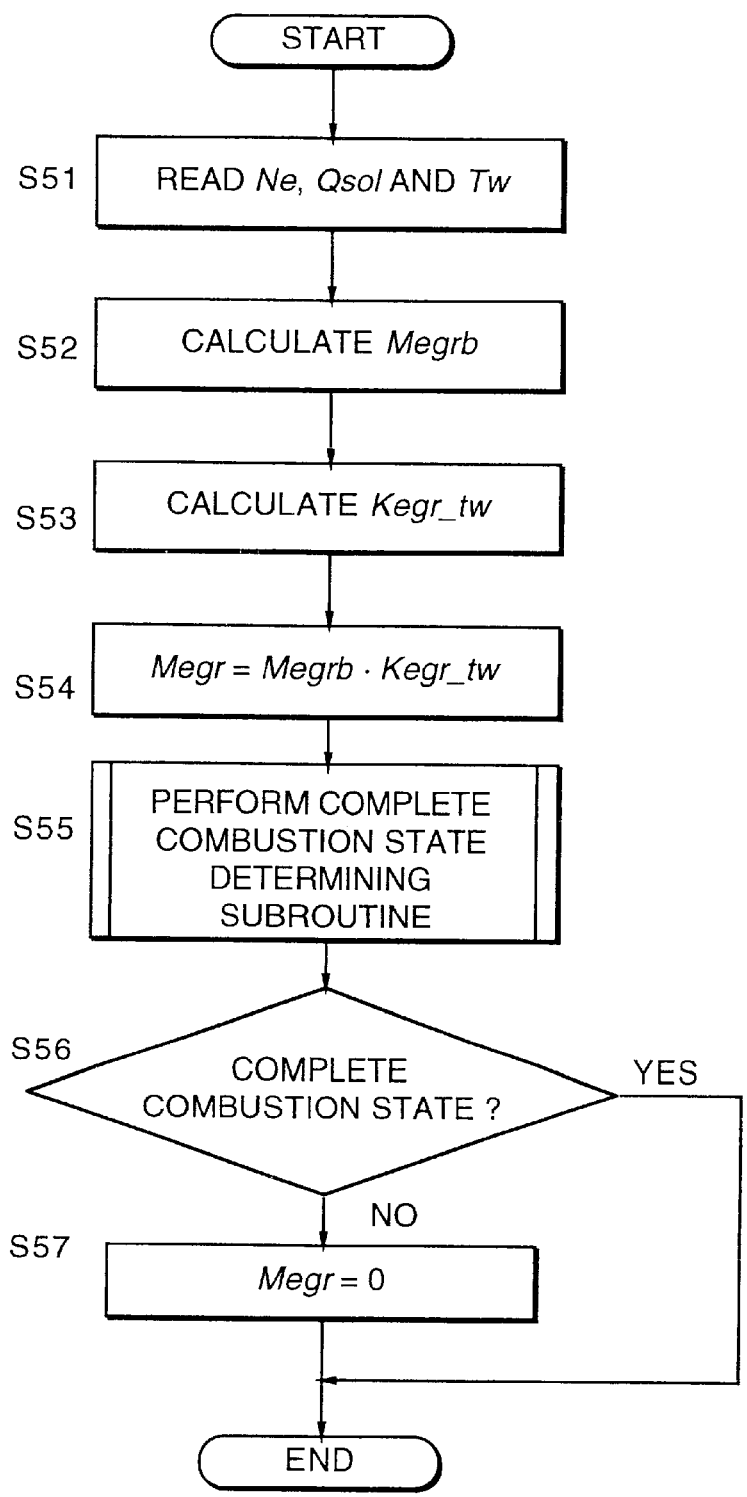
FIG. 11 is a flowchart describing a routine for calculating a target EGR rate Megr performed by the controller.

When the complete combustion flag is OFF, the target EGR rate Megr is reset to 0 in a step S57, and the subroutine of FIG. 11 is terminated.

Figure 17:
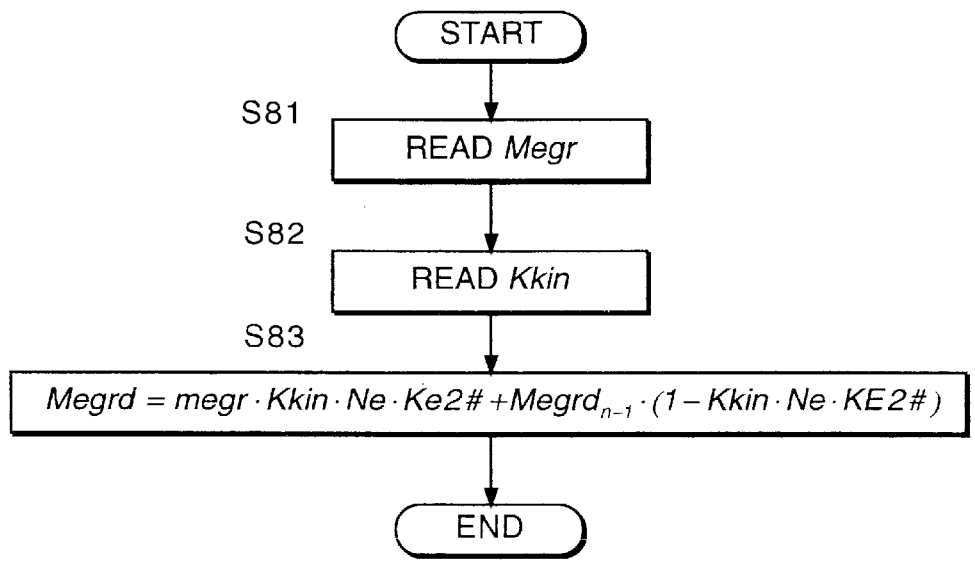
FIG. 17 is a flowchart describing a routine for calculating an EGR rate Megrd of an intake valve position performed by a control unit.
Figure 18:
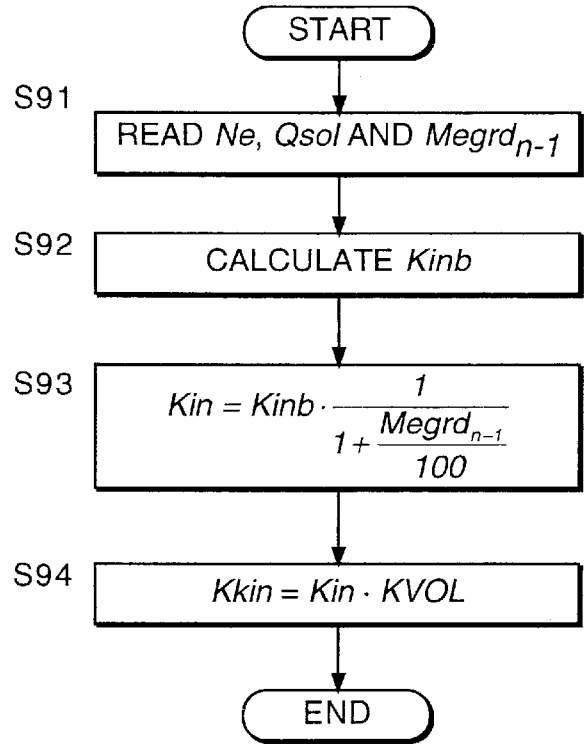
FIG. 18 is a flowchart describing a routine for calculating a time constant equivalent value Kkin performed by the control unit.

Referring to FIGS. 17 and 18, a routine for calculating the time constant equivalent value Kkin and the real EGR rate Megrd will now be described. The real EGR rate Megrd varies with a first order delay relative to the target EGR rate Megr. As the calculations of the time constant equivalent value Kkin and the real EGR rate Megrd are inter-related, they will be described together.

FIG. 18 shows a routine for calculating the time constant equivalent value Kkin. This routine is performed in synchronism with the REF signal.

The control unit 41 reads the engine rotation speed Ne, the target fuel injection amount Qsol and the immediately preceding value $Megrd_{n-1}$ (%) of the real EGR rate in a step S91. The immediately preceding value $Megrd_{n-1}$ is a value of Megrd calculated on the immediately preceding occasion when the routine was performed.

Figure 19:
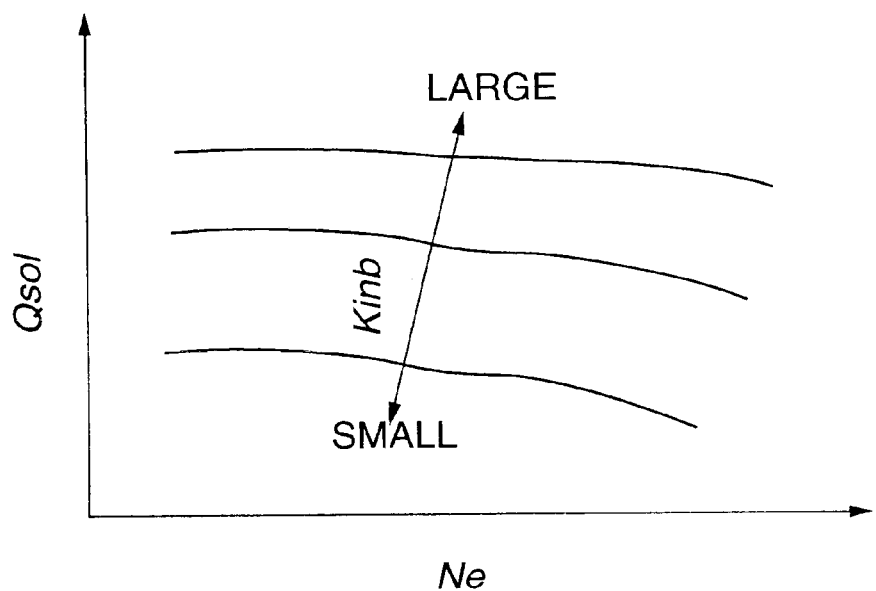
FIG. 19 is a flowchart describing the contents of a map of a volume efficiency equivalent basic value Kinb performed by the control unit.

In a step S92, a volume efficiency equivalent basic value Kinb is calculated from the engine rotation speed Ne and the target fuel injection amount Qsol by looking up a map shown in FIG. 19 previously stored in the memory of the control unit 41.

In a step S93, a volume efficiency equivalent value Kin is calculated from the following equation (2). When EGR is performed, the proportion of fresh air in the intake air falls, and the volume efficiency decreases. This reduction is reflected in the calculation of the volume efficiency equivalent value Kin via the volume efficiency equivalent basic value Kinb.

$$Kin = Kinb \cdot \frac{1}{1 + \frac{Megrd_{n-1}}{100}} \tag{2}$$

In a step S94, the time constant equivalent value Kkin corresponding to the capacity of the collector 3A is calculated by multiplying the volume efficiency equivalent value Kin by a constant KVOL.

The constant KVOL is expressed by the following equation (3):

$$KVOL = (VE/NC)/VM \tag{3}$$

where,
VE=displacement of diesel engine 1,
NC=number of cylinders of diesel engine 1, and
VM=capacity of passage from collector 3A to the intake valve.

FIG. 17 shows the routine for calculating the real EGR rate Megrd. This routine is performed at an interval of 10 milliseconds.

The control unit 41 first reads the target EGR rate Megr in a step S81.

In a following step S82, the time constant equivalent value Kkin is read. The routine of FIG. 18, which calculates the time constant equivalent value Kkin, is performed in synchronism with the REF signal, and this routine which calculates the real EGR rate Megrd is performed at an interval of 10 milliseconds. Therefore, the time constant equivalent value Kkin read here is the time constant equivalent value Kkin calculated by the routine of FIG. 18 immediately before the execution of the routine of FIG. 17. Likewise, the immediately preceding value $Megrd_{n-1}$ of the real EGR rate read by the routine of FIG. 18 is the real EGR rate calculated by the routine of FIG. 17 just before the execution of the routine of FIG. 18.

In a step S83, the real EGR rate Megrd is calculated from the following equation (4) using the target EGR rate Megr, immediately preceding value $Megrd_{n-1}$ and time constant equivalent value Kkin.

$$Megrd = megr \cdot Kkin \cdot Ne \cdot KE2\# + Megrd_{n-1} \cdot (1 - Kkin \cdot Ne \cdot KE2\#) \quad (4)$$

where, KE2#=constant.

In this equation, Ne* KE2# is a value to convert the EGR rate per intake stroke of each cylinder, to an EGR rate per unit time.

Next, referring to FIG. 8, a routine for calculating the cylinder intake fresh air amount Qac will be described. This routine is performed in synchronism with the REF signal. The cylinder intake fresh air amount Qac expresses the intake fresh air amount in the intake valve position of one cylinder of the diesel engine 1. The cylinder intake fresh air amount Qac is calculated from the fresh air flowrate Qas0 of the intake passage 3 detected by the air flow meter 39, but as the air flow meter 39 is situated upstream of the compressor 55, the cylinder intake fresh air amount Qac is calculated considering the time until the air which has passed through the air flow meter 39 is taken into the cylinder via the collector 3A.

First, in a step S31, the control unit 41 reads the engine rotation speed Ne and the fresh air flowrate Qas0 of the intake passage 3.

In a step S32, the intake fresh air flowrate Qas0 is converted into an intake fresh air amount Qac0 per cylinder by the following formula (5).

$$Qac0 = \frac{Qas0}{Ne} \cdot KCON\# \quad (5)$$

where, KCON#=constant.

The constant KCON# is a constant for converting the intake fresh air flowrate Qas0 of the intake passage 3 into the intake fresh air amount Qac0 per cylinder. In a four-cylinder engine, two cylinders perform air intake in each rotation, so the constant KCON# is 30. In a six-cylinder engine, three cylinders perform air intake in each rotation, so the constant KCON# is 20.

A considerable time is required until the air which has passed through the air flow meter 39 is actually taken into the cylinder. In order to correct for this time difference, the control unit 41 performs the processing of steps S33, S34.

In the step S33, considering the time required from the air flow meter 39 to the inlet of the collector 3A, a value $Qac0_{n-L}$ of Qac0 which was EGR flow velocity feedback correction coefficient the routine executed L times ago, is set as an intake fresh air amount $Qac_n$ per cylinder at the inlet of the collector 3A. The value of L is determined experimentally.

In the step S34, considering the time difference from the collector 3A to the intake valve of each cylinder of the diesel engine 1, the cylinder intake fresh air amount Qac is calculated by equation (6) of first order delay.

$$Qac = Qac_{n-1} \cdot (1 - Kkin) + Qac_n \cdot Kkin \quad (6)$$

where,

Kkin=time constant equivalent value, and $Qac_{n-1}$=Qac calculated on the immediately preceding occasion the routine was executed.

Figure 9:
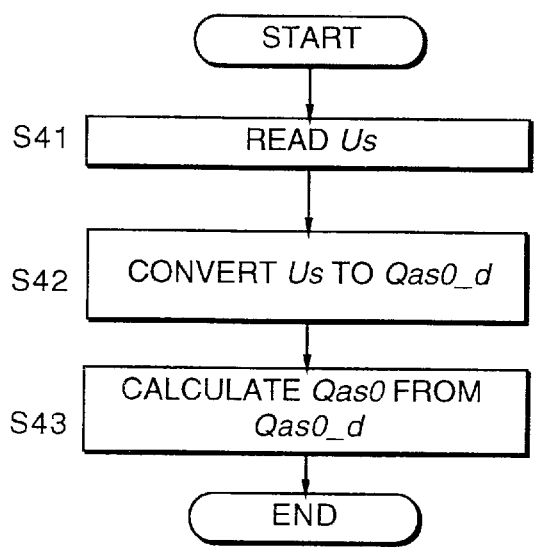
FIG. 9 is a flowchart describing a routine for calculating an intake fresh air flowrate Qas0 of the intake passage performed by the controller.
Figure 10:
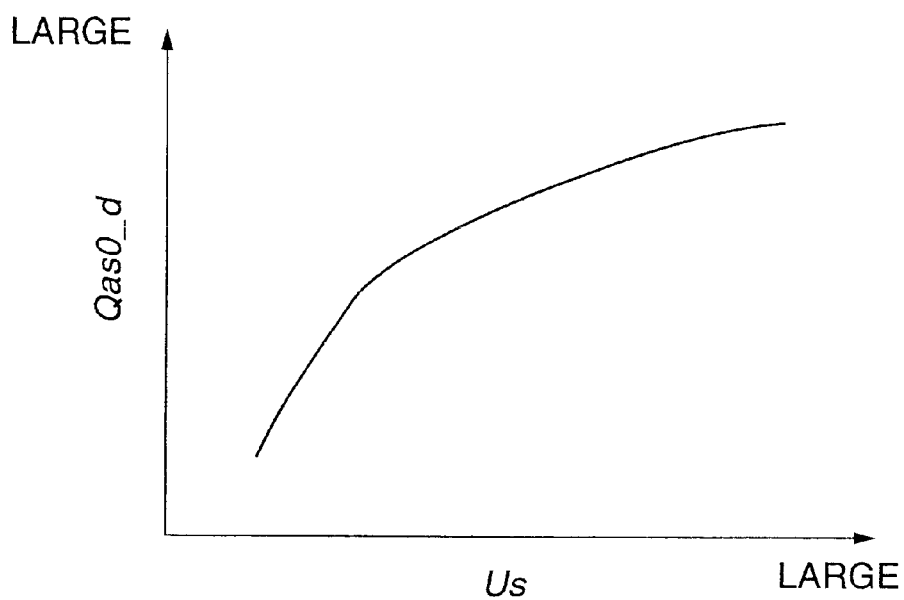
FIG. 10 is a diagram describing the contents of an intake air amount map stored by the controller.

The signal input into the control unit 41 from the air flow meter 39 is an analog voltage signal Us, and the control unit 41 converts the analog voltage signal Us into the intake air flowrate Qas0 of the intake passage 3 by the routine shown in FIG. 9. This routine is performed at an interval of 4 milliseconds. In a step S41, the control unit 41 reads the analog voltage signal Us, and in a step S42, converts this into a flowrate Qas0_d by looking up a map shown in FIG. 10. This map is stored beforehand in the memory of the control unit 41.

Further, in a step S43, weighted average processing is performed on the flowrate Qas0_d, and the value obtained is taken as the intake fresh air flowrate Qas0 of the intake passage 3.

Next, referring to FIG. 24, a routine for calculating the real EGR amount Qec will be described. The real EGR amount Qec corresponds to an EGR amount per cylinder in the intake valve position. This routine is performed at an interval of 10 milliseconds.

Firstly in a step S111, the control unit 41 reads the intake fresh air amount Qacn per cylinder at the inlet of the collector 3A, the target EGR rate Megr, and the time constant equivalent value Kkin corresponding to the collector capacity. For the intake fresh air amount $Qac_n$ per cylinder at the inlet of the collector 3A, a value calculated by the routine of FIG. 8 is used, and for the time constant equivalent value Kkin, a value calculated by the routine of FIG. 18 is used.

In a next step S112, an EGR amount Qec0 per cylinder at the inlet of the collector 3A is calculated by the following equation (7).

$$Qec0 = Qacn \cdot Mger \quad (7)$$

In a next step S113, the real EGR amount Qec is calculated by the following equation (8) and the routine is terminated.

$$Qec = Qec0 \cdot Kkin \cdot Ne \cdot KE\# + Qec_{n-1} \cdot (1 - Kkin \cdot Ne \cdot KE\#) \quad (8)$$

where,

KE#=constant, and $Qec_{n-1}$=$Qec_n$ calculated on the immediately preceding occasion the routine was executed.

Equation (8) renders a delay processing similar to that of equation (4).

The control of turbocharging pressure and control of the EGR amount by the control unit 41, are performed using the target fuel injection amount Qsol, time constant equivalent value Kkin, target EGR rate Megr, real EGR rate Megrd, the cylinder intake fresh air amount Qac and the real EGR amount Qec calculated in this way.

The turbocharging pressure is controlled by a duty value Dtyvnt of a signal output to the pressure control valve 56 of the turbocharger 50. When the duty value Dtyvnt is zero, the pressure control valve 56 fully opens, and when the duty value is 1, it is fully closed.

Figure 15:
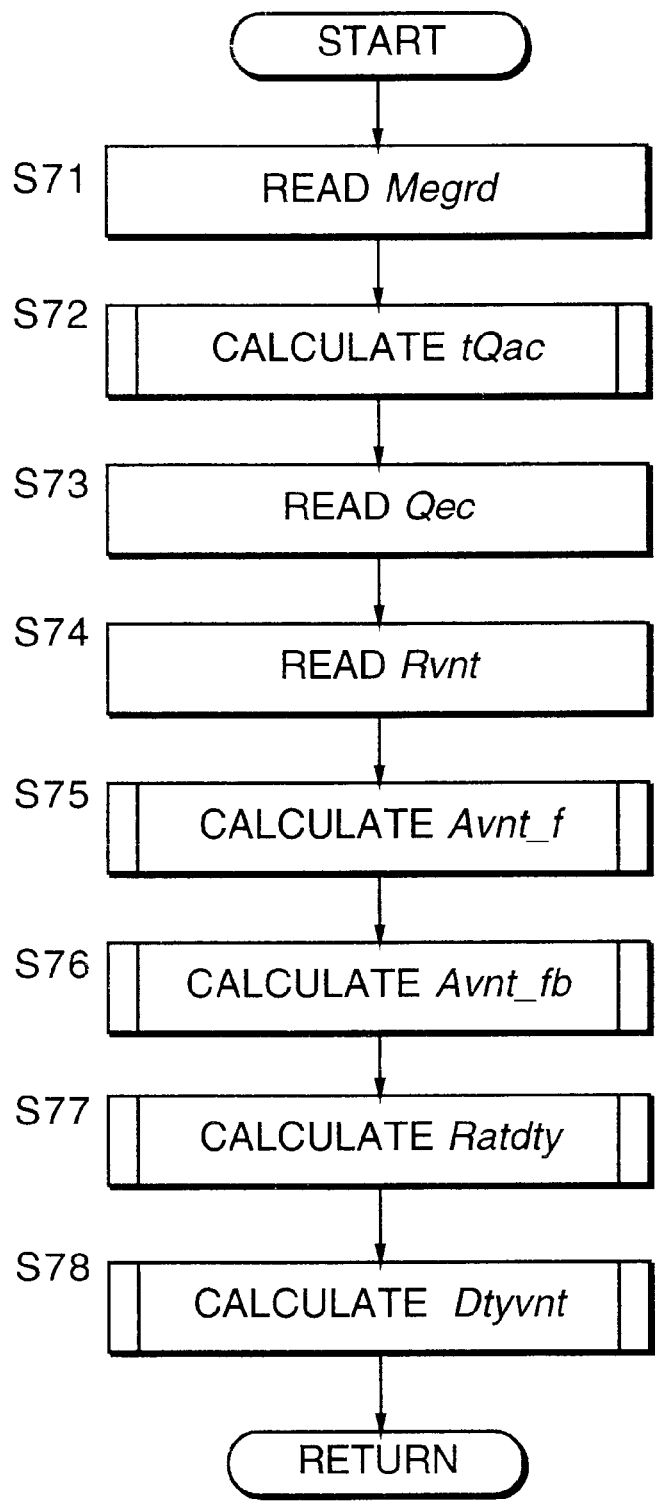
FIG. 15 is a flowchart describing a routine for calculating a duty value Dtyvnt of a pressure control valve of a turbo supercharger performed by a control unit.

The routine shown in FIG. 15 determines the duty value Dtyvnt. Therefore, this routine constitutes the main routine of turbocharging pressure control. This routine is performed at an interval of 10 milliseconds.

First, the control unit 41 reads the real EGR rate Megrd in a step S71. In a step S72, the target intake air amount tQac is calculated using the subroutine shown in FIG. 20.

Figure 20:
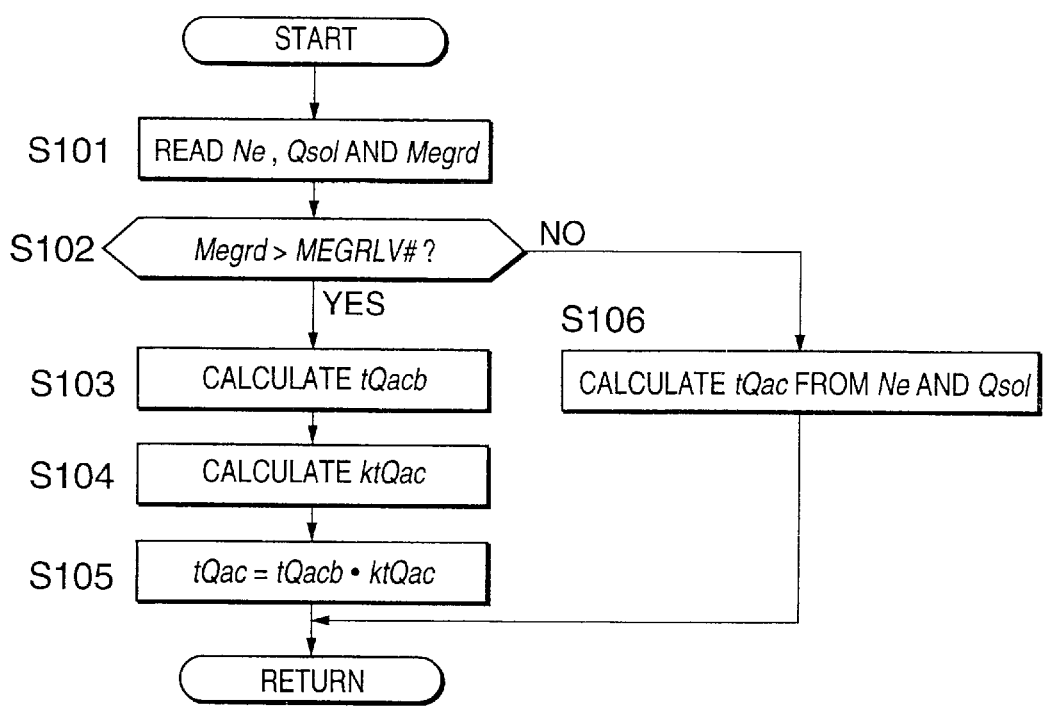
FIG. 20 is a flowchart describing a subroutine for calculating a target intake air amount tQac performed by the control unit.

Referring to FIG. 20, firstly in a step S101, the control unit 41 reads the engine rotation speed Ne, target fuel injection amount Qsol and real EGR rate Megrd. In a step S102, the real EGR rate Megrd is compared with a predeterinned value MEGRLV#. The predetermined value MEGRLV# is a value for determining whether or not exhaust gas recirculation is actually being performed, and is set to, for example, 0.5%.

In the step S102, when Megrd>MEGRLV#, the subroutine proceeds to a step S103. On the other hand, if Megrd≦MEGRLV#, the subroutine proceeds to a step S106. In order to treat the case of a very small exhaust gas recirculation to be the same as the case where exhaust gas recirculation is not performed, the predetermined value MEGRLV# is not set to zero.

Figure 21:
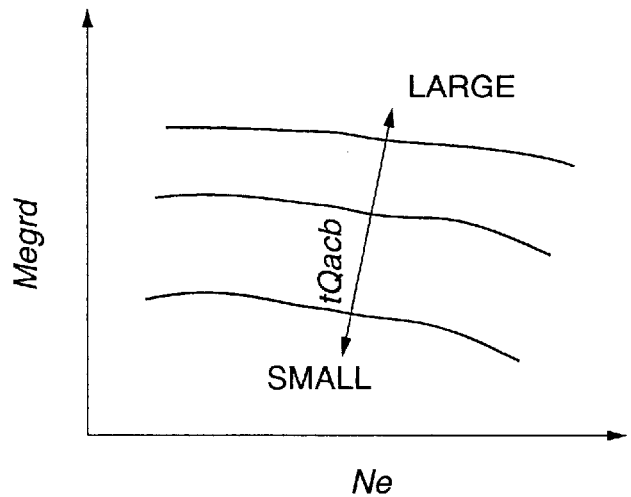
FIG. 21 is a diagram describing the contents of a map of a target intake air amount basic value tQacb stored by the control unit.

In the step S103, a target intake air amount basic value tQacb is calculated from the engine rotation speed Ne and real EGR rate Megrd by looking up a map shown in FIG. 21. When the engine rotation speed Ne is constant, this map gives a larger target intake air amount basic value tQacb the larger the real EGR rate Megrd. This map is previously stored in the memory of the control unit 41.

Figure 22:
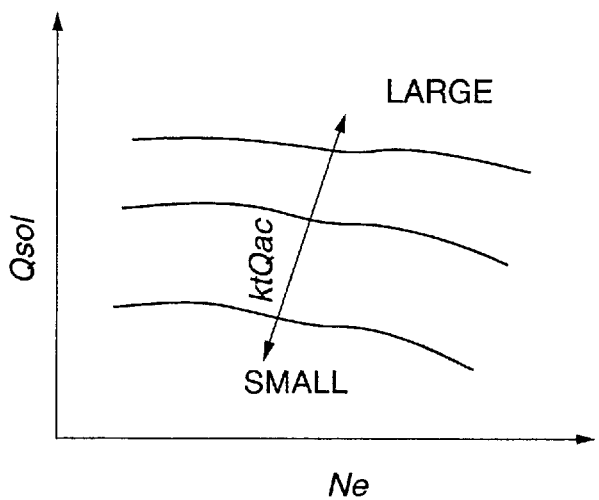
FIG. 22 is a diagram describing the contents of a map of a correction factor ktQac stored by the control unit.

Next, in a step S104, a correction coefficient ktQac of the target intake air amount is calculated from the engine rotation speed Ne and the target fuel injection amount Qsol by looking up a map shown in FIG. 22. The correction coefficient ktQac is a coefficient for setting the target intake air amount according to the running condition of the vehicle.

In a step S105, the target intake air amount tQac is calculated by multiplying the target intake air amount basic value tQacb by the correction coefficient ktQac.

Figure 23:
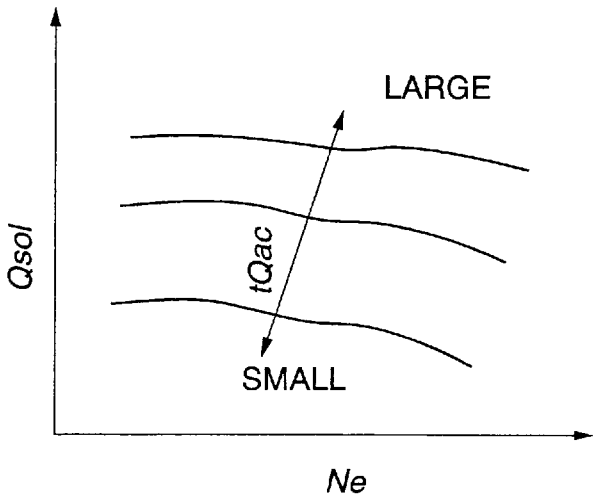
FIG. 23 is a diagram describing the contents of a map of a target intake air amount tQac stored by the control unit.

On the other hand, in the step S106, the target intake air amount tQac when exhaust gas recirculation is not performed, is calculated from the engine rotation speed Ne and the target fuel injection amount Qsol by looking up a map shown in FIG. 23.

After calculating the target intake air amount tQac in this way, the subroutine is terminated.

Figure 24:
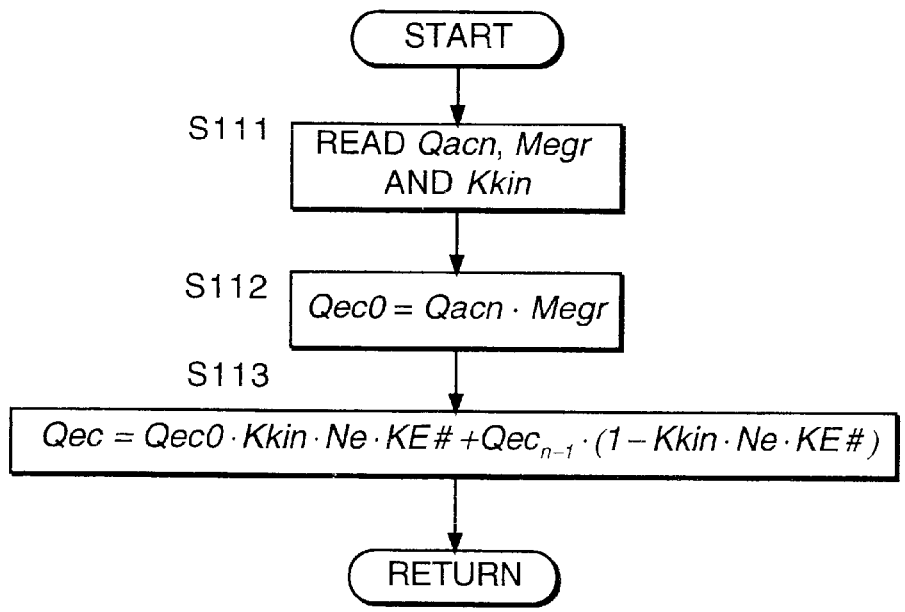
FIG. 24 is a flowchart describing a subroutine for calculating a real EGR amount Qec performed by the control unit.

Next, in a step S73 of FIG. 15, the control unit 41 reads the real EGR amount Qec calculated by the routine of FIG. 24.

In a step S74, the control unit 41 reads the target opening Rvnt of the variable nozzle 53. Here, the opening is a value which expresses the opening area of the variable nozzle 53 as a percentage relative to the opening area when the nozzle is fully open. Therefore, the opening when the nozzle is fully open is 100%, and the opening when it is fully closed is 0%. The opening is used in order to express the opening of the variable nozzle 53 as a universal value which is not affected by the capacity of the turbocharger 50, but the opening area of the variable nozzle 53 may of course also be used.

Figure 25:
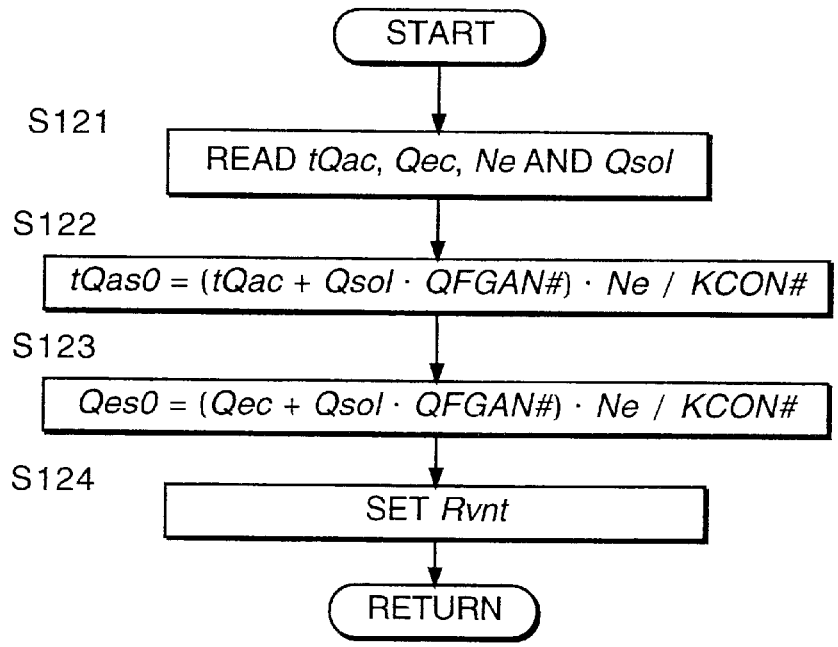
FIG. 25 is a flowchart describing a routine for calculating a target opening Rvnt of a variable fuel injection nozzle performed by the control unit.

The target opening Rvnt of the variable nozzle 53 is calculated by a routine shown in FIG. 25. This routine is performed independently of the main routine of FIG. 15 in synchronism with the REF signal.

Referring to FIG. 25, in a step S121, the control unit 41 first reads the target intake air amount tQac, real EGR amount Qec, engine rotation speed Ne and target fuel injection amount Qsol. In a following step S122, an intake air amount equivalent value tQas0 for calculating the target opening Rvnt of the variable nozzle 53 is calculated by the following equation (9).

$$tQas0 = (tQac + Qsol \cdot QFGAN\#) \cdot Ne/KCON\# \quad (9)$$

where, KCON#=constant.

In a step S123, an EGR amount equivalent value Qes0 is calculated by the following equation (10).

$$Qes0 = (Qec + Qsol \cdot QFGAN\#) \cdot Ne/KCON\# \quad (10)$$

In equations (9) and (10), Ne/KCON# is a coefficient for converting the intake air amount per cylinder or the EGR amount into a value per unit time.

Moreover, in equations (9) and (10), Qsol·QFGAN# is added to the target intake air amount tQac or the real EGR amount Qec in order to vary the target opening Rvnt according to the load of the diesel engine 1.

The effect of the target fuel injection amount Qsol, which represents the load of the diesel engine 1, is adjusted by the gain QFGAN#. In the following description, tQas0 calculated in this way is referred to as an intake air amount equivalent value, and Qes0 is referred to as a set EGR amount equivalent value.

Figure 26:
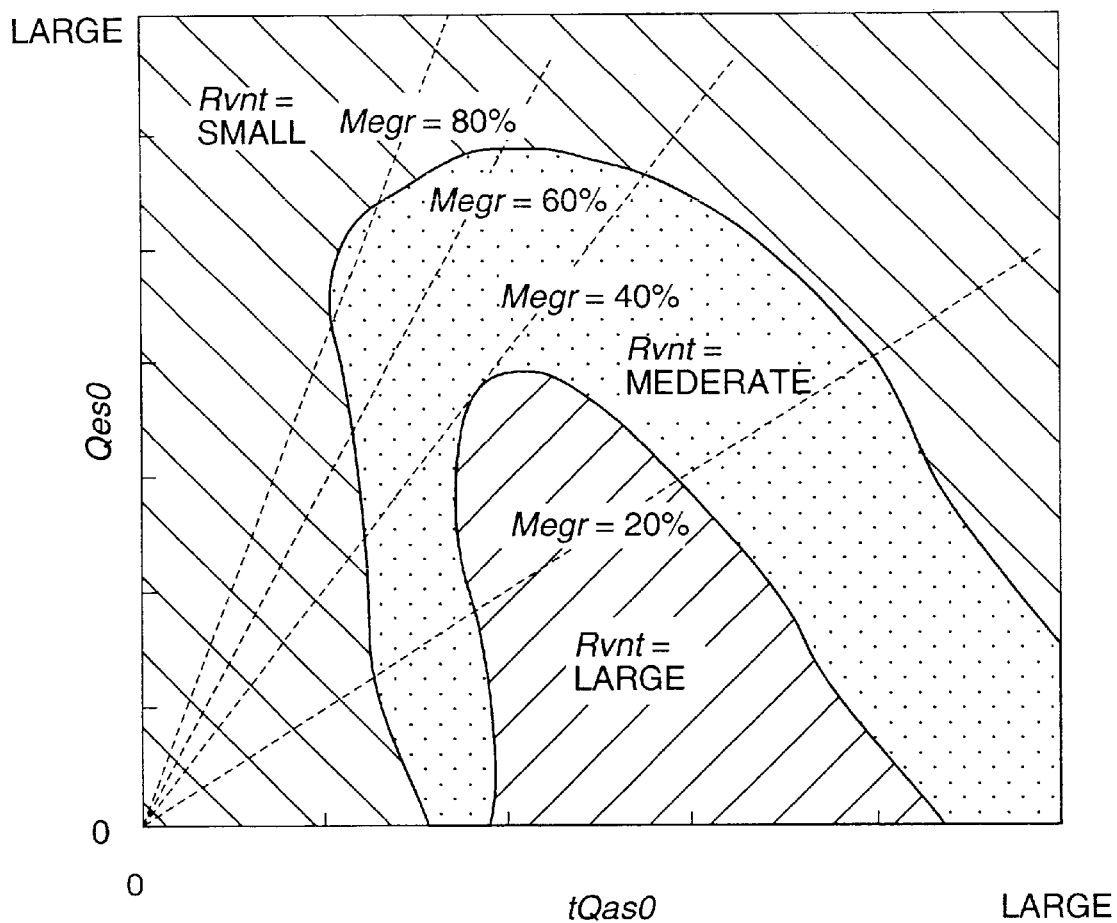
FIG. 26 is a diagram describing the contents of a map of the target opening Rvnt stored by the control unit.

In a following step S124, the target opening Rvnt of the variable nozzle 53 is calculated by looking up a map shown in FIG. 26 stored beforehand based on the intake air amount equivalent value tQas0 and the EGR amount equivalent value Qes0. This map is stored beforehand in the memory of the control unit 41.

Describing the characteristics of the target opening Rvnt specified by this map, in the region on the right-hand side of the figure where the intake air amount equivalent value tQas0 is large, the target opening Rvnt decreases with increase of the EGR amount equivalent value Qes0. This is due to the following reason. Fresh air decreases as the EGR amount increases, and as a result, the air-fuel ratio becomes rich and smoke is easily generated. To avoid this situation, the target opening Rvnt is decreased and the fresh air intake amount is increased by raising the turbocharging pressure of the turbocharger 50 the more the EGR amount increases.

In the region on the left-hand side of the figure where the intake air amount equivalent value tQas0 is small, the turbocharging efficiency of the turbocharger 50 is small. In this map, in this region, the target opening Rvnt is decreased as the intake air amount equivalent value tQas0 decreases. This is because the exhaust pressure required to rotate the exhaust gas turbine 52 is difficult to establish if the target opening Rvnt is increased in this region. It is also because, when the vehicle is accelerated by fully opening the accelerator pedal, the acceleration effect due to turbocharging is larger if the initial opening of the variable nozzle 53 is small.

In the figure, the target opening Rvnt of the region indicated by Rvnt=Small is about 20%. The target opening Rvnt of the region indicated by Rvnt=Large is set to about 30% when fuel-cost performance is emphasized, and to about 60% when exhaust gas purification is emphasized.

Figure 29:
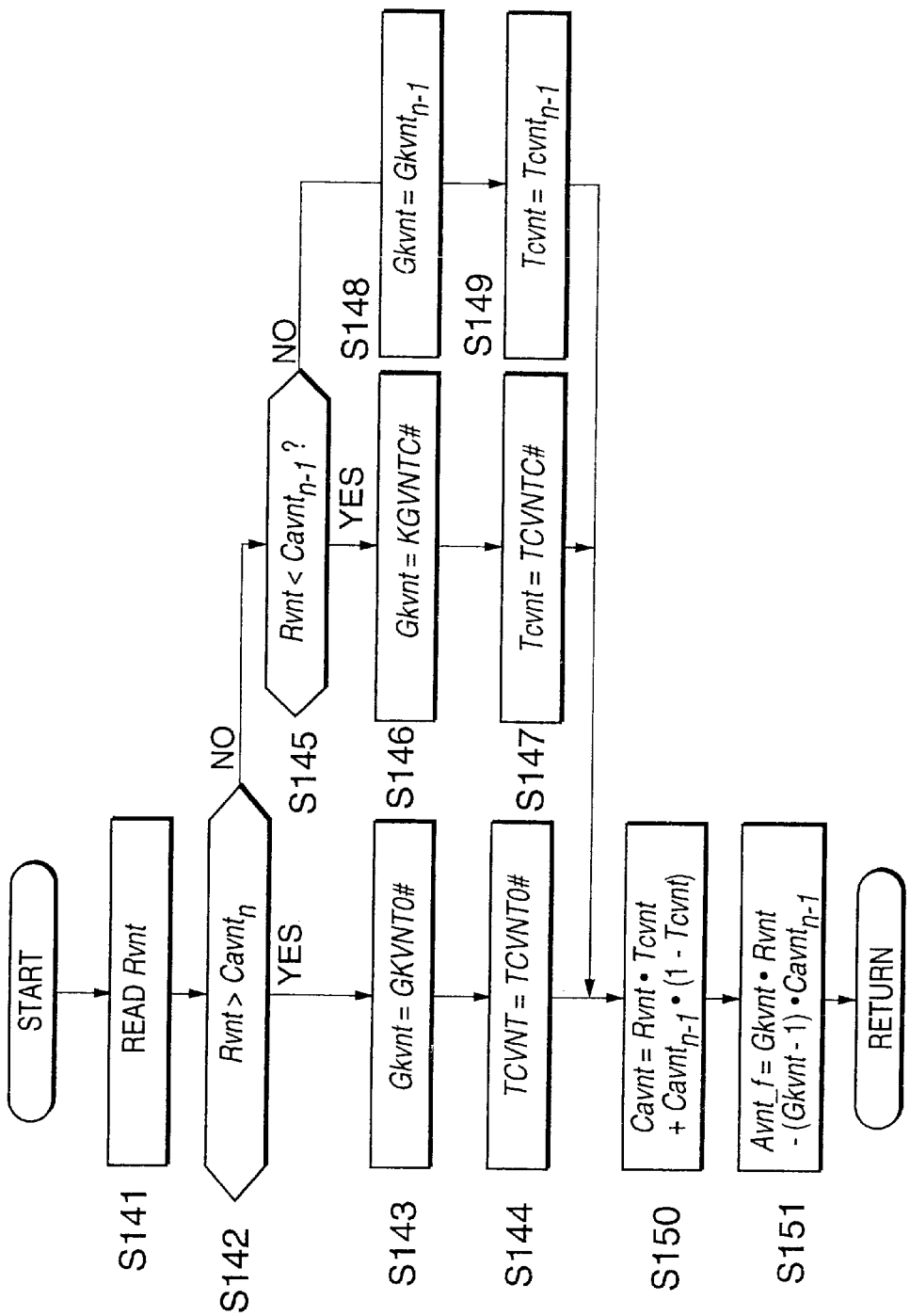
FIG. 29 is a flowchart describing a routine for calculating an open loop control amount Avnt_f of the target opening performed by the control unit.

Now, after reading the target opening Rvnt in the step S74 of FIG. 15, the control unit 41, in a step S75, adds advance processing to the target opening Rvnt using the subroutine shown in FIG. 29. This advance processing aims to compensate the operating delay based on the time required to operate the pressure actuator 54 which drives the variable nozzle 53. This processing is needed as the operation of the pressure actuator 54 using the pressure control valve 56 and the diaphragm actuator 59 has a large response delay compared to a step motor.

Referring to FIG. 29, the control unit 41 first reads the target opening Rvnt in a step S141.

In a step S142, an opening prediction value $Cavnt_{n-1}$ calculated on the immediately preceding occasion when the subroutine was executed, is compared with the target opening Rvnt. The opening prediction value $Cavnt_{n-1}$ will be described in a later step S150.

When Rvnt>$Cavnt_{n-1}$, the variable nozzle 53 is operating in the opening direction. In this case, in a step S143, the subroutine sets a advance correction gain Gkvnt as a predetermined value GKVNTO#, sets a advance correction time constant equivalent value Tcvnt as a predetermined value TCVNTO# in a step S144, and proceeds to the step S150.

Here, the time constant equivalent value Tcvnt is the inverse of a time constant, and shows that the response is faster for a larger value.

On the other hand, when Rvnt≦Cavnt$_{n-1}$ in the step S142, the subroutine determines whether or not Rvnt<Cavnt$_{n-1}$ in a step S145.

When Rvnt<Cavnt$_{n-1}$, the variable nozzle 53 is operating in the closing direction. In this case, the subroutine sets the advance correction gain Gkvnt to a predetermined value GKVNTC# in a step S146, sets the advance correction time constant equivalent value Tcvnt to a predetermined value TCVNTC# in a step S147, and proceeds to the step S150. Herein, GKVNTO#<GKVNTC# and TCVNTO#<TCVNTC#.

The reason for this setting is that, when the variable nozzle 53 is being closed, the exhaust gas pressure works as a resistance force, hence it is desirable to set the gain larger and set the time constant smaller than when the nozzle is being opened to expedite the operation of the variable nozzle 53. Making the time constant small means making the time constant equivalent value Tcvnt large, as mentioned above.

In a step S145, when the target opening Rvnt is not smaller than the opening prediction value Cavnt$_{n-1}$, i.e., Rvnt is equal to Cavnt$_{n-1}$, the subroutine sets the advance correction gain Gkvnt equal to the immediately preceding value Gkvnt$_{n-1}$ in a step S148, sets the advance correction time constant equivalent value Tcvnt equal to the immediately preceding value Tcvnt$_{n-1}$, and proceeds to the step S150.

In the step S150, an opening prediction value Cavnt is calculated from the equation (11) below using the advance correction time constant equivalent value Tcvnt and the target opening Rvnt.

$$Cavnt = Rvnt \cdot Tcvnt + Cavnt_{n-1} \cdot (1 - Tcvnt) \tag{11}$$

where, Cavnt$_{n-1}$=Cavnt calculated on the immediately preceding occasion the subroutine was executed.

In a subsequent step S151, an open loop control amount Avnt_f of the target opening is calculated by the following equation (12) using the opening prediction value Cavnt and the target opening Rvnt.

$$Avnt\_f = Gkvnt \cdot Rvnt - (Gkvnt - 1) \cdot Cavnt_{n-1} \tag{12}$$

Figure 30:
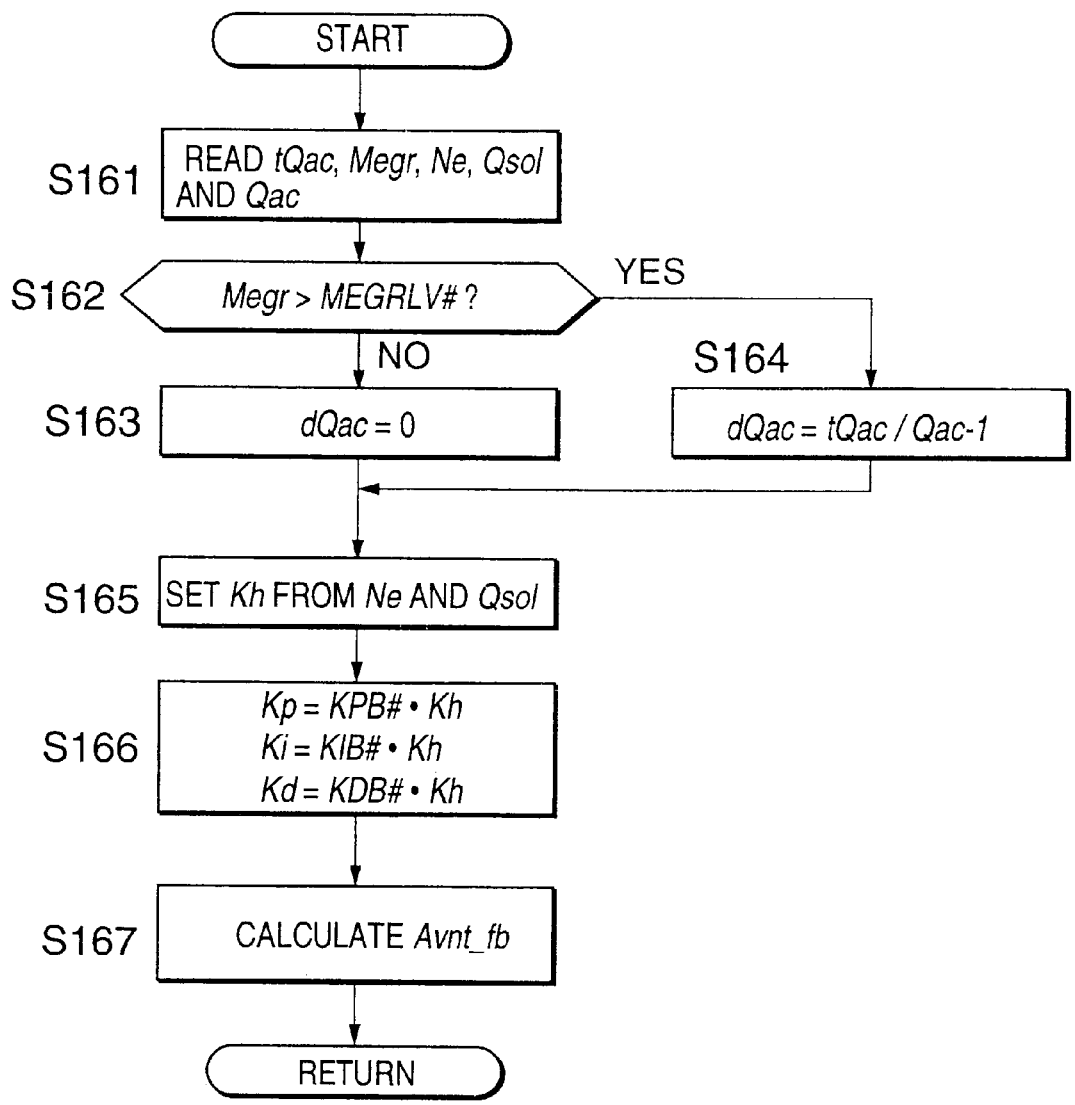
FIG. 30 is a flowchart describing a routine for calculating a feedback control amount Avnt_fb of the target opening performed by the control unit.

After executing the subroutine of FIG. 29, the control unit 41 returns to the routine of FIG. 15, and calculates a feedback correction amount Avnt_fb of the target opening Rvnt using the subroutine shown in FIG. 30 in a step S76.

Referring to FIG. 30, the control unit 41 first reads the target intake air amount tQac, target EGR rate Megr, engine rotation speed Ne, target fuel injection amount Qsol and the real intake air amount Qac in a step S161.

In a step S162, the target EGR rate Megr is compared with the predetermined value MEGRLV#. The predetermined value MEGRLV# is the same as that which was used in the step S102 of FIG. 20. Herein, it is determined whether or not to perform exhaust gas recirculation by comparing the target EGR rate Megr with the predetermined value MEGRLV#.

Megr≧MEGRLV# is a region where exhaust gas recirculation should be performed. In this case, the subroutine proceeds to a step S164, and an error rate dQac of the target intake air amount tQac is calculated relative to the real intake air amount Qac by the following equation (13).

$$dQac = (tQac/Qac) - 1 \tag{13}$$

When the target intake air amount tQac is larger than the real intake air amount Qac, the error rate dQac takes a positive value, and when the target intake air amount tQac is smaller than the real intake air amount Qac, the error rate dQac takes a negative value.

If the target intake air amount tQac is equal to the real intake air amount Qac, the error rate dQac is zero.

Megr<MEGRLV# is a region in which exhaust gas recirculation is not performed. In this case, the subroutine sets the error rate dQac to 0 in a step S163.

After setting the error rate dQac, the subroutine proceeds to a step S165.

In the step S165, a feedback gain correction coefficient Kh used for feedback control of the target opening Rvnt is calculated, from the engine rotation speed Ne and the target fuel injection amount Qsol, by looking up a map stored beforehand in the control unit 41. The map is set so as to increase the correction coefficient Kh the larger the load of the diesel engine 1 represented by the target fuel injection amount Qsol, and the larger the rotation speed Ne of the diesel engine 1.

In a following step S166, a proportional feedback gain Kp, integral feedback gain Ki and differential feedback gain Kd are calculated by multiplying the correction coefficient Kh by a proportion constant KPB#, integral constant KIB# and differential constant KDB#, respectively.

In a step S167, based on these gains, the feedback control amount Avnt_fb of the target opening Rvnt of the variable nozzle 53 is calculated using proportional/integral/differential control equations known in the art.

Figure 31:
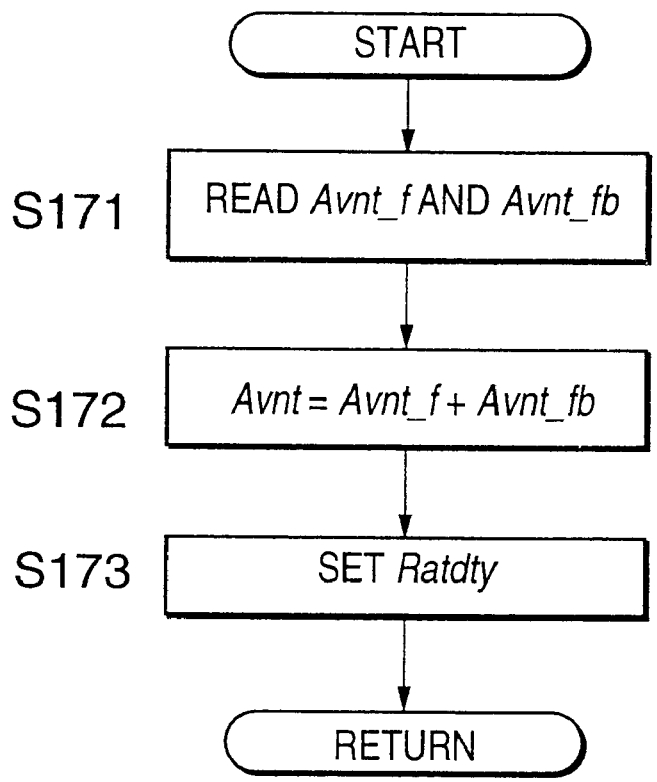
FIG. 31 is a flowchart describing a subroutine for performing linearization processing on the target opening performed by the control unit.

After the above calculation, the control unit 41 returns to the routine of FIG. 15, and performs linearization processing on the target opening Rvnt using a subroutine shown in FIG. 31 in a step S77.

Referring to FIG. 31, in a step 171, the control unit 41 reads the open loop control amount Avnt_f and the feedback control amount Avnt_fb of the target opening Rvnt.

In a next step S172, a command opening Avnt is calculated by summing these control amounts.

Figure 32:
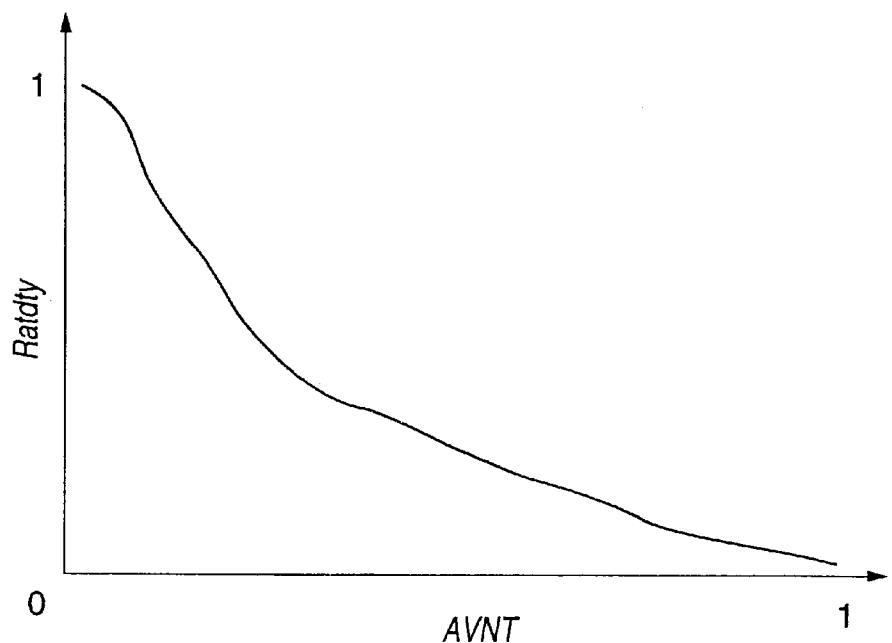
FIG. 32 is a diagram describing the contents of a map of the target opening Rvnt stored by the control unit

In a following step S173, a linearization processing value Ratdty of the command opening Avnt is calculated from the command opening Avnt by looking up a map of FIG. 32 previously stored in the memory of the control unit 41.

Figure 34:
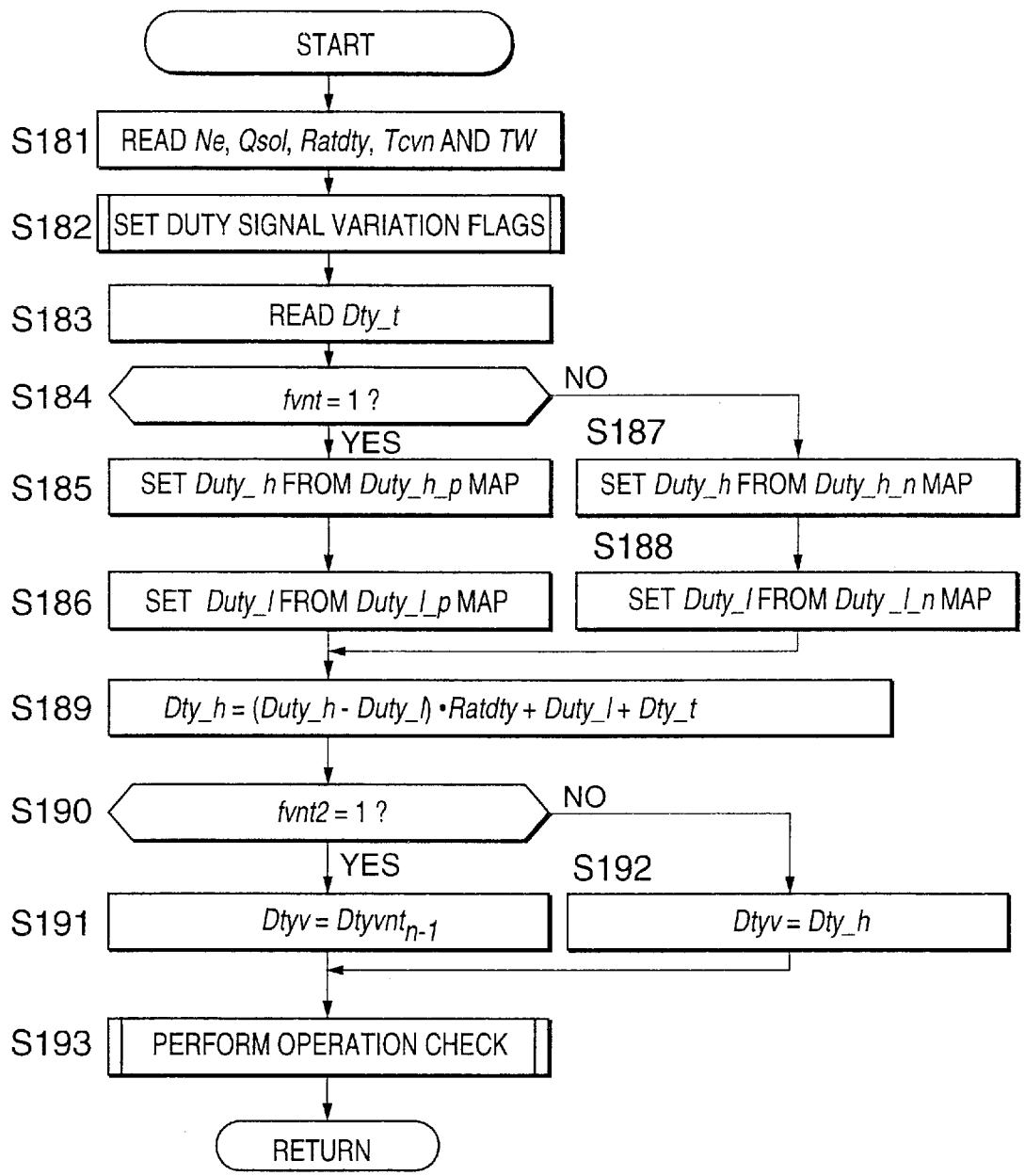
FIG. 34 is a flowchart describing a subroutine for setting the duty value Dtyvnt of the pressure control valve of the turbocharger performed by the control unit.

After this processing, the control unit 41 returns again to the routine of FIG. 15, and determines the duty value Dtyvnt using a subroutine shown in FIG. 34 in a step S78.

The subroutine of FIG. 34 sets the duty value Dtyvnt of the signal output to the pressure control valve 56 of the variable nozzle 53. This linearization is required for the following reason.

Figure 33:
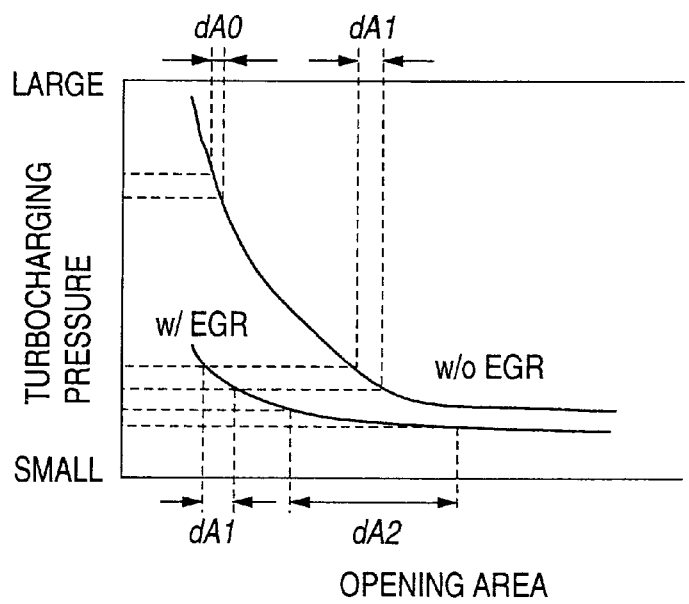
FIG. 33 is a diagram describing a relation between an opening area of a variable nozzle, and a turbocharging pressure.

In FIG. 33, the opening area dA0 and dA1 are different while the variation width of turbocharging pressure is the same when EGR is not performed. When EGR is performed, this difference may be even larger. In other words, with a fixed feedback gain, it is difficult to control precisely the turbocharging pressure. In order to ensure the prompt response of the turbocharging pressure, the feedback gain Kh is set to vary according to running conditions.

Referring to FIG. 34, in a step S181, the control unit 41 reads the engine rotation speed Ne, target fuel injection amount Qsol, linearization processing value Ratdty of the command opening, advance correction time constant equivalent value Tcvnt and cooling water temperature Tw of the diesel engine 1.

Figure 35:
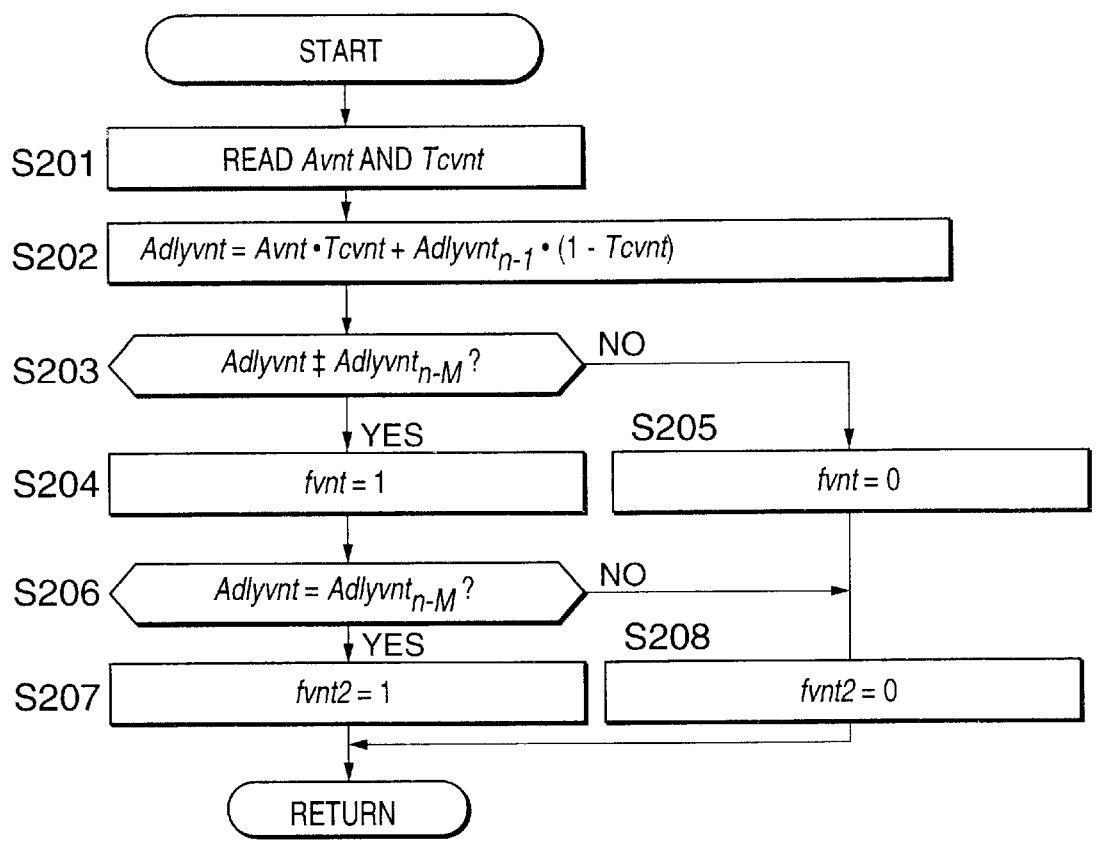
FIG. 35 is a flowchart describing a subroutine for setting a duty selection signal flag fvnt2 performed the control unit.

In a step S182, duty signal variation flags are set using the subroutine shown in FIG. 35.

Referring to FIG. 35, the control unit 41 first reads the command opening Avnt and the advance correction time constant equivalent value Tcvnt in a step S201.

In a next step S202, a command opening prediction value Adlyvnt is calculated by the following equation (14).

$$Adlyvnt = Avnt \cdot Tcvnt + Adlyvnt_{n-1} \cdot (1 - Tcvnt) \tag{14}$$

where, Adlyvnt$_{n-1}$=value of Adlyvnt calculated on the immediately preceding occasion the subroutine was executed.

Here, the relation between the command opening Avnt and the command opening prediction value Adlyvnt corresponds to the relation between the target opening Rvnt and the opening prediction value Cavnt.

In a following step S203, the command opening prediction value Adlyvnt is compared with a command opening prediction value Adlyvnt$_{n-M}$ calculated by the subroutine executed M times ago.

When Adlyvnt≧Adlyvnt$_{n-M}$, the command opening is increasing or constant. In this case, the subroutine sets an operation direction flag fvnt to 1 in a step S204, and proceeds to a step S206.

In the step S206, it is determined whether or not Adlyvnt=Adlyvnt$_{n-M}$. When Adlyvnt=Adlyvnt$_{n-M}$, in a step S207, a duty hold flag fvnt2 is set to 1, and the subroutine is terminated.

When Adlyvnt<Adlyvnt$_{n-M}$ is not satisfied, the routine proceeds to a step S208.

When Adlyvnt<Adlyvnt$_{n-M}$ in the step S203, it shows that the command opening is decreasing. In this case, the subroutine resets the operation direction flag fnvt to zero in a step S205, and the routine proceeds to the step S208.

In the step S208, the duty hold flag fvnt2 is reset to zero, and the subroutine is terminated.

Thus, after setting the two flags fvnt and fvnt2, the control unit 41 reads a duty value temperature correction amount Dty_t in a step S183 of FIG. 34. The duty value temperature correction amount Dty_t is calculated by a routine of FIG. 36 performed independently in synchronism with the REF signal.

Figure 36:
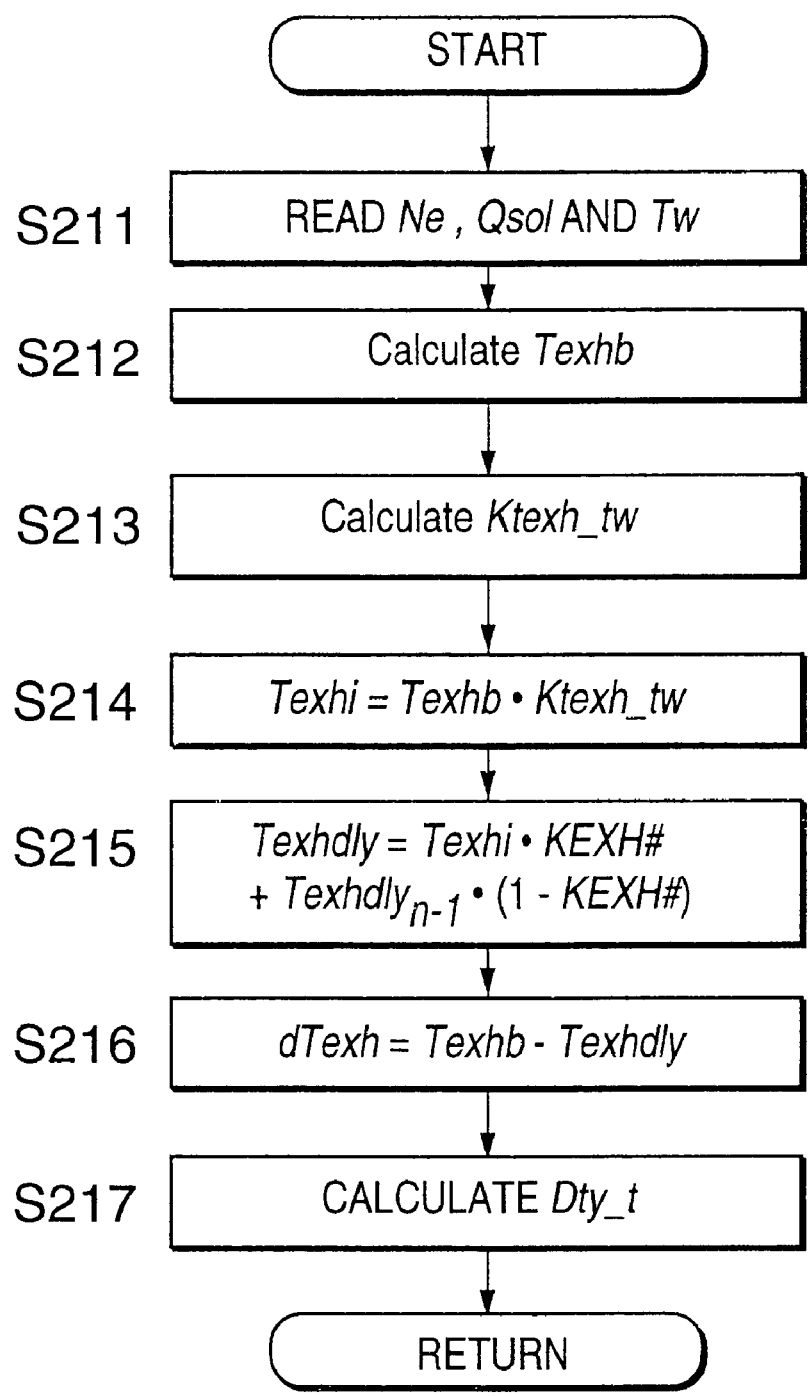
FIG. 36 is a flowchart describing a routine for correcting a temperature correction amount Dty_t of the duty value performed by the control unit.

Referring to FIG. 36, in a step S211, the control unit 41 first reads the engine rotation speed Ne, target fuel injection amount Qsol and cooling water temperature Tw.

Figure 37:
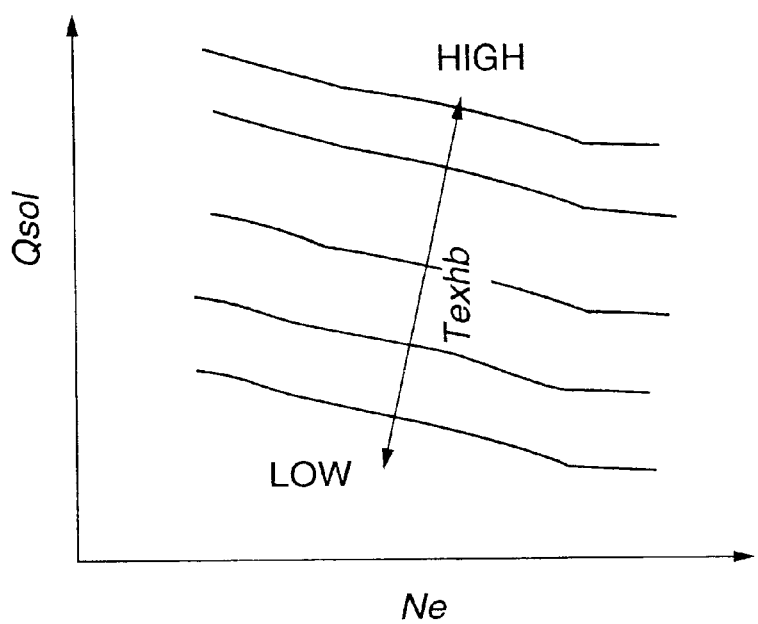
FIG. 37 is a diagram describing the contents of a map of a basic exhaust gas temperature Texhb stored by the control unit.

In a step S212, a basic exhaust gas temperature Texhb is calculated from the engine rotation speed Ne and target fuel injection amount Qsol by looking up a map shown in FIG. 37 previously stored in the memory of the control unit 41. The basic exhaust gas temperature Texhb is the exhaust gas temperature after the diesel engine 1 has completed warming up.

Figure 38:
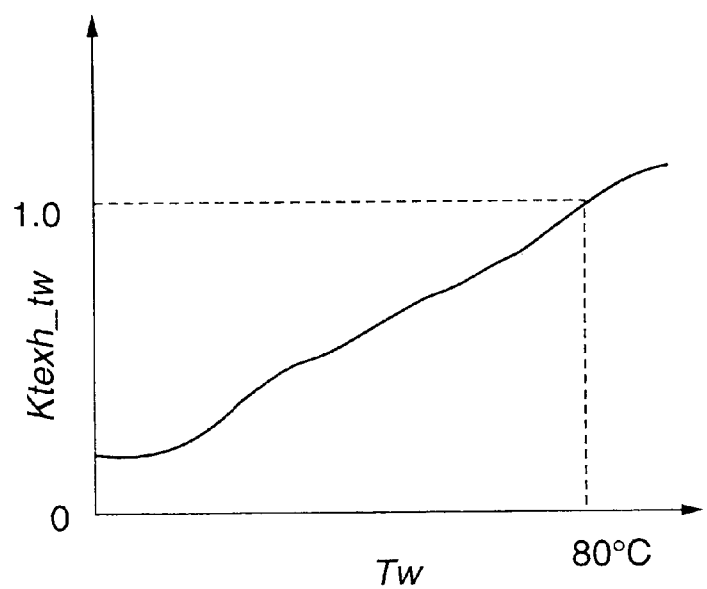
FIG. 38 is a diagram describing the contents of a map of a water temperature correction coefficient Ktexh_Tw stored by the control unit.

In a next step S213, a water temperature correction coefficient Ktexh_Tw is calculated by looking up a map shown in FIG. 38 stored in the control unit 41, based on the cooling water temperature Tw.

In a step S214, an exhaust gas temperature Texhi is calculated by multiplying the basic exhaust gas temperature Texhb by the water temperature correction coefficient Ktexh_Tw.

In a next step S215, a real exhaust gas temperature Texhdly is calculated by adding a first order processing delay to the exhaust gas temperature Texhi by the following equation (15). This value is a value which takes account of the delay due to the heat inertia in the variation of exhaust gas temperature.

$$Texhdly=Texhi \cdot KEXH\#+Texhdly_{n-1} \cdot (1-KEXH\#) \quad (15)$$

where,

KEXH#=constant, and

Texhdly$_{n-1}$=Texhdly calculated on the immediately preceding occasion when the subroutine was executed.

In a following step S216, a difference dTexh of the basic exhaust gas temperature Texhb and this real exhaust gas temperature Texhdly is calculated.

Figure 39:
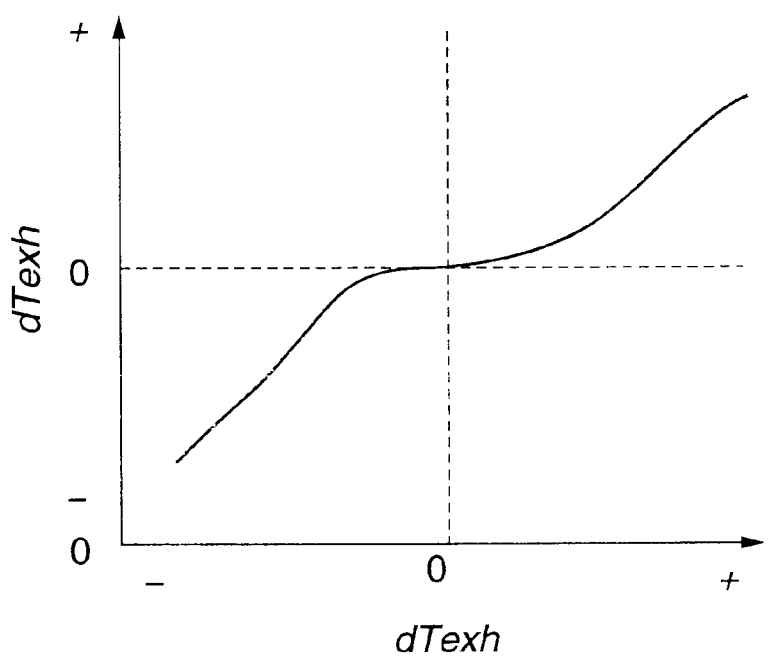
FIG. 39 is a diagram describing the contents of a map of the temperature correction amount Dty_t stored by the control unit.

In a last step S217, the duty value temperature correction amount Dty_t is calculated by looking up a map shown in FIG. 39 previously stored in the memory of the control unit 41, based on the difference dTexh. The meaning of the processing of the steps S216 and S217 will be described in detail later.

After reading the value of Dty_t in the step S183, the control unit 41 performs processing after the step S184 of FIG. 34. Steps S184–S189 are steps which add hysteresis processing to the duty value.

Figure 40:
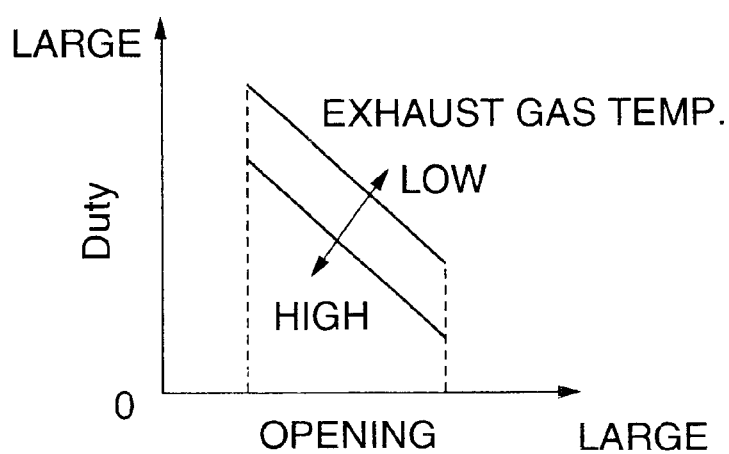
FIG. 40 is a diagram describing the temperature characteristics of an actuator of the turbocharger.
Figure 45:
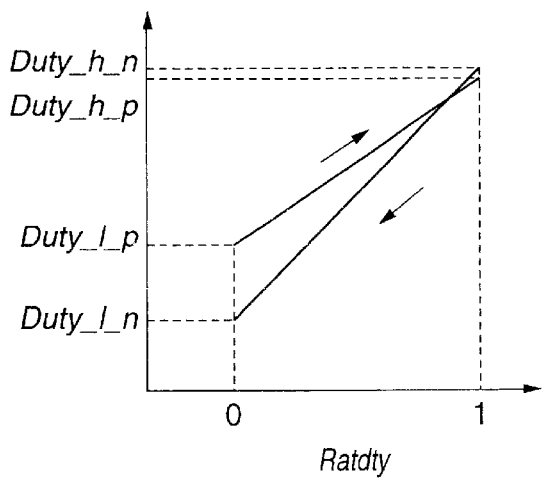
FIG. 45 is a diagram describing a hysteresis in the relation between a command opening linearization processing value and the duty value according to this invention.

Describing this hysteresis processing with reference to FIG. 45, when the linearization processing value Ratdty of the command opening Avnt is increasing, the duty value is made to vary according to a straight line which joins a command signal Duty_l_p when the variable nozzle 53 is fully open, and a command signal Duty_h_p when the variable nozzle 53 is fully closed. On the other hand, when the linearization processing value Ratdty is decreasing, the duty value is made to vary according to a straight line which connects a command signal Duty_l_n when the variable nozzle 53 is fully open, and a command signal Duty_h_n when the variable nozzle 53 is fully closed. In the drawing, two lines intersect in the region where the variable nozzle 53 is nearly closed, but this region is a region which is not used in actual control of the pressure control valve 56. These characteristics are set assuming that the diesel engine 1 has completely warmed up. When the real exhaust gas temperature Texhdly is low, the pressure actuator 54 has the characteristic of opening the variable nozzle 53 larger for the same duty value, as shown in FIG. 40. Hence, it is necessary to apply the temperature correction amount Dty_t calculated in the steps S216, S217 of FIG. 36, to compensate the difference in the characteristic of the pressure actuator 54 due to the exhaust gas temperature.

Figure 41:
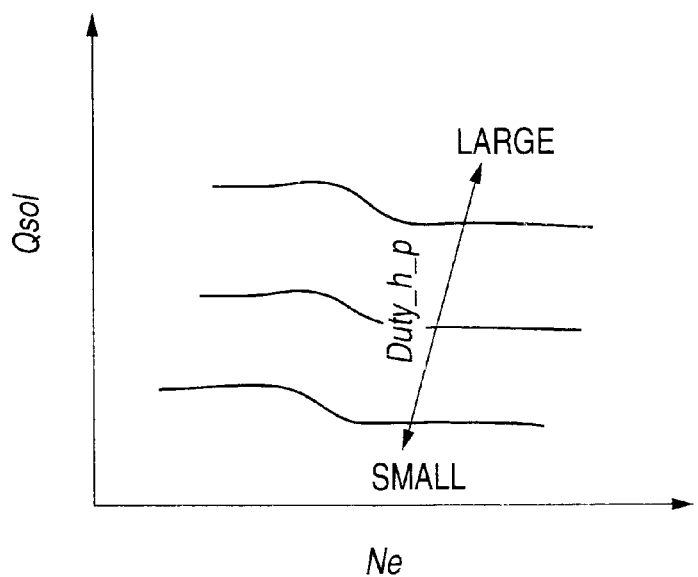
FIG. 41 is a diagram of the contents of a map of a duty value Duty_h when the variable nozzle is fully closed, when the opening of the variable nozzle is constant or increasing, stored by the control unit.

Now, the control unit 41 determines the operation direction flag fvnt in the step S184. When the operation direction flag fvnt is 1, i.e., when the command opening Avnt is increasing or constant, the processing of steps S185, S186 is performed. In the step S185, a duty value Duty_h when the variable nozzle 53 is fully closed, is calculated based on the target fuel injection amount Qsol by looking up a Duty_h_p map shown in FIG. 41.

Figure 42:
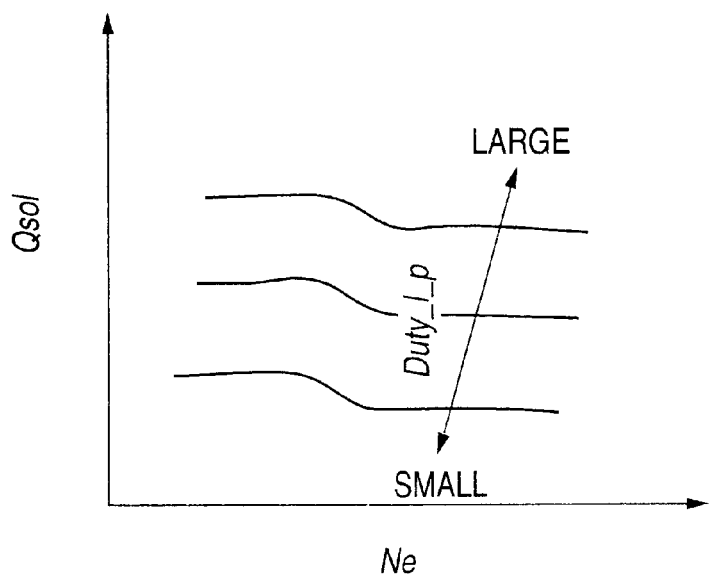
FIG. 42 is a diagram of the contents of a map of a duty value Duty_l when the variable nozzle is fully open, when the opening of the variable nozzle is constant or increasing, stored by the control unit.

In the following step S186, a duty value Duty_l when the variable nozzle 53 is fully open, is calculated by looking up a Duty_l_p map shown in FIG. 42. After this processing, the subroutine proceeds to a step S189.

Figure 43:
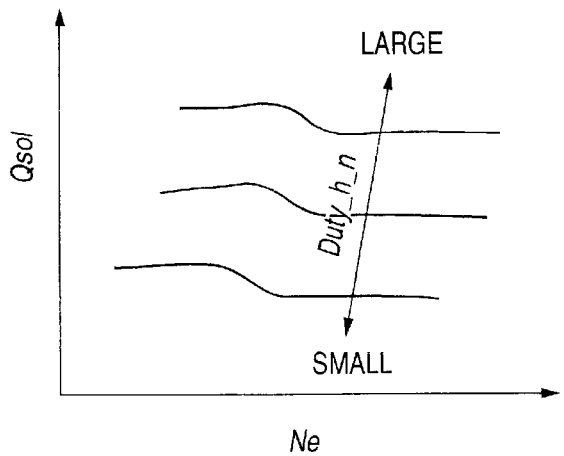
FIG. 43 is similar to FIG. 41, but showing a case where the opening of the variable nozzle is decreasing.
Figure 44:
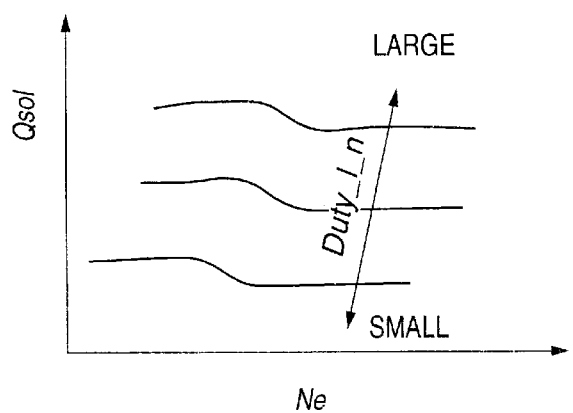
FIG. 44 is similar to FIG. 42, but showing a case where the opening of the variable nozzle is decreasing.

When the operation direction flag fvnt is 0 in the step S184, i.e., when the command opening Avnt is decreasing, the processing of steps S187, S188 is performed. In the step S187, the duty value Duty_h when the variable nozzle 53 is fully closed, is calculated based on the target fuel injection amount Qsol by looking up a Duty_h_n map shown in FIG. 43. In the following step S188, the duty value Duty_l when the variable nozzle 53 is fully open, is calculated based on the target fuel injection amount Qsol by looking up a Duty_l_n map shown in FIG. 44.

After this processing, the subroutine proceeds to a step S189.

In the step S189, a command duty basic value Dty_h is calculated by performing linear interpolation processing by the following equation (16) using the duty values Duty_h, Duty_l found by the above processing, the linearization processing value Ratdty of the command opening Avnt, and the temperature correction amount Dty_t.

$$Dty\_h=(Duty\_h-Duty\_l) \cdot Ratdty+Duty\_l+Dty\_t \quad (16)$$

By changing the straight line used for linear interpolation processing in the case where the command opening Avnt, is decreasing, and the case where it is not, the command duty basic value Dty_h is made smaller, for the same linearization processing value Ratdty, in the case where the command opening Avnt is decreasing than in other cases.

In a next step S190, the duty hold flag fvnt2 is determined. When the duty hold flag fvnt2 is 1, i.e., the command opening prediction value Adlyvnt is not changing, a command duty value Dtyv is set equal to the duty value $Dtyvnt_{n-1}$ calculated on the immediately preceding occasion the subroutine was executed, in a step S191. The duty value $Dtyvnt_{n-1}$ will be described in detail later.

When the duty maintenance flag fvnt2 is 0, i.e., when the command opening prediction value Adlyvnt is changing, in a step S192, the command duty value Dtyv is set equal to the command duty basic value Dty_h calculated in the step S189.

Figure 46:
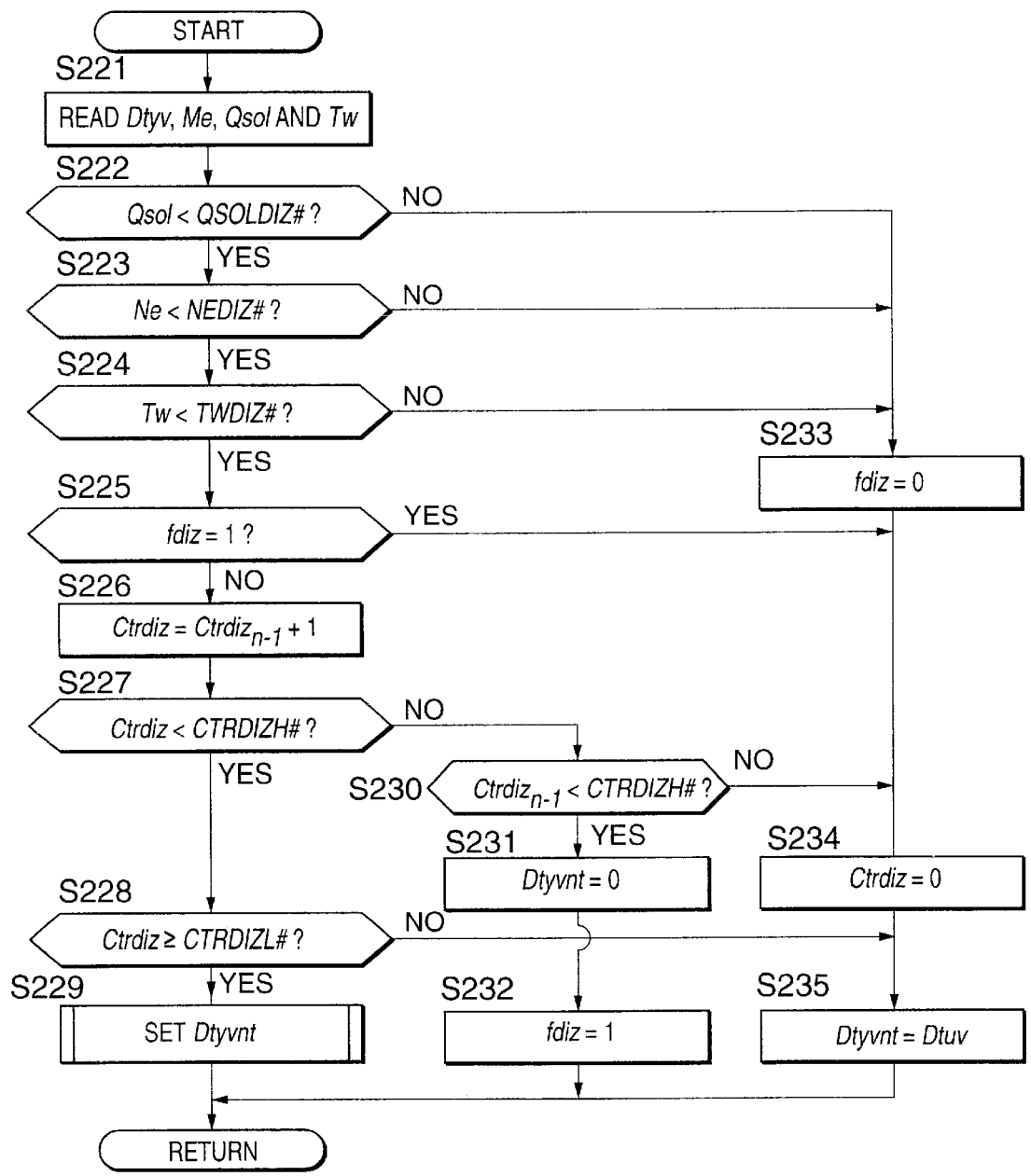
FIG. 46 is a flowchart describing an operation check subroutine performed by the control unit.

Thus, after determining the command duty value Dtyv in the step S191 or step S192, in a final step S193, the control unit 41 performs an operation check on the variable nozzle 53 using the subroutine of FIG. 46 based on the command duty value Dtyv.

Referring to FIG. 46, in a step S221, the control unit 41 first reads the command duty value Dtyv, engine rotation speed Ne, target fuel injection amount Qsol and the cooling water temperature Tw.

In subsequent steps S222–S225, it is determined whether or not operation check conditions are satisfied. An operation check is performed only when all these conditions are satisfied.

In the step S222, it is determined whether or not the target fuel injection amount Qsol is less than a predetermined value QSOLDIZ#. When this condition is satisfied, it means that the diesel engine 1 is performing fuel cut.

In the step S223, it is determined whether or not the engine rotation speed Ne is less than a predetermined value NEDIZ#. When this condition is satisfied, it means that the rotation speed Ne of the diesel engine 1 is in an intermediate or low speed region.

In the step S224, it is determined whether or not the cooling water temperature Tw is less than a predetermined value TwDIZ#. When this condition is satisfied, it means that warming up of the diesel engine 1 is not complete.

In the step S225, it is determined whether or not an operation check flag Fdiz is 0. When this condition is satisfied, it means that an operation check has not yet been performed.

When all the conditions are satisfied, an operation check counter value CtFdiz is incremented in a step S226, and the routine proceeds to a step S227.

If any of the determination results of the steps S222–S224 is not satisfied, the subroutine resets the operation check flag Fdiz to 0 in a step S233, and proceeds to a step S234. However, when the operation check flag Fdiz is 1 in the step S225, it proceeds to the step S234 immediately.

In a step S227, the operation check counter value CtFdiz is compared with a predetermined upper limiting value CTRDIZH#.

When the operation check counter value CtFdiz is smaller than the upper limiting value CTRDIZH#, in a step S228, the operation check counter value CtFdiz Is compared with a predetermined lower limiting value CTRDIZL#. When the operation check counter value CtFdiz is not less than the lower limiting value CTRDIZL#, in a step S229, a duty value Dtyvnt is set for checking operation using a subroutine shown in FIG. 47.

The upper limiting value CTRDIZH# is set to, for example, 7 seconds, and the lower limiting value CTRDIZL# is set to, for example, 2 seconds. In this case, the duty value for checking operation is set only in a 5 second interval of the difference between the upper limiting value and lower limiting value.

Figure 47:
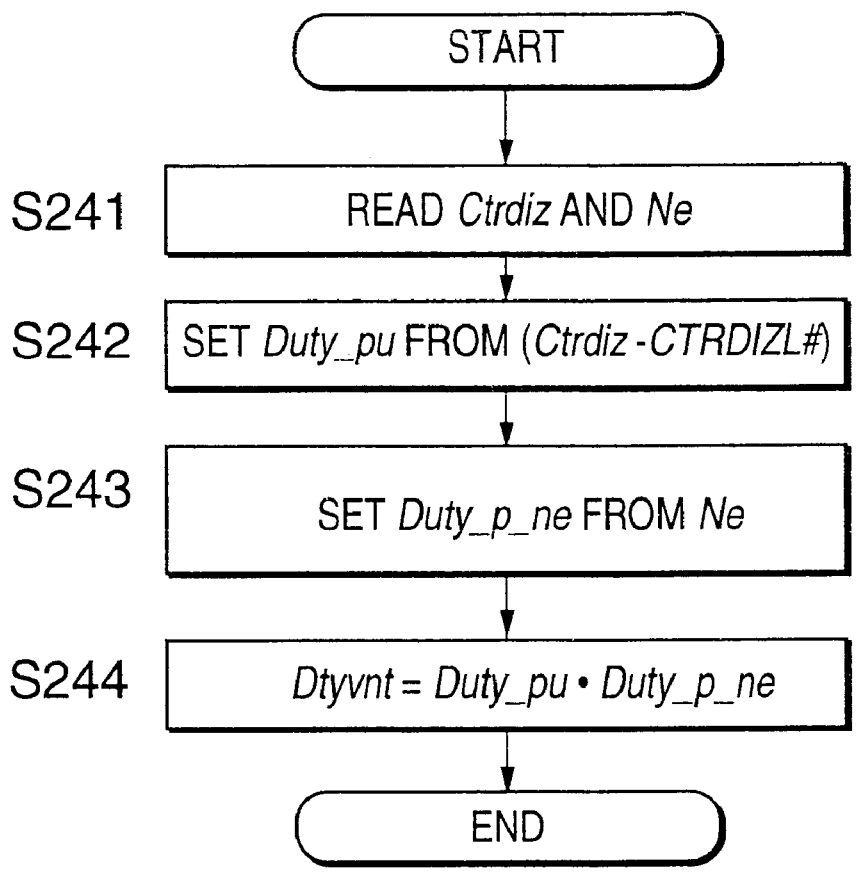
FIG. 47 is a flowchart describing a routine for calculating the duty value Dtyvnt performed by the control unit.

Here, referring to FIG. 47, a subroutine for setting the duty value for operation check will be described.

The control unit 41, in a step S241, first reads the operation check counter value CtFdiz and engine rotation speed Ne.

Figure 48:
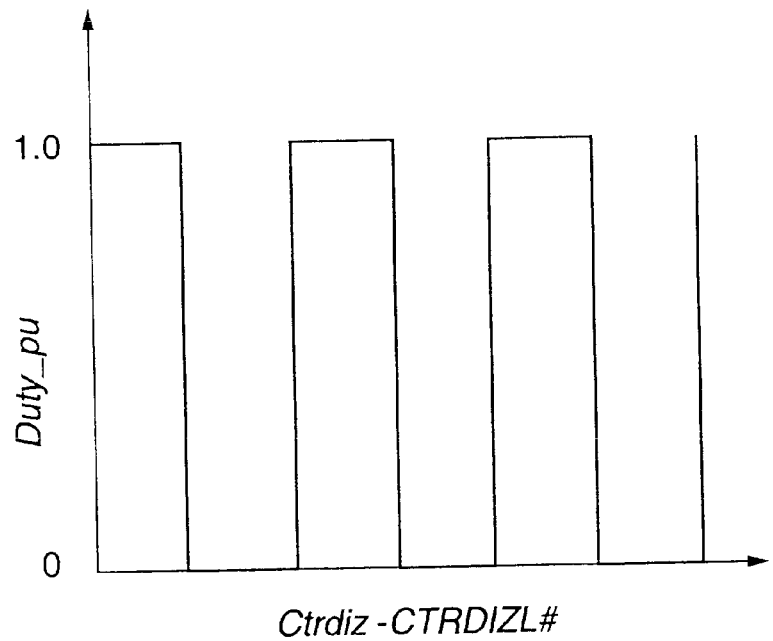
FIG. 48 is a diagram describing the contents of a map of a control pattern value Duty_pu stored by the control unit.

In a following step S242, a control pattern value Duty_pu is set by looking up a map shown in FIG. 48 based on the difference of the operation check counter value CtFdiz and lower limiting value CTRDIZL#. This map is previously stored in the memory of the control unit 71. The control pattern value Duty_pu is set so that it repeatedly varies between 0 and 1 with a short period according to the elapsed time after the operation check counter value CtFdiz exceeds the lower limiting value CTRDIZL#.

Figure 49:
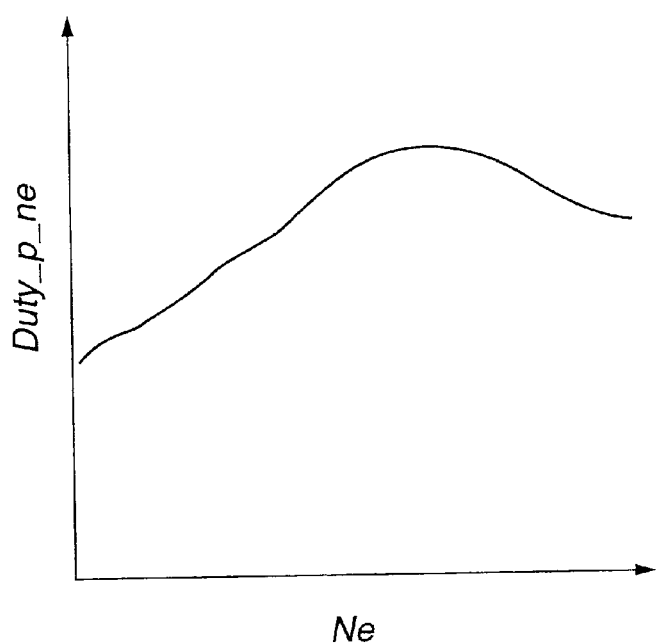
FIG. 49 is a diagram describing the contents of a map of a duty value Duty_p_ne stored by the control unit.

In a next step S243, a duty value Duty_p_ne commanded to the pressure control valve 56 is calculated by looking up a map shown in FIG. 49 previously stored in the memory of the control unit 41, based on the engine rotation speed Ne. The duty value Duty_p_ne is set supposing that the duty for checking the opening and closing operation of the variable nozzle 53 differs according to the engine rotation speed Ne. For example, when the variable nozzle 53 is to be closed, it must close against the exhaust gas pressure. The exhaust gas pressure increases in accordance with the increase in engine rotation speed Ne.

Further, when the engine rotation speed Ne is in the high-speed region, the closing of the variable nozzle 53 to check operation has a major impact on the engine running environment. Therefore, in the high speed region, the duty value Duty_p_ne is decreased as the engine rotation speed Ne increases so as to reduce the impact on the engine running environment.

In a following step S244, the duty value Dtyvnt is calculated by multiplying the duty value Duty_p_ne by the control pattern value Duty_pu, and the subroutine is terminated.

In this way, after terminating the setting of the duty value for checking operation in the step S229 of FIG. 46, the subroutine of FIG. 46 is also terminated.

On the other hand, in the step S227 of FIG. 46, when the operation check counter value CtFdiz is not less than the upper limiting value CTRDIZH#, the processing of the step S230 is performed. Here, an immediately preceding value $CtFdiz_{n-1}$ of the operation check counter value CtFdiz operation is compared with the upper limiting value CTRDIZH#. If the Immediately preceding value $CtFdiz_{n-1}$ is less than the upper limiting value CTRDIZH#, it means that CTRDIZH# reached the upper limiting value CTRDIZH# for the first time in the repeat execution of this subroutine, the duty value Dtyvnt is set to 0 in a step S231, the operation check flag Fdiz is set to 1 in a step S232, and the subroutine is terminated.

By once setting the duty value Dtyvnt to 0 in the step S231 when the operation check is completed, the variable nozzle 53 fully opens. This operation aims to maintain control precision during ordinary control performed thereafter. By setting the operation check flag Fdiz to 1, the determination result of the step S225 will always be negative in the execution of the subroutine thereafter. It means the operation check of the variable nozzle 53 is performed only once after starting the diesel engine 1.

On the other hand, when the immediately preceding value $CtFdiz_{n-1}$ of the operation check counter value CtFdiz is not less than the upper limiting value CTRDIZH# in the step S230, the subroutine proceeds to the step S234. In the step S234, the operation check counter value CtFdiz is reset to 0, and the routine proceeds to a step S235.

When the operation check counter value CtFdiz is less than the predetermined lower limiting value CTRDIZL# in the step S228, the subroutine also proceeds to the step S235.

In the step S235, the duty value Dtyvnt for operation check is set equal to the command duty value Dtyv determined in the step S191 or step S192, and the subroutine is terminated. In this case therefore, the ordinary control of the variable nozzle 53 is performed.

In particular, when operation of the pressure actuator 54 is unstable such as at low temperatures etc., this operation check of the variable nozzle 53 makes the operation of the variable nozzle 53 smooth and increases reliability in control of turbocharging pressure.

In this way, by ending the subroutine of FIG. 46, the processing of the subroutine of FIG. 34 and also that of the main routine of FIG. 15 is terminated.

Next, referring to FIG. 5, the calculation of the target opening area Aev of the EGR valve 6 will be described. This routine constitutes the main feature of this invention. This routine is performed every time the REF signal is input.

Figure 7:
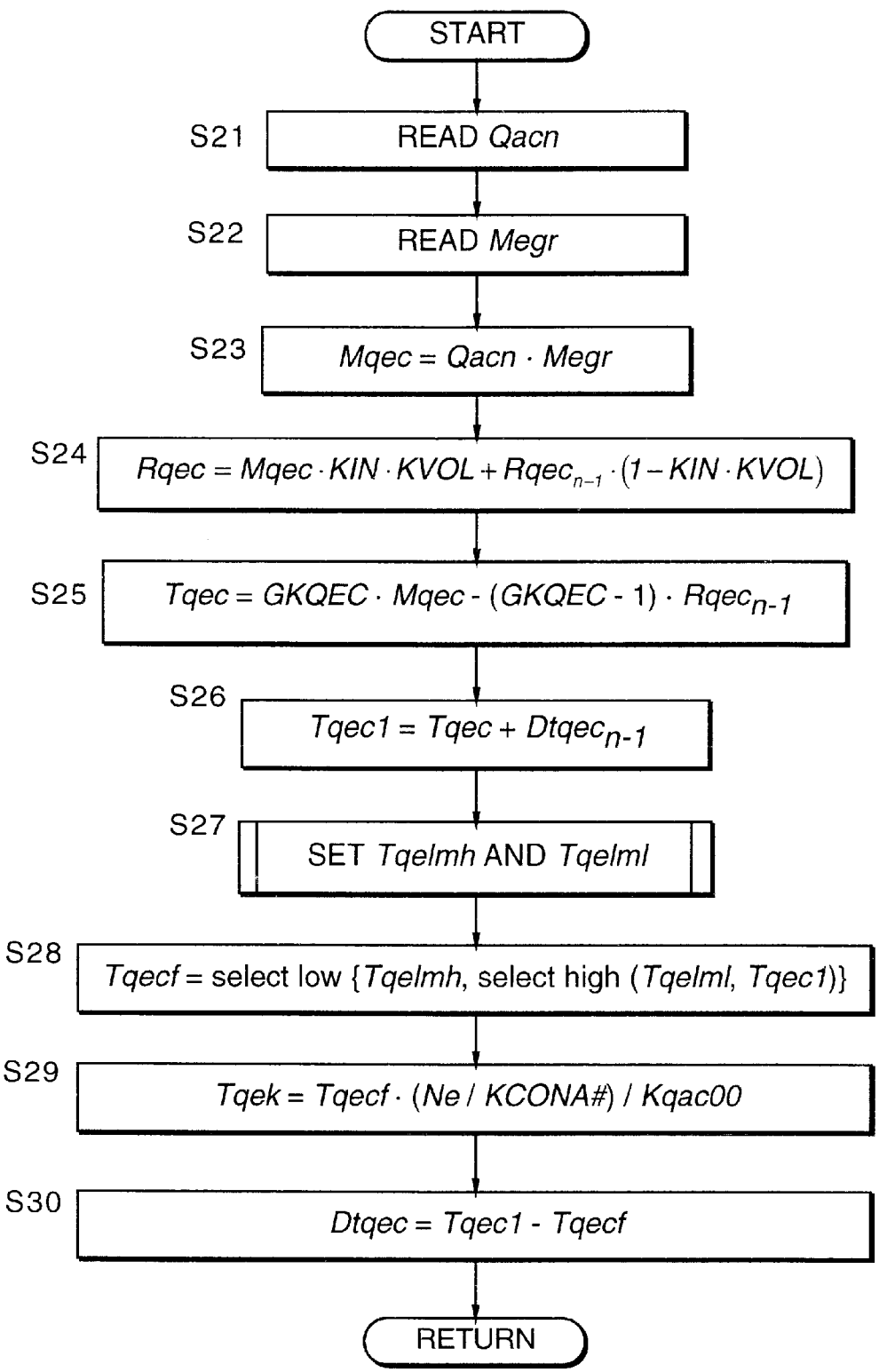
FIG. 7 is a flowchart describing a routine for calculating a target EGR amount Tqek per cylinder performed by the controller.

First, in a step S11, the control unit 41 calculates a target EGR amount Tqec of the EGR valve 6 using a subroutine shown in FIG. 7.

Referring to FIG. 7, in a step S21, the control unit 41 reads the intake air amount $Qac_n$ per cylinder at the inlet of the collector 3A; $Qac_n$ is a value calculated in the above-mentioned step S33 of FIG. 8.

In a following step S22, the target EGR rate Megr is read. The target EGR rate Megr is a value calculated by the routine of FIG. 11.

In a next step S23, a required EGR amount Mqec is calculated by the following equation (17). The required EGR amount Mqec is also an amount per cylinder.

$$Mqec=Qac_n \cdot Megr \quad (17)$$

In a next step S24, delay processing is performed on the required EGR amount Mqec by the following equation (18), using the time constant equivalent value Kkin calculated by the routine of FIG. 18, to convert it to an intermediate value Rqec corresponding to the required EGR amount per cylinder in the intake valve position of the diesel engine 1. The delay processing corresponds to the response delay of the negative pressure control valve 5 and the EGR valve 6.

$$Rqec=Mqec \cdot Kkin+Rqec_{n-1} \cdot (1-Kkin) \quad (18)$$

where, $RQec_{n-1}$=Rqec calculated on the immediately preceding occasion the subroutine was executed.

In a step S25, the target EGR amount Tqec per cylinder in the position of the EGR valve 6 is calculated by performing advance processing by the following equation (19) using the intermediate value Rqec and the required EGR amount Mqec. This advance processing compensates the delay of the variation of EGR amount due to the time required for the exhaust gas to travel from the EGR valve 6 to the intake valve of the diesel engine 1 via the collector 3A.

$$Tqec=Mqec \cdot GKQEC+Rqec_{n-1} \cdot (1-GKQEC) \quad (19)$$

where, GKQEC=advance correction gain.

In a next step S26, the added value Tqec1 is calculated by the following equation (20).

$$Tqec1=Tqec+Dtqec_{n-1} \quad (20)$$

where, $Dtqec_{n-1}$=excess/deficiency amount Dtqec calculated on the immediately preceding occasion the subroutine was executed.

The excess/deficiency amount Dtqec is the value explained in the aforesaid processing of (A)–(F). Herein, the value calculated on the immediately preceding occasion the subroutine of FIG. 7 was executed is used. The calculation of the excess/deficiency amount Dtqec will be described later.

Figure 65:
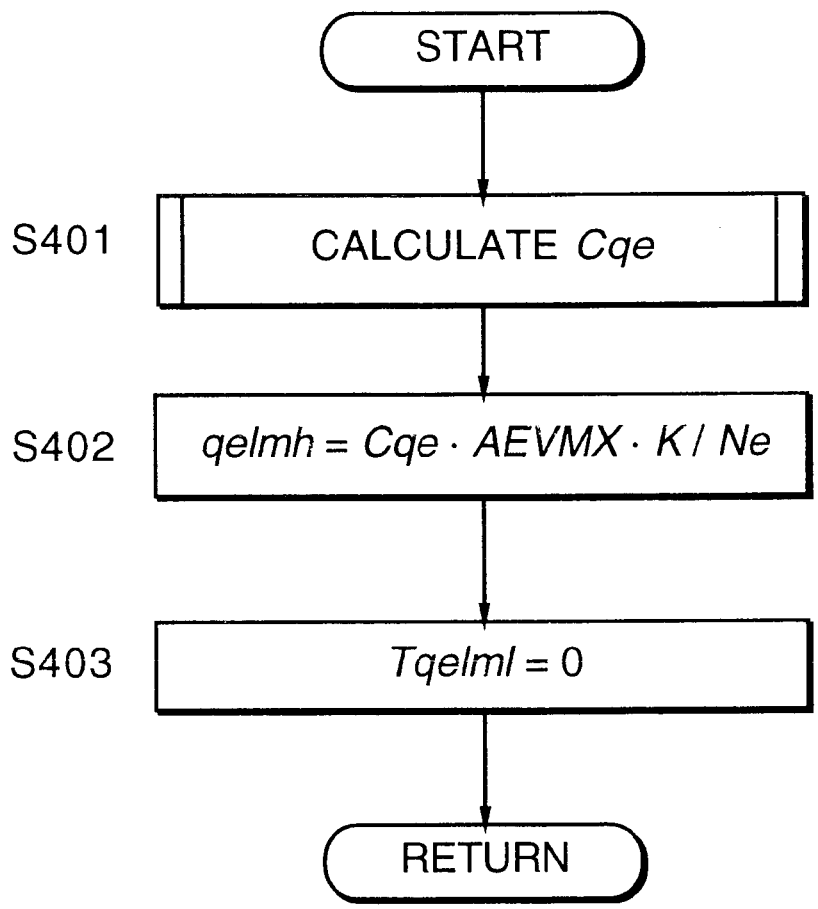
FIG. 65 is a flowchart describing a routine for setting a physical limiter performed by the control unit.

In a next step S27, the control unit 41 sets the physical upper limit Tqelmh and the physical lower limit Tqelml by a subroutine shown in FIG. 65.

Figure 63:
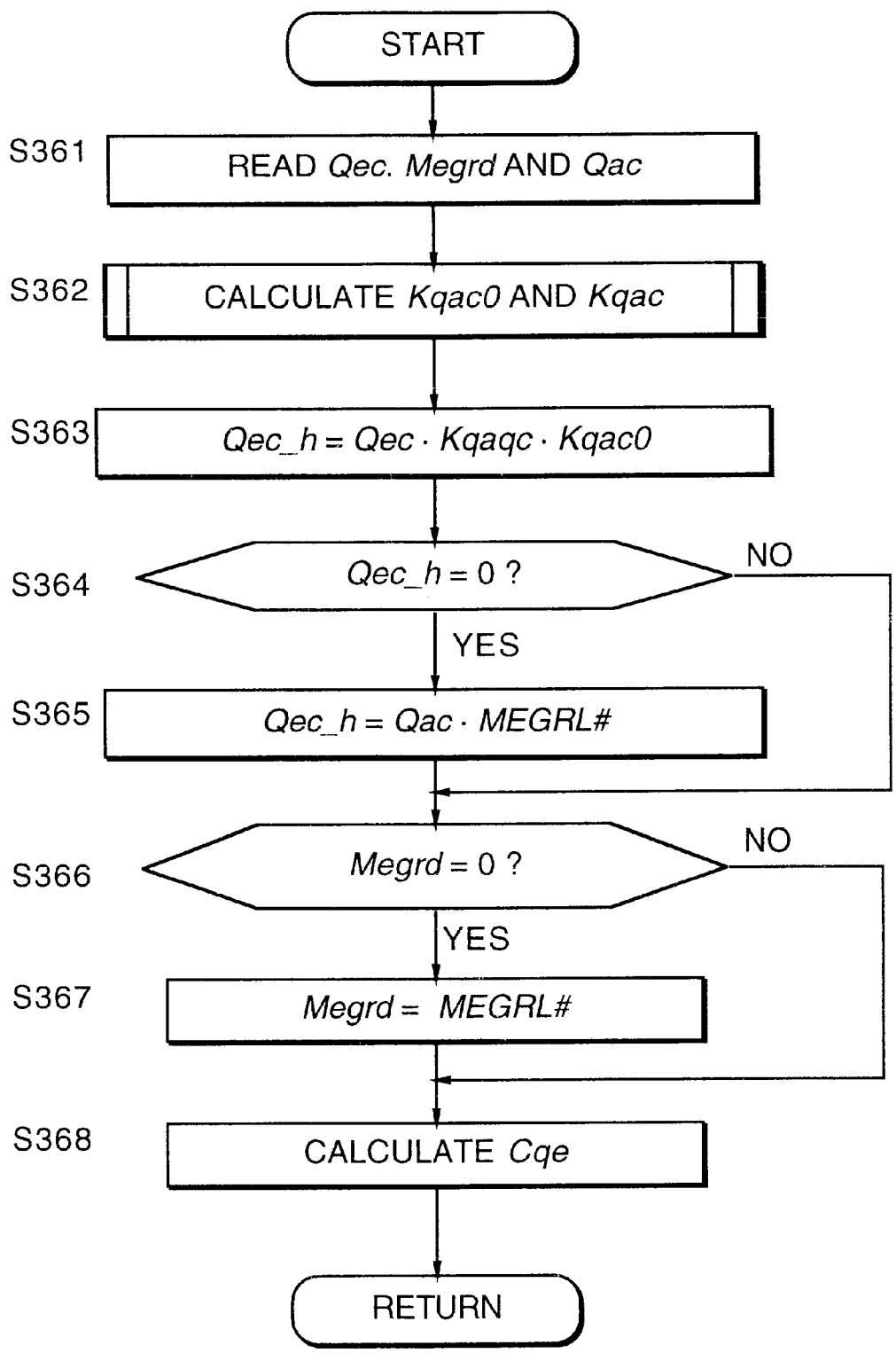
FIG. 63 is a flowchart describing a routine for calculating an EGR valve flow velocity Cqe performed by the control unit.

Referring to FIG. 65, in a step S401, the control unit 41 calculates the EGR valve flow velocity Cqe (m/sec) by a subroutine shown in FIG. 63. This calculation will firstly be described.

Referring to FIG. 63, in a step S361, the control unit 41 reads the real EGR amount Qec, real EGR rate Megrd and cylinder intake fresh air amount Qac.

Figure 50:
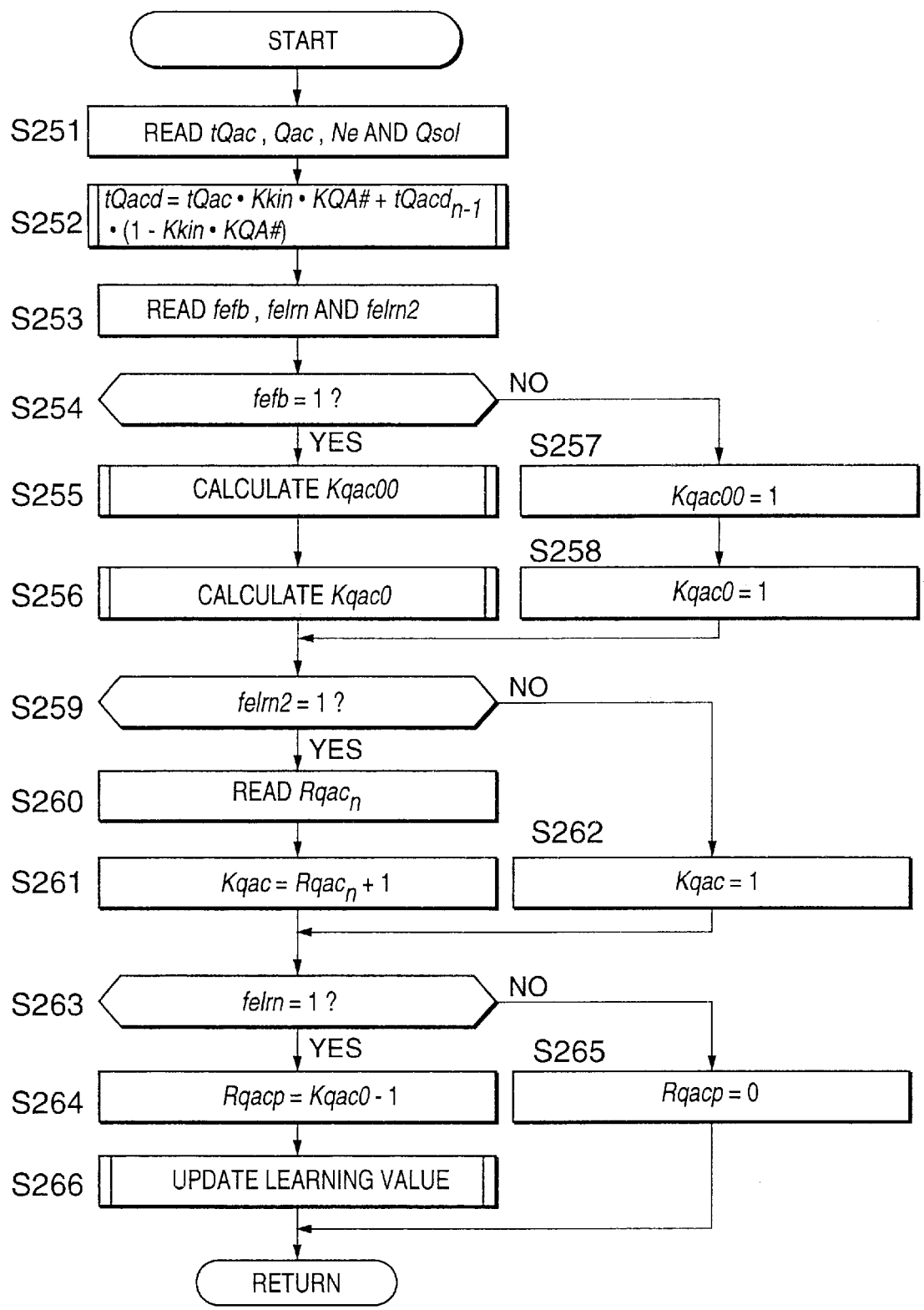
FIG. 50 is a flowchart describing a subroutine for calculating an EGR amount feedback correction coefficients Kqac00, an EGR flow velocity feedback correction coefficientKqac0, and an EGR flow velocity learning correction coefficient Kqac, performed by the control unit.

In a step S362, by a subroutine shown in FIG. 50, an EGR flow velocity feedback correction coefficient Kqac0, EGR flow velocity learning correction coefficient Kqac are calculated.

Referring to FIG. 50, in a step S251, the control unit 41 first reads the target intake fresh air amount tQac, cylinder intake fresh air amount Qac, engine rotation speed Ne and target fuel injection amount Qsol.

Figure 8:
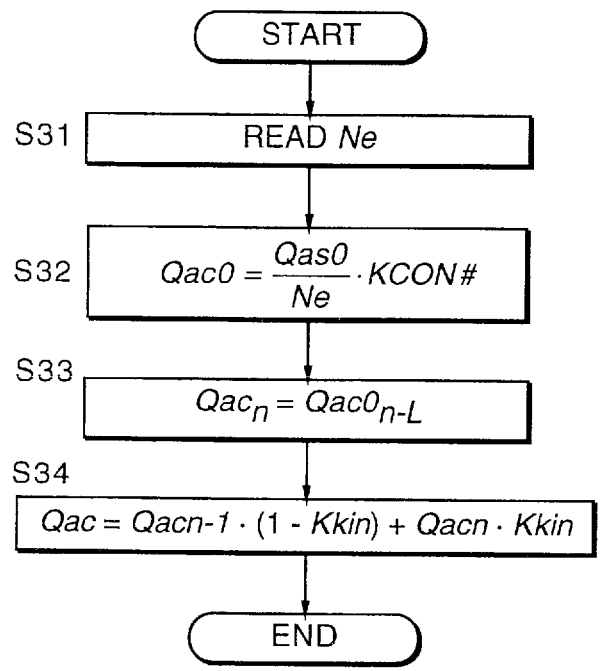
FIG. 8 is a flowchart describing a routine for calculating a cylinder intake fresh air amount Qac performed by the controller.

In a step S252, a delay processing value tQacd of the target intake fresh air amount tQac is calculated using the following equation (21), from the target intake fresh air amount tQac and the time constant equivalent value Kkin calculated by the routine of FIG. 8. This value corresponds to the target intake air amount in the intake valve position of the diesel engine 1.

$$tQacd=tQac \cdot Kkin \cdot KQA\#+tQacd_{n-1} \cdot (1-Kkin \cdot KQA\#) \quad (21)$$

where,

KQA#=constant, and $tQacd_{n-1}$=tQacd calculated on the immediately preceding occasion when the subroutine was executed.

In a following step S253, a feedback permission flag fefb, a learning permission flag felrn and a learning value reflection permission flag felrn2 which are related to the control of the EGR valve opening are read.

Figure 51:
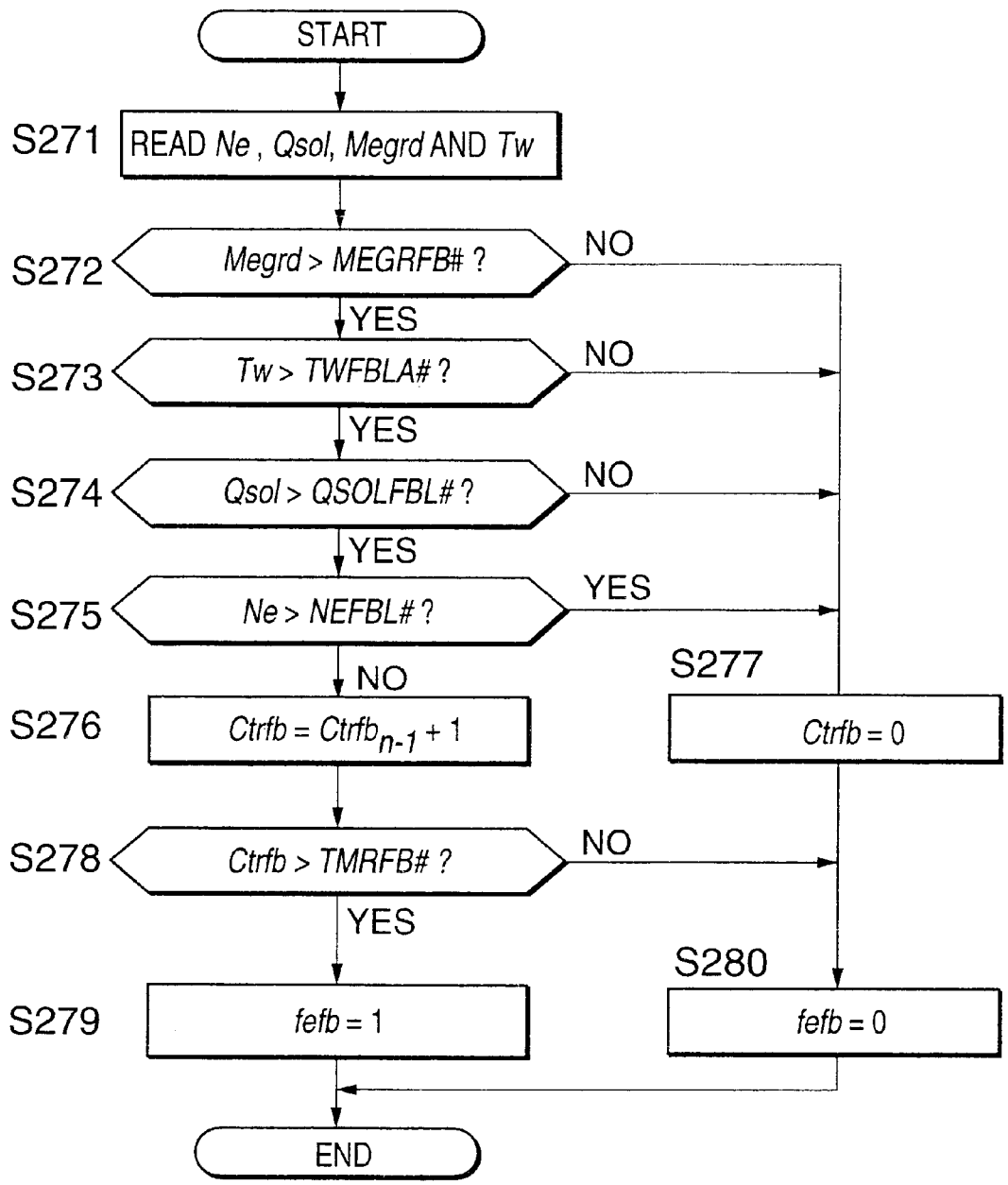
FIG. 51 is a flowchart describing a routine for setting a feedback permission flag fefb performed by the control unit.
Figure 52:
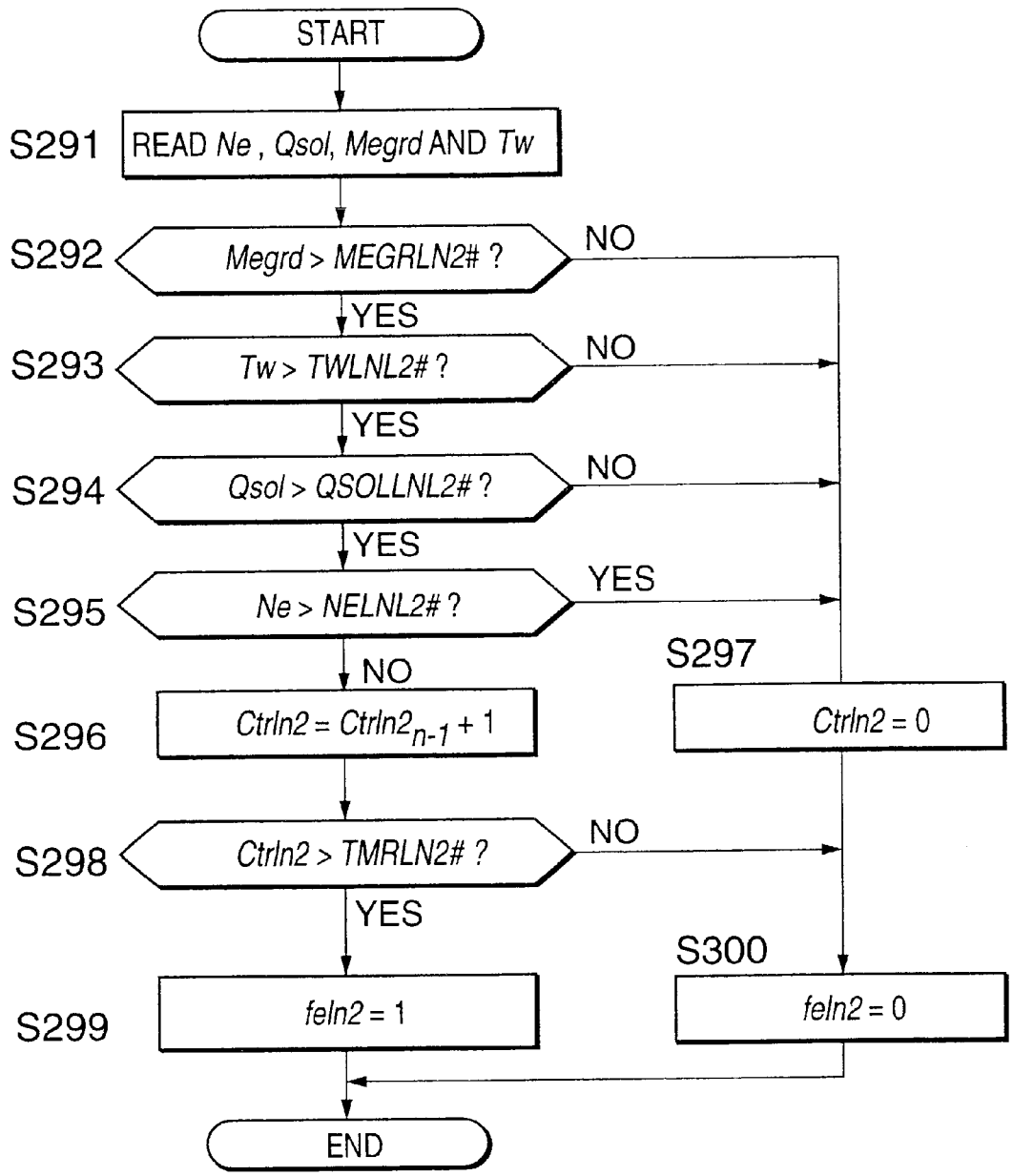
FIG. 52 is a flowchart describing a routine for setting a learning value reflection permission flag felrn2 performed by the control unit.
Figure 53:
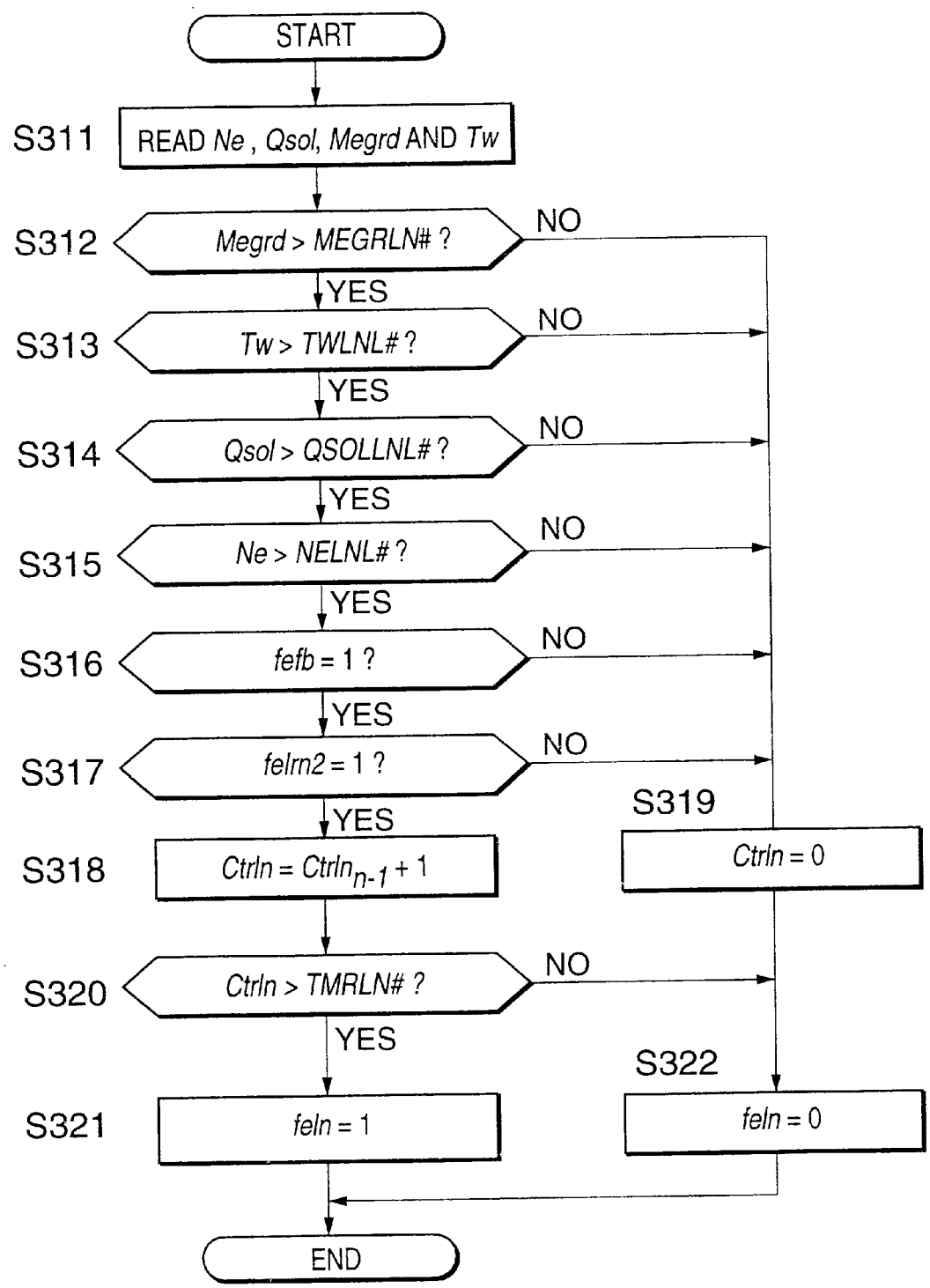
FIG. 53 is a flowchart describing a routine for setting a learning permission flag felrn performed by the control unit.

These flags are set by the independent routines shown in FIG. 51, FIG. 52 and FIG. 53, respectively.

FIG. 51 shows the routine for setting the feedback permission flag fefb. This routine is performed at an interval of 10 milliseconds.

Referring to FIG. 51, firstly in a step S271, the control unit 41 reads the engine rotation speed Ne, target fuel injection amount Qsol, real EGR rate Megrd and water temperature Tw.

In subsequent steps S272–S275, the EGR amount feedback control conditions are determined.

In the step S272, it is determined whether or not the real EGR rate Megrd exceeds a predetermined value MEGRFB#. The predetermined value MEGRFB# is a value for checking that exhaust gas recirculation is actually performed. In the step S273, it is determined whether or not the cooling water temperature Tw exceeds a predetermined value TWFBL#. The predetermined value TwFBL# is set to 30° C. In a step S274, it is determined whether or not the target fuel injection amount Qsol exceeds a predetermined value QSOLFBL#.

The predetermined value QSOLFBL# is a value for checking that the diesel engine 1 is not in a fuel cut state. In a step S275, it is determined whether or not the engine rotation speed Ne exceeds a predetermined value NeFBL#. The predetermined value NeFBL# is a value for checking that the vehicle is not in a low-speed region where the diesel engine 1 stops rotation.

When all of the conditions of step S272–S275 are satisfied, the subroutine proceeds to a step S276 and increments a timer value Ctrfb.

In a following step S278, it is determined whether or not the timer value Ctrfb is greater than a predetermined value TMRFB#. The predetermined value TMRFB# is set to, for example, a value less than 1 second. When the result of this determination is affirmative, the subroutine sets the feedback permission flag fefb to 1 in a step S279, and the subroutine is terminated. On the other hand, if any of the conditions of the steps S272–S275 is not satisfied, in a step S277, the subroutine resets the timer value Ctrfb to 0, and proceeds to a following step S280.

When the determination of the step S278 is negative, the subroutine also proceeds to the step S280.

In the step S280, the feedback permission flag fefb is reset to 0 and the subroutine is terminated.

According to this subroutine, the feedback permission flag fefb is set to 1 only when the state where all of the conditions of the steps S272–S275 were satisfied, continues for a time exceeding the predetermined value TMRFB#, and in other cases, the feedback permission flag fefb is reset to 0.

FIG. 52 shows a routine for setting the learning value reflection permission flag felrn2. This routine is also performed at an interval of 10 milliseconds.

Referring to FIG. 52, firstly in a step S291, the control unit 41 reads the engine rotation speed Ne, target fuel injection amount Qsol, real EGR rate Megrd and cooling water temperature Tw.

In subsequent steps S292–S295, EGR amount learning value reflection conditions are determined.

In the step S292, it is determined whether or not the real EGR rate Megrd exceeds a predetermined value MEGRLN2#. The predetermined value MEGRLN2# is a value for checking that exhaust gas recirculation is actually performed. In the step S293, it is determined whether or not the cooling water temperature Tw exceeds a predetermined value TwLNL2#. The predetermined value TwLNL2# is set to 20° C. In the step S294, it is determined whether or not the target fuel injection amount Qsol exceeds a predetermined value QSOLLNL2#. The predetermined value QSOLLNL2# is a value for checking that the diesel engine 1 is not in a fuel cut state. In the step S295, it is determined whether or not the engine rotation speed Ne exceeds a predetermined value NeLNL2#. The predetermined value NeLNL2# is a value for checking that the vehicle is not in a low-speed region where the diesel engine 1 stops rotation.

Only when all of the conditions of step S292–S295 are satisfied, the subroutine proceeds to a step S296 and increments a timer value Ctrln2.

In the following step S298 it is determined whether or not the timer value Ctrln2 exceeds a predetermined value TMRLN2#. The predetermined value TMRLN2# is set to 0.5 seconds. When the result of this determination is affirmative, the subroutine sets the learning value reflection permission flag felrn2 to 1 in a step S299, and the subroutine is terminated.

On the other hand, when any of the conditions of the steps S292–S295 is not satisfied, in a step S297, the subroutine resets the timer value Ctrln2 to 0, and proceeds to a following step S300. When the determination of the step S298 is negative, the subroutine also proceeds to the step S300.

In the step S300, the learning value reflection permission flag felrn2 is reset to 0 and the subroutine is terminated.

FIG. 53 shows the routine for setting the learning permission flag felrn. This routine is also performed at an interval of 10 milliseconds.

Referring to FIG. 53, firstly in a step S311, the control unit 41 reads the engine rotation speed Ne, target fuel injection amount Qsol, real EGR rate Megrd, and water temperature Tw.

In subsequent steps S312–S317, the EGR amount learning permission conditions are determined.

In the step S312, it is determined whether or not the real EGR rate Megrd exceeds a predetermined value MEGRLN#. The predetermined value MEGRLN# is a value for checking that exhaust gas recirculation is actually performed. In the step S313, it is determined whether or not the cooling water temperature Tw exceeds a predetermined value TwLNL#. The predetermined value TwLNL# is set to 70–80° C. In the step S314, it is determined whether or not the target fuel injection amount Qsol exceeds a predetermined value QSOLLNL#. The predetermined value QSOLLNL# is a value for checking that the diesel engine 1 is not in a fuel cut state. In the step S315, it is determined whether or not the engine rotation speed Ne exceeds a predetermined value NeLNL#. The predetermined value NeLNL# is a value for checking that the vehicle is not in a low-speed region where the diesel engine 1 stops rotation. In the step S316, it is determined whether or not the feedback permission flag fefb is 1. In the step S317, it is determined whether or not the learning value reflection permission flag felrn2 is 1.

Only when all of the conditions of the steps S2312–S317 are satisfied, the subroutine proceeds to a step S318 and increments a timer value Ctrln.

In a following step S320, it is determined whether or not the timer value Ctrln exceeds a predetermined value TMRLN#. The predetermined value TMRLN# is set to 4 seconds. When the result of this determination is affirmative, the subroutine sets the learning permission flag felrn to 1 in a step S321, and the subroutine is terminated. On the other hand, if any of the conditions of the steps S312–S317 are not satisfied, in a step S319, the subroutine resets the timer value Ctrln to 0, and proceeds to a following step S322. The subroutine also proceeds to the step S322 when the determination of the step S320 is negative. In the step S322, the learning permission flag felrn is reset to 0, and the subroutine is terminated.

Referring again to FIG. 50, after reading this feedback permission flag fefb, learning value reflection permission flag felrn2 and learning permission flag felrn, in a step S254, the control unit 41 determines whether or not the feedback permission flag fefb is 1.

When the feedback permission flag fefb is 1, after calculating the feedback correction coefficient Kqac00 of the EGR amount in a step S255, and the feedback correction coefficient Kqac0 of the EGR valve flow velocity Cqe in a step S256, the control unit 41 proceeds to a step S259.

On the other hand, when the feedback permission flag fefb is not 1 in the step S254, the control unit 41 sets the feedback correction coefficient Kqac00 of the EGR amount to 1 in a step S257, sets the feedback correction coefficient Kqac0 to 1 in a following step S258, and then proceeds to the step S259.

Now, the calculation of the feedback correction coefficient Kqac00 of the EGR amount performed in the step S255 and the calculation of the feedback correction coefficient Kqac0 of the EGR velocity performed in the step S256, will be described.

Figure 54:
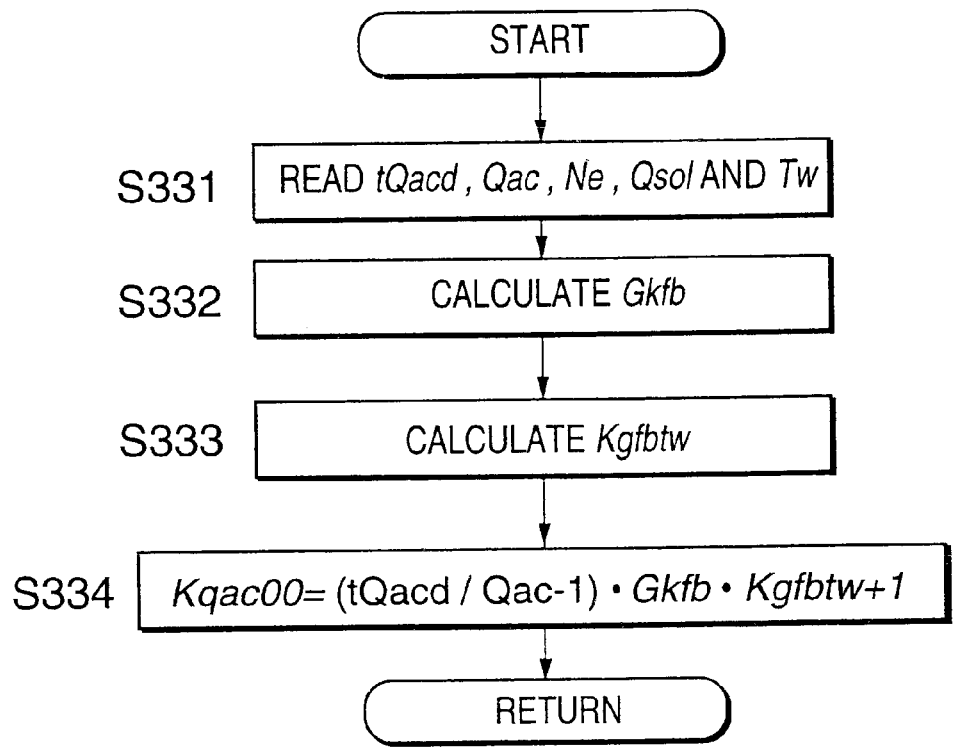
FIG. 54 is a flowchart describing a routine for calculating the EGR amount feedback correction coefficient Kqac00 performed by the control unit.

The calculation of the feedback correction coefficient Kqac00 of the EGR amount is performed by a subroutine of FIG. 54.

Referring to FIG. 54, in a step S331, the control unit 41 first reads the delay processing value tQacd of the target intake air amount, cylinder intake fresh air amount Qac, engine rotation speed Ne, target fuel injection amount Qsol and the cooling water temperature Tw. The delay processing value tQacd is a value calculated in the step S252 of FIG. 50.

Figure 55:
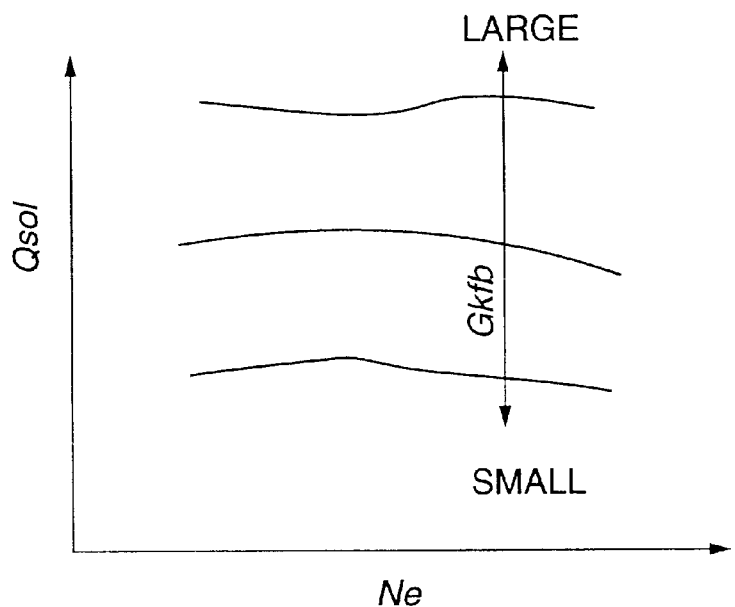
FIG. 55 is a diagram describing the contents of a map of a correction gain Gkfb of an EGR flowrate stored by the control unit.
Figure 56:
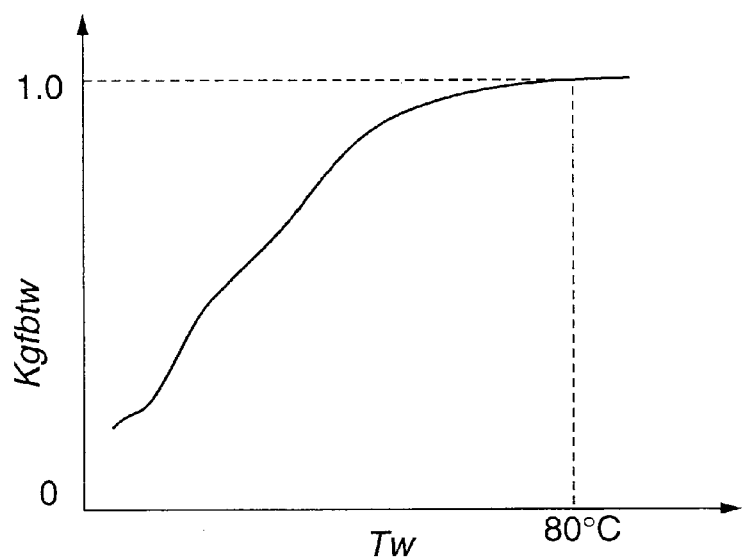
FIG. 56 is a diagram describing the contents of a map of a water temperature correction coefficient KgfbTw stored by the control unit

In a step S332, a correction gain Gkfb of the EGR flowrate is calculated by looking up a map shown in FIG. 55 previously stored in the memory of the control unit 41, based on the engine rotation speed Ne and the target fuel injection amount Osol. In a following step S333, a water temperature correction coefficient KgfbTw of the correction gain is calculated by looking up a map shown in FIG. 56 previously stored in the memory of the control unit 41, based on the cooling water temperature Tw.

In a final step S334, the feedback correction coefficient Kqac00 of the EGR amount is calculated by the following equation (22), using the correction gain Gkfb and the water temperature correction coefficient KgfbTw.

$$Kqac00 = (tQacd/Qac - 1) \cdot Gkfb \cdot Kgfbtw + 1 \qquad (22)$$

(tQacd/Qac−1), the first term on the right hand side of equation (22), is an error ratio of the target intake air amount delay processing value tQacd relative to the cylinder intake fresh air amount Qac. Therefore, the feedback correction coefficient Kqac00 of the EGR amount is a value centered on 1.

Figure 57:
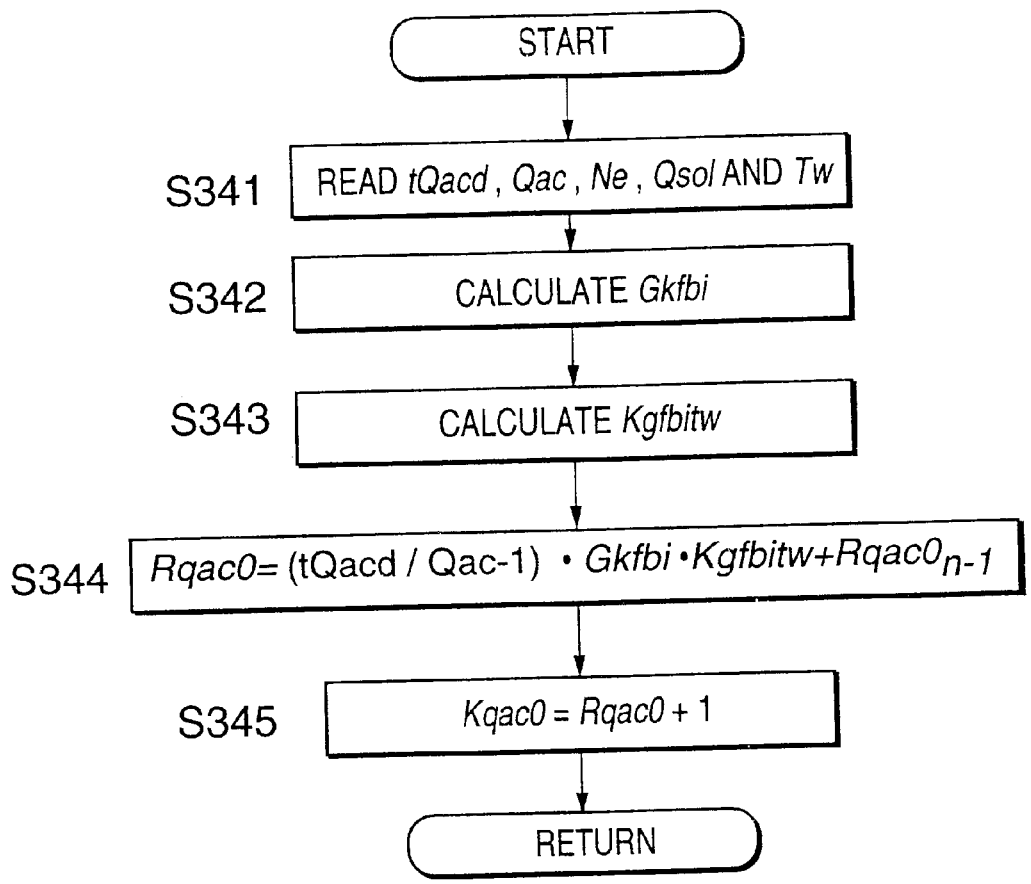
FIG. 57 is a flowchart describing a routine for calculating the EGR flow velocity feedback correction coefficient Kqac0 performed by the control unit.

The calculation of the feedback correction coefficient Kqac0 of the EGR valve flow velocity is performed by a subroutine shown in FIG. 57.

Referring to FIG. 57, in a step S341, the control unit 41 first reads the delay processing value tQacd, cylinder intake fresh air amount Qac, engine rotation speed Ne, target fuel injection amount Qsol and the cooling water temperature Tw.

Figure 58:
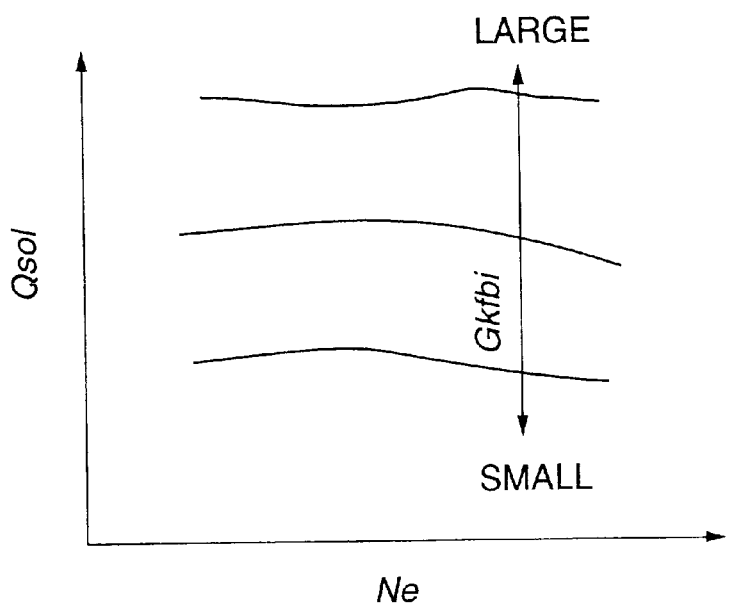
FIG. 58 is a diagram describing the contents of a map of a correction gain Gkfbi of the EGR flow velocity stored by the control unit.

In a step S342, a correction gain Gkfbi of the EGR valve flow velocity is calculated by looking up a map shown in FIG. 58 previously stored in the memory of the control unit 41, based on the engine rotation speed Ne and the fuel injection amount Qsol.

Figure 59:
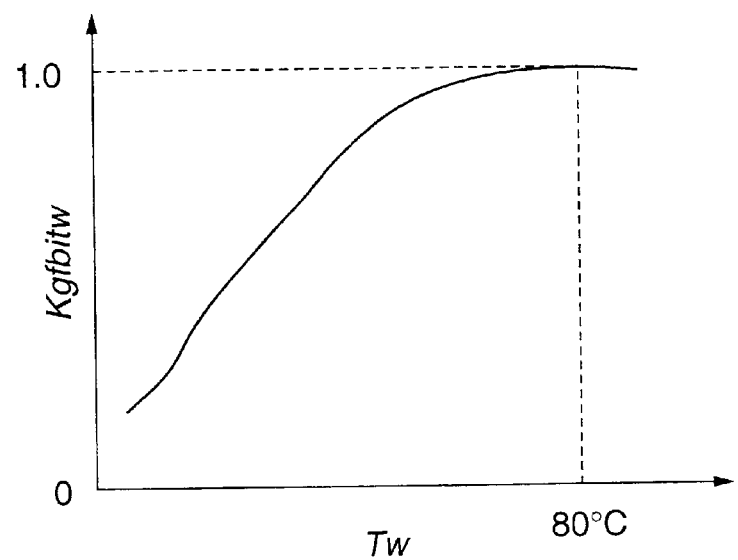
FIG. 59 is a diagram describing the contents of a map of a water temperature correction coefficient KgfbiTw stored by the control unit.

In a step S343, a water temperature correction coefficient KgfbiTw of the correction gain is calculated by looking up a map shown in FIG. 59 previously stored in the memory of the control unit 41, based on the cooling water temperature Tw.

In a following step S344, an error ratio Rqac0 is calculated by the following equation (23), using the correction gain Gkfbi and the water temperature correction coefficient KgfbiTw.

$$Rqac0 = (tQacd/Qac - 1) \cdot Gkfbi \cdot Kgfbitw + Rqac0_{n-1} \qquad (23)$$

where, $Rqac0_{n-1}$=Rqac0 calculated on the immediately preceding occasion the subroutine was executed.

In a following step S345, by adding 1 to the error ratio Rqac0, the EGR flow velocity feedback correction coefficient Kqac0 is calculated. Therefore, the feedback correction coefficient Kqac0 of the EGR valve flow velocity is a value proportional to the integral of the error ratio.

Now, referring again to FIG. 50, after setting the feedback correction coefficient Kqac00 of the EGR amount and the feedback correction coefficient Kqac0 of the EGR valve flow velocity, in the step S259, the control unit 41 determines whether or not the learning value reflection permission flag felrn2 is 1.

Figures 60, 61:
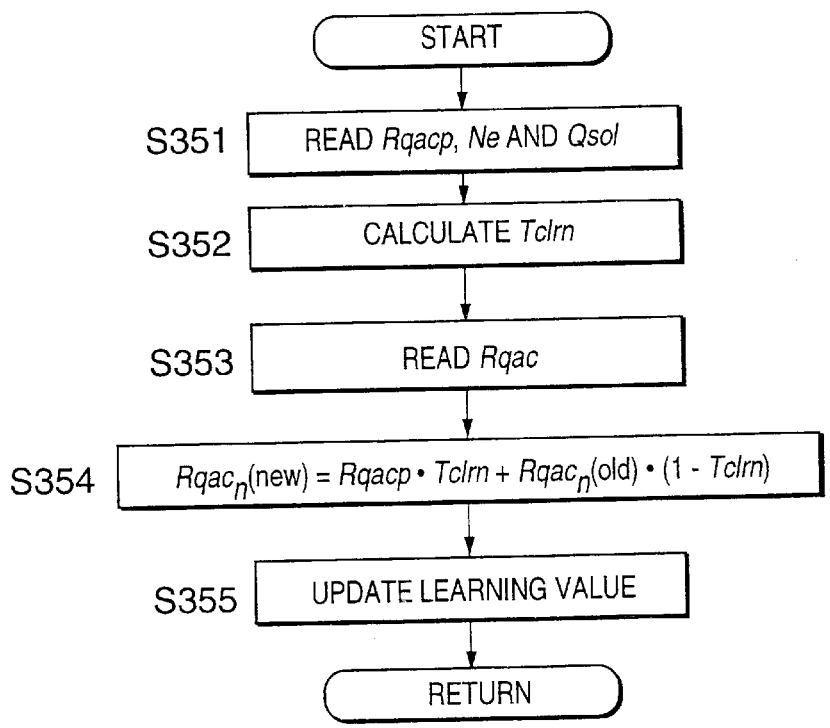
FIG. 60 is a diagram describing the contents of a map of an error rate learning value $Rqac_n$ stored by the control unit.
FIG. 61 is a flowchart describing a routine for updating a learning value performed by the control unit.

When the learning value reflection permission flag felrn2 is 1, i.e., when reflection in EGR amount control of the learning value is permitted, in a step S260, the control unit 41 reads the error ratio learning value $Rqac_n$ by looking up a map shown in FIG. 60 previously stored in the memory of the control unit 41, based on the engine rotation speed Ne and the target fuel injection amount Qsol. In a next step S261, the EGR flow velocity learning correction coefficient Kqac is calculated by adding 1 to the error ratio learning value $Rqac_n$.

When the learning value reflection permission flag felrn2 is not 1 in the step S259, the control unit 41 sets the EGR flow velocity learning correction coefficient Kqac to 1 in a step S262.

After the processing of the step S261 or step S262, in a step S263, the control unit 41 determines whether or not the learning permission flag felrn is 1.

When the learning permission flag felrn is 1, in a step S264, the control unit 41 subtracts 1 from the EGR flow velocity feedback correction coefficient Kqac0 to calculate the current value Rqacp of the error ratio. In a following step S266, the learning value is updated using the subroutine of FIG. 61, and the subroutine is terminated.

When the learning permission flag felrn is not 1, in a step S265, the control unit 41 resets the current value Rqacp of the error ratio to 0, and terminates the subroutine of FIG. 50.

Next, the updating of the learning value performed in the step S266 will be described.

Referring to FIG. 61, in a step S351, the control unit 41 first reads the engine rotation speed Ne, target fuel injection amount Qsol and error ratio Rqacp calculated in the step S264.

Figure 62:
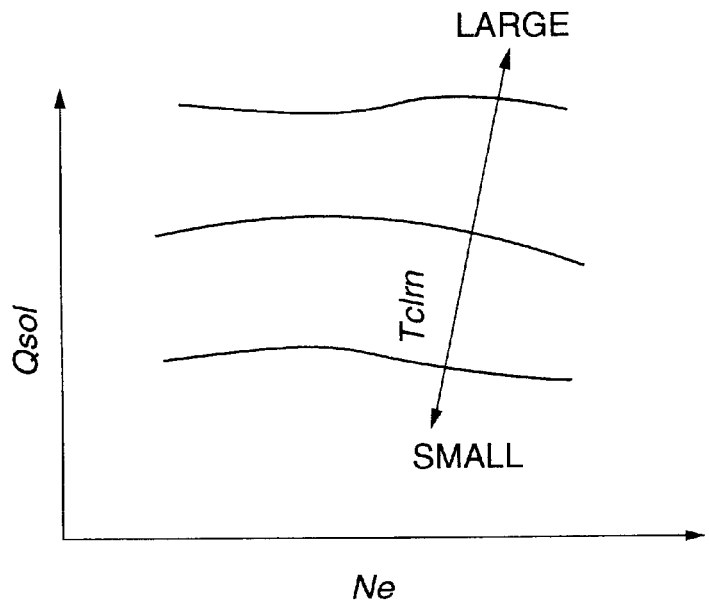
FIG. 62 is a diagram describing the contents of a map of a learning rate Tclrn stored by the control unit.

In a step S352, a learning rate Tclrn is calculated by looking up a map shown in FIG. 62 previously stored in the memory of the control unit 41, based on the engine rotation speed Ne and target fuel injection amount Qsol.

In a step S353, the error ratio learning value $Rqac_n$ is calculated by looking up the aforesaid map of FIG. 60, based on the engine rotation speed Ne and target fuel injection amount Qsol.

In a following step S354, weighted average processing by the following formula (24) is added to the error ratio Rqacp read in the step S351, and updating of the error ratio learning value is performed.

$$Rqac_n(\text{new}) = Rqacp \cdot Tclrn + Rqac_n(\text{old}) \cdot (1 - Tclrn) \qquad (24)$$

where, $Rqac_n$(new)=error ratio learning value $Rqac_n$ to be written on the map, Rqacp=error ratio read in the step S351, and $Rqac_n$(old)=error ratio learning value $Rqac_n$ read from the map in the step S353.

In a next step S355, the stored value of the map of FIG. 60 is overwritten using the error ratio learning value $Rqac_n$ (new) calculated in this way.

By terminating the subroutine of FIG. 61, the control unit 41 terminates the processing of the subroutine of FIG. 50.

Referring again to FIG. 63, the control unit 41 calculates in a step S363 a corrected real EGR amount Qec_h by the following equation (25) using the EGR flow velocity feedback correction coefficient Kqac0 and EGR flow velocity learning correction coefficient Kqac calculated in the step S362.

$$Qec\_h = Qec \cdot Kqac \cdot Kqac0 \qquad (25)$$

In steps S364–S367, an initial value of the corrected real EGR amount Qec_h when EGR operation begins, is set. In the step S364, it is determined whether or not the corrected real EGR amount Qec_h is 0. When Qec_h is 0, i.e. when EGR is not operating, the corrected real EGR amount Qec_h is set by the following equation (26) in a step S365, and the routine proceeds to a step S366. When the corrected real EGR amount is not 0 in the step S364, the routine bypasses the step S365 and proceeds to the step S366.

$$Qec\_h = Qac \cdot MEGRL\# \tag{26}$$

where, MEGRL#=constant.

In the step S366, it is determined whether or not the real EGR rate Megrd is 0. When the real EGR rate Megrd is 0, the real EGR rate Megrd is set equal to the constant MEGRL# in the step S367, and the routine proceeds to a step S368. When the real EGR rate Megrd is not 0, the routine bypasses the step S367 and proceeds to the step S368.

When the EGR valve 6 is fully closed, the EGR valve flow velocity of the EGR valve 6 is 0, and equations (25) and (26) are equations for setting the initial value of parameters used for flow velocity calculations when EGR operation starts, i.e., when the EGR valve 6 begins to open. The constant MEGRL# may be set to, for example, 0.5.

The differential pressure upstream and downstream of the EGR valve 6 when EGR operation starts is different according to the running conditions of the diesel engine 1, and as a result, the EGR valve flow velocity when EGR operation starts also differs. The differential pressure upstream and downstream of the EGR valve 6 when the EGR valve 6 begins to open, depends on the cylinder intake fresh air amount Qac. Thus, the calculation precision of the EGR valve flow velocity when EGR operation starts, can be improved by making the initial value of Qec_h directly proportional to the cylinder intake fresh air amount Qac by equation (26).

Figure 64:
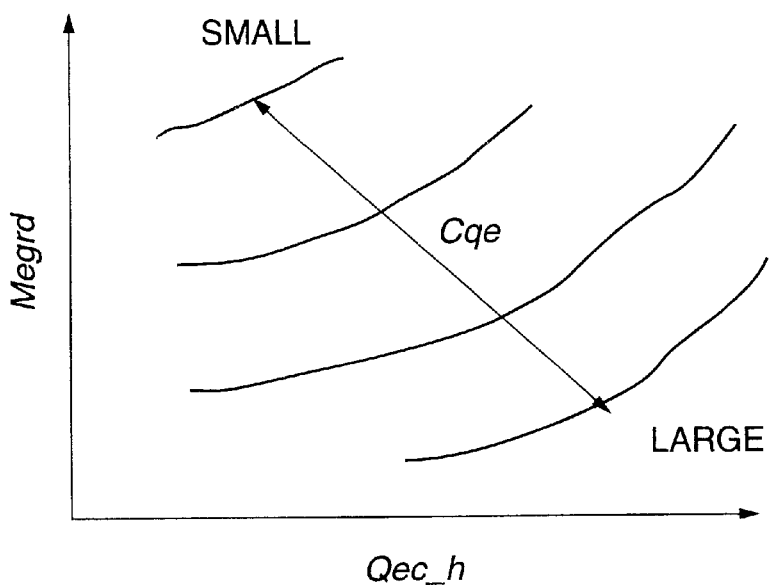
FIG. 64 is a diagram describing the contents of a map of the EGR valve flow velocity Cqe stored by the control unit.

Now, in the step S368, the control unit 41 calculates the EGR valve flow velocity Cqe by looking up a map shown in FIG. 64 which is previously stored in the memory of the control unit 41, based on the corrected real EGR amount Qec_h and real EGR rate Megrd, and the subroutine is terminated.

After calculating the EGR valve flow velocity Cqe, the control unit 41 calculates the physical upper limit Tqelmh by the following equation (27) in a step S402 of FIG. 65.

$$Tqelmh = Cqe \cdot AEVMX \cdot K/Ne \tag{27}$$

where,

AEVMX=EGR valve maximum opening area (m$^2$),

K=conversion coefficient, and

Ne=engine rotation speed.

The right-hand term of equation (27) represents a value obtained by converting the maximum flowrate (m$^3$/sec) of the EGR valve 6 per cylinder. The control unit 41 sets this equal to the physical upper limit Tqelmh. In other words, the physical upper limit Tqelmh is the maximum EGR amount per cylinder which can physically be reached.

In a next step S403, the physical lower limit Tqelml is set equal to zero and the subroutine is terminated. The physical lower limit Tqelml is the minimum EGR amount per cylinder which can physically be reached by the EGR valve 6. Normally, the EGR amount when the EGR valve 6 is fully closed is 0. The reason for setting the physical lower limit Tqelml despite this, is as follows.

In the case of an engine comprising a mechanism which aspirates exhaust gas normally remaining in an exhaust gas recirculation passage such as the collector 3A, or when conditions exist for making the exhaust gas flow in the reverse direction, it is conceivable that the minimum EGR amount per cylinder which can physically be reached would be a negative value.

Such conditions are satisfied for example in an engine comprising a mechanism provided with a diesel particulate filter in an EGR passage 4, wherein exhaust gas in an intake passage 3 is made to flow backwards into the EGR passage 4 under a sufficient turbocharging pressure, and particulates trapped in the filter are blown into the exhaust passage 2.

In the control unit 41, according to this invention, the step S403 which sets the physical lower limit is provided to deal with this type of case.

After these physical limits have been set by the subroutine of FIG. 65, the control unit 41 limits the added value Tqec1 by these physical limits in a step S28 of FIG. 7. Specifically, the larger of the added value Tqec1 and physical lower limit Tqelml is selected, and the smaller of the selected value and the physical upper limit Tqelmh is set as the limited target EGR amount Tqecf per cylinder.

In a following step S29, a target EGR amount Tqek is calculated by the following equation (28) using the limited target EGR amount Tqecf per cylinder, the EGR amount feedback correction coefficient Kqac00 calculated by the subroutine of FIG. 50 and the constant KCON# used in the routine of FIG. 8.

$$Tqek = Tqecf \cdot (Ne/KCON\#)/Kqac00 \tag{28}$$

where, Ne=engine rotation speed.

In a final step S30, the difference between the added value Tqec1 and the limited target EGR amount Tqecf per cylinder is calculated as the excess/deficiency amount Dtqec, and the subroutine is terminated. This value Dtqec is used as an immediately preceding value Dtqecn-1 of the excess/deficiency amount in a step S26 on the next occasion the subroutine is executed.

Figure 5:
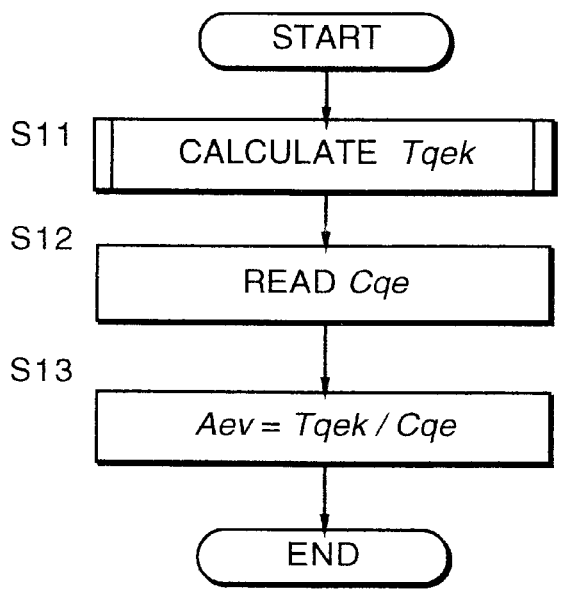
FIG. 5 is a flowchart describing a routine for calculating an EGR valve opening area Aev performed by the controller.

After the target EGR amount Tqek is calculated by the subroutine of FIG. 7, in a step S12 of FIG. 5, the control unit 41 reads the EGR flow velocity Cqe calculated in the subroutine of FIG. 63 described above.

In a next step S13, the target EGR valve opening area Aev is calculated by the following equation (29) using the target EGR amount Tqek and the EGR flow velocity Cqe.

$$Aev = Tqek/Cqe \tag{29}$$

Figure 6:
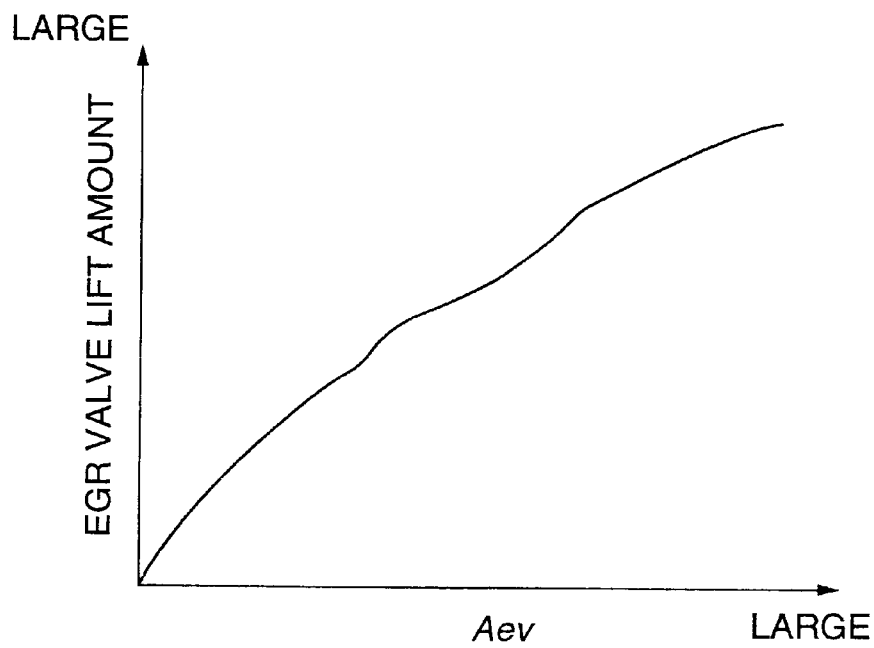
FIG. 6 is a diagram describing the contents of an EGR valve lift amount map stored by the controller.

The target EGR valve opening area Aev obtained is converted for example to a lift amount or a drive signal of the EGR valve 6 using the map of FIG. 6. Thus, by outputting a duty signal based on these parameters to the pressure control valve 5 which drives the EGR valve 6, the control unit 41 controls the opening of the EGR valve 6 to the target EGR valve opening area Aev.

Next, referring to FIG. 16, a second embodiment of this invention will be described relating to the pressure control of the turbocharger 50.

Figure 16:
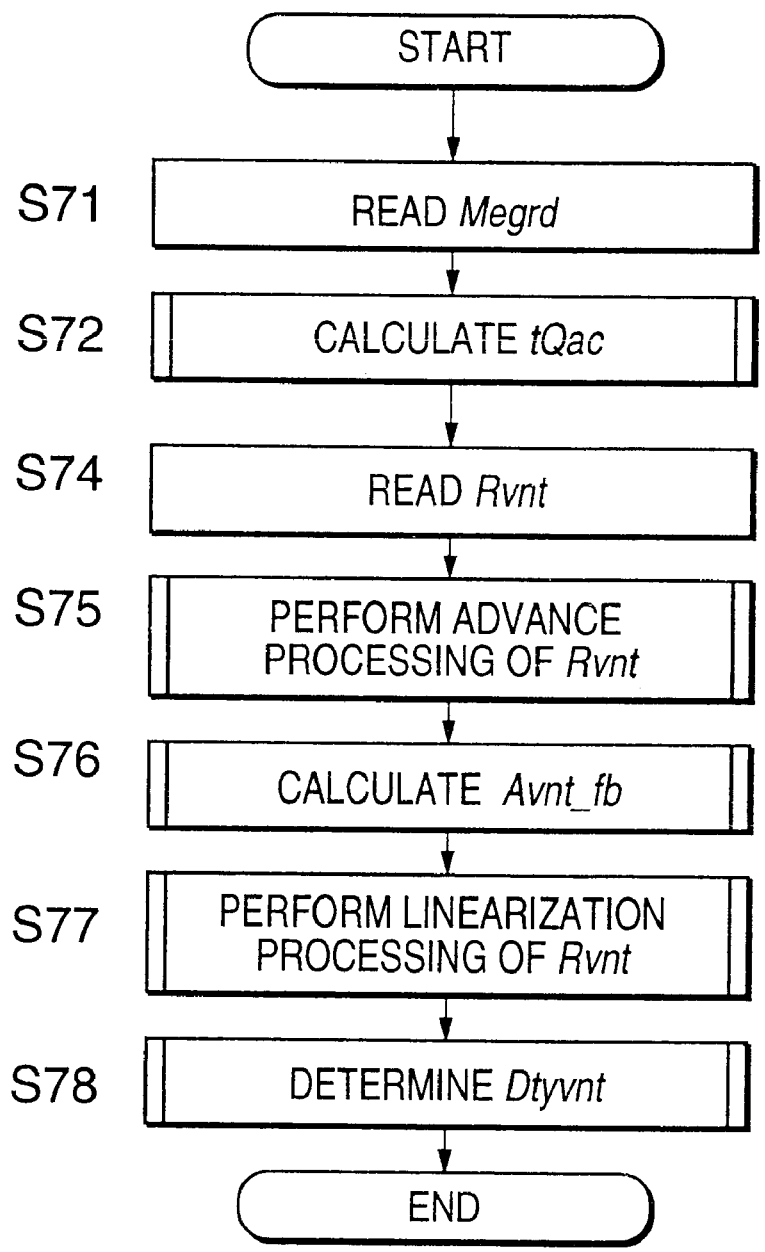
FIG. 16 is similar to FIG. 15, but showing a second embodiment of this invention.

According to this embodiment, a routine shown in FIG. 16 is used instead of the routine of FIG. 15 for calculating the duty value Dtyvnt of the pressure control valve of the turbocharger. As in the case of the routine of FIG. 15, the routine of FIG. 16 is also performed at an interval of 10 milliseconds.

In the routine of FIG. 15, the target opening Rvnt of the variable nozzle 53 was calculated based on the real EGR amount Qec, but in the routine of FIG. 16, the target opening Rvnt is calculated based on the real EGR rate Megrd.

Figure 27:
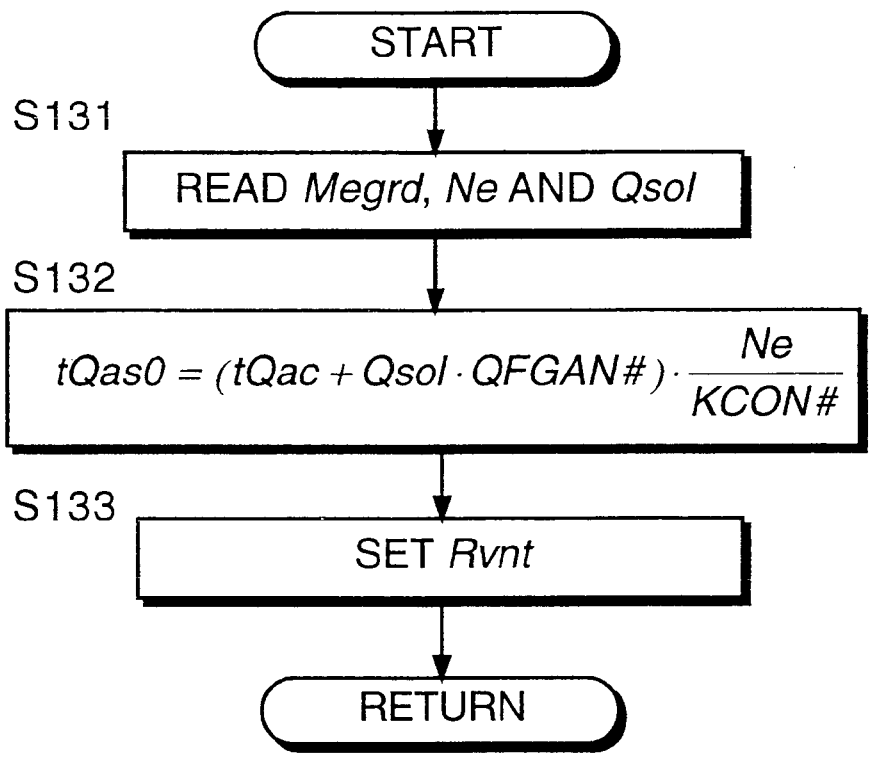
FIG. 27 is similar to FIG. 25, but showing the second embodiment of this invention.

Specifically, in the routine of FIG. 16, the processing of the step S73 of FIG. 15 which calculates the real EGR amount Qec, is omitted. At the same time, the routine shown in FIG. 27 is applied instead of the routine shown in FIG. 25 in the calculation of the target opening Rvnt of the variable nozzle 53. The remaining processing details are identical to those of the first embodiment.

Referring to FIG. 27, in a step S131, the control unit 41 reads the target intake fresh air amount tQac, real EGR rate Megrd, engine rotation speed Ne and target fuel injection amount Qsol.

In a step S132, an identical calculation is performed to that of the step S122 of FIG. 15, and the set intake fresh air amount equivalent value tQas0 is calculated.

Figure 28:
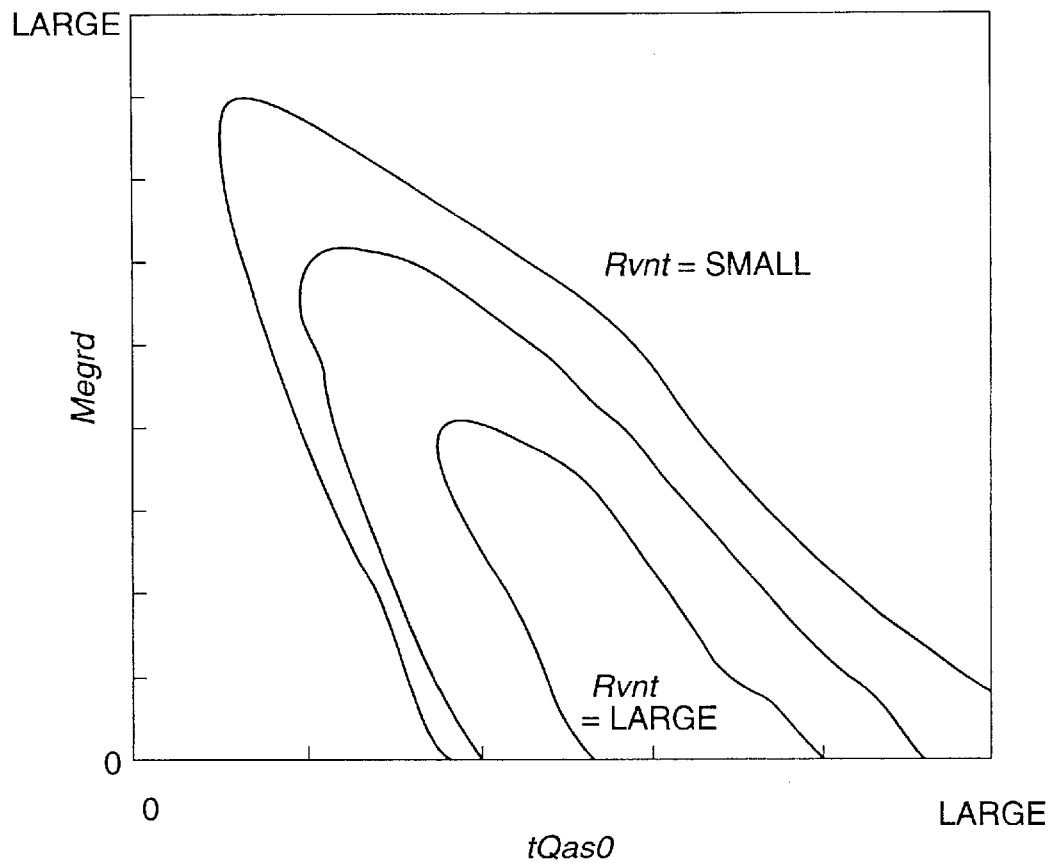
FIG. 28 is similar to FIG. 26, but showing the second embodiment of this invention.

In a step S133, the target opening Rvnt of the variable nozzle 53 is calculated by looking up a map shown in FIG. 28 previously stored in the memory of the control unit 41, based on the set intake fresh air amount equivalent value tQas0 and real EGR rate Megrd.

In the map of FIG. 26 of the first embodiment, the vertical axis represents the EGR rate equivalent value Qes0, but in the map of FIG. 28, the vertical axis represents the real EGR rate Megrd. The two maps differ only with regard to these parameters, and the characteristics of the target opening Rvnt obtained are identical whichever map is used.

In the aforesaid embodiments, the control unit 41, in addition to performing advance correction which compensates the response delay of the negative pressure control valve 5 and EGR valve 6 as in the prior art relative to the required EGR amount Mqec, also corrects for the delay corresponding to the time required for exhaust gas to reach the intake valve of the diesel engine 1 via the collector 3A from the EGR valve 6. Further, the EGR amount is varied as shown in FIGS. 66A and 66B by performing the aforesaid processing (A)–(E).

Figure 66A:
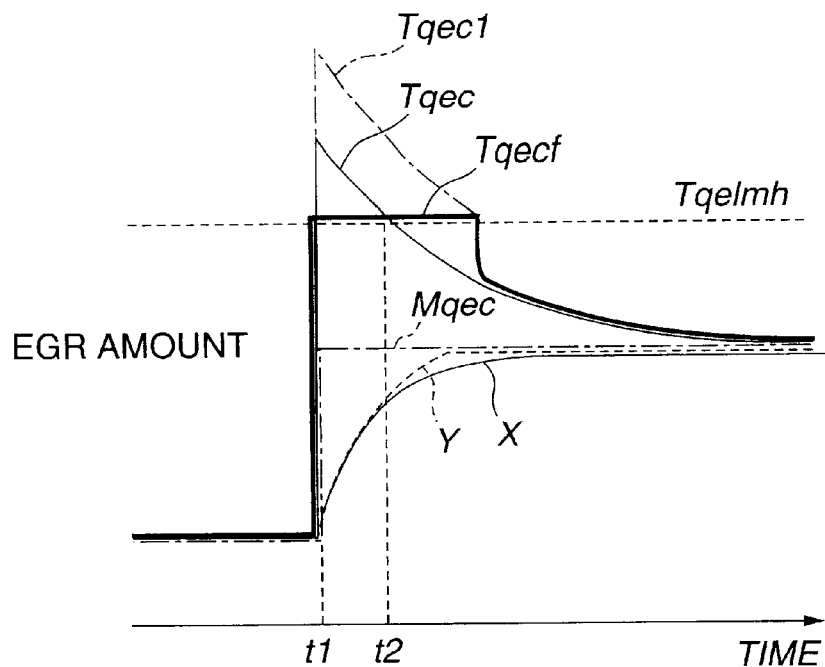
FIGS. 66A and 66B are diagrams describing a variation of an EGR amount under a control according to this invention when the diesel engine is in a transient state.
Figure 66B:
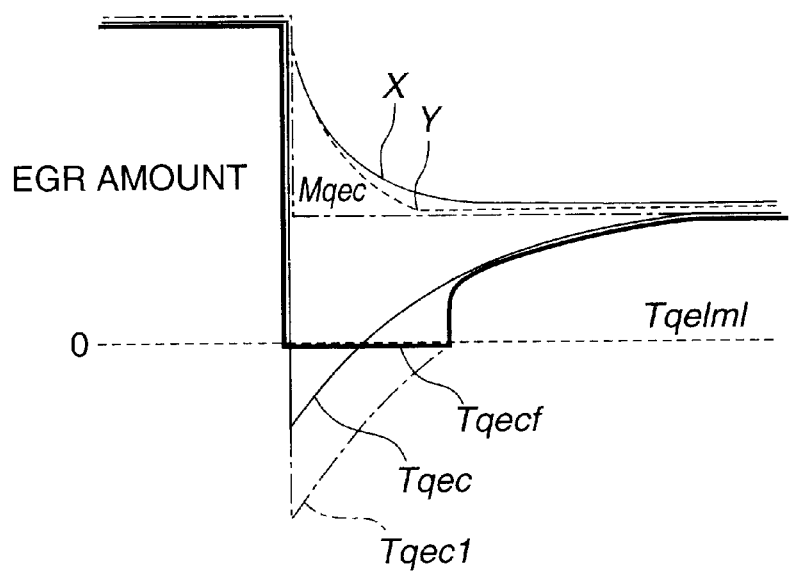

In these diagrams, FIG. 66A shows a variation of the EGR amount when the required EGR amount is increased in stepwise fashion, and FIG. 66B shows the variation of the EGR amount when the required EGR amount is decreased in stepwise fashion.

In FIG. 66A, when the required EGR amount Mqec is increased in stepwise fashion at a time t1, the target EGR amount Tqec corrected by the required EGR amount Mqec advance correction and delay correction, largely exceeds the physical upper limit Tqelmh. Consequently, the EGR amount does not exceed the physical upper limit Tqelmh even if a command signal corresponding to the target EGR amount Tqec is output to the negative pressure control valve 5.

Subsequently, the target EGR amount Tqec decreases with a first-order delay, and after a time t2, falls below the required EGR amount Mqec. As a result, when the command signal corresponding to the target EGR amount Tqec is output to the negative pressure control valve 5, the increase rate of a real EGR amount Qec after the time t2 decreases as shown by the curve X in the figure, and some time is required for the real EGR amount Qec to catch up with the required EGR amount Mqec.

On the other hand, in this control device, when the target EGR amount Tqec has exceeded the physical upper limit Tqelmh, a command signal corresponding to the added value obtained by adding the excess amount Dtqec to the target EGR amount Tqec, is output to the negative pressure control valve 5 on the next occasion the signal is output. As the added value Tqec1 exceeds the physical upper limit Tqelmh for a longer time than the target EGR amount Tqec, a command signal corresponding to the physical upper limit Tqelmh continues to be output to the negative pressure control valve 5 even after the time t2. Therefore, the increase rate Qec of the real EGR amount does not decrease even after the time t2, as shown by the curve Y in the figure, and the real EGR amount Qec rapidly converges to the target EGR amount Mqec. It may be noted that the region enclosed by the curves X and Y in the figure corresponds to the difference of EGR amount.

As shown in FIG. 66B, also in the case when the required EGR amount Mqec has decreased in stepwise fashion at the time t1, the ability of the real EGR amount Qec to follow the required EGR amount Mqec is likewise improved by outputting a command signal corresponding to the added value Tqec1 to the negative pressure control valve 5 instead of the target EGR amount Tqec.

In this control device, the physical upper limit Tqelmh is set according to the EGR valve flow velocity Cqe. The EGR valve flow velocity Cqe is a value corresponding to the pressure difference upstream and downstream of the EGR valve 6. When the vehicle is decelerating, the pressure difference upstream and downstream of the EGR valve 6 decreases as shown by the dotted line in FIG. 67C. Consequently, the EGR valve flow velocity Cqe also decreases. The value of the physical upper limit Tqelmh calculated by equation (28) when deceleration starts will be represented by a value A, and the value of the physical upper limit Tqelmh calculated by equation (28) when deceleration ends will be represented by a value B.

Here, three cases will be considered, i.e., a case (1) where the physical upper limit Tqelmh is fixed at the value A, a case (2) where the physical upper limit Tqelmh is fixed at the value B, and a case (3) where the physical upper limit Tqelmh is varied according to the EGR valve flow velocity Cqe. The case (3) corresponds to this invention. In all of these cases, the added value Tqec1 is calculated by respectively adding the excess amounts Dtqec to the physical upper limit Tqelmh.

Figure 67A:
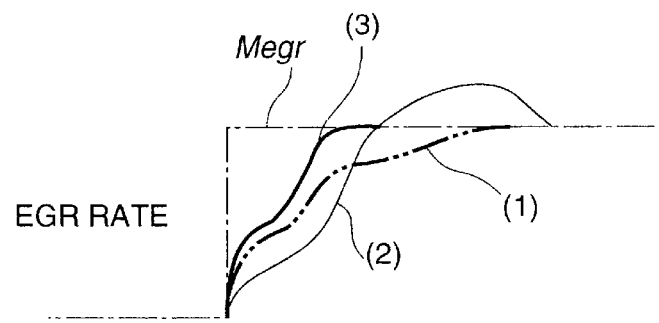
FIGS. 67A–67C are diagrams describing an EGR rate, EGR valve opening and a variation of a pressure difference before and after the EGR valve when a vehicle decelerates under the control according to this invention.
Figure 67B:
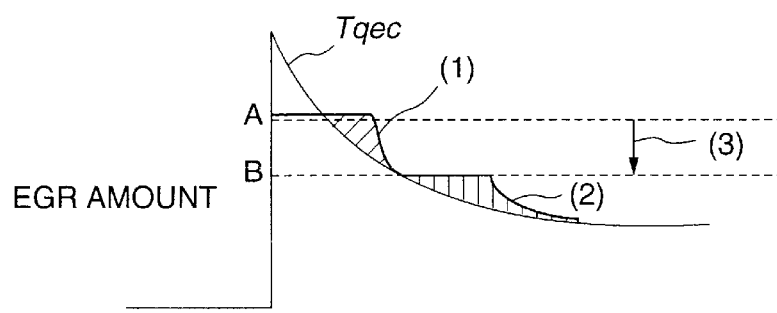
Figure 67C:
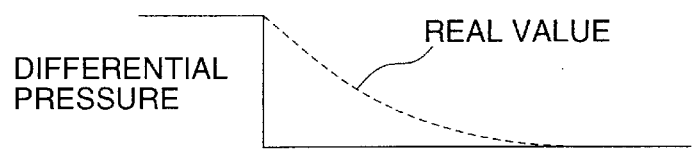

Referring to FIG. 67A, in case (1), as the physical upper limit Tqelmh is large, the ability of the real EGR rate to track the target EGR rate is good at the start of deceleration, but the added value Tqec1 soon falls below the physical upper limit Tqelmh. Subsequently, in the latter half of deceleration, as the excess amount Dtqec is not produced, the ability of the real EGR rate to track the target EGR rate decreases, and some time is required for the real EGR rate to converge to the target EGR rate.

In case (2), as the physical upper limit Tqelmh is small, the ability to track the target EGR rate is low at the start of deceleration. Also, the added value Tqec1 continues to exceed the physical upper limit Tqelmh for a long time, so the real EGR rate overshoots in the latter half of deceleration. As a result, the time required for the EGR rate to converge to the target EGR rate is effectively identical to that of case (1).

In case (3), as the physical upper limit Tqelmh is large at the start of deceleration, and the physical upper limit Tqelmh is small at the end of deceleration, good tracking characteristics are obtained at the start of the deceleration and at the end of deceleration, and the real EGR rate converges to the target EGR rate in a short time.

Figures 68A, 68B, 68C:
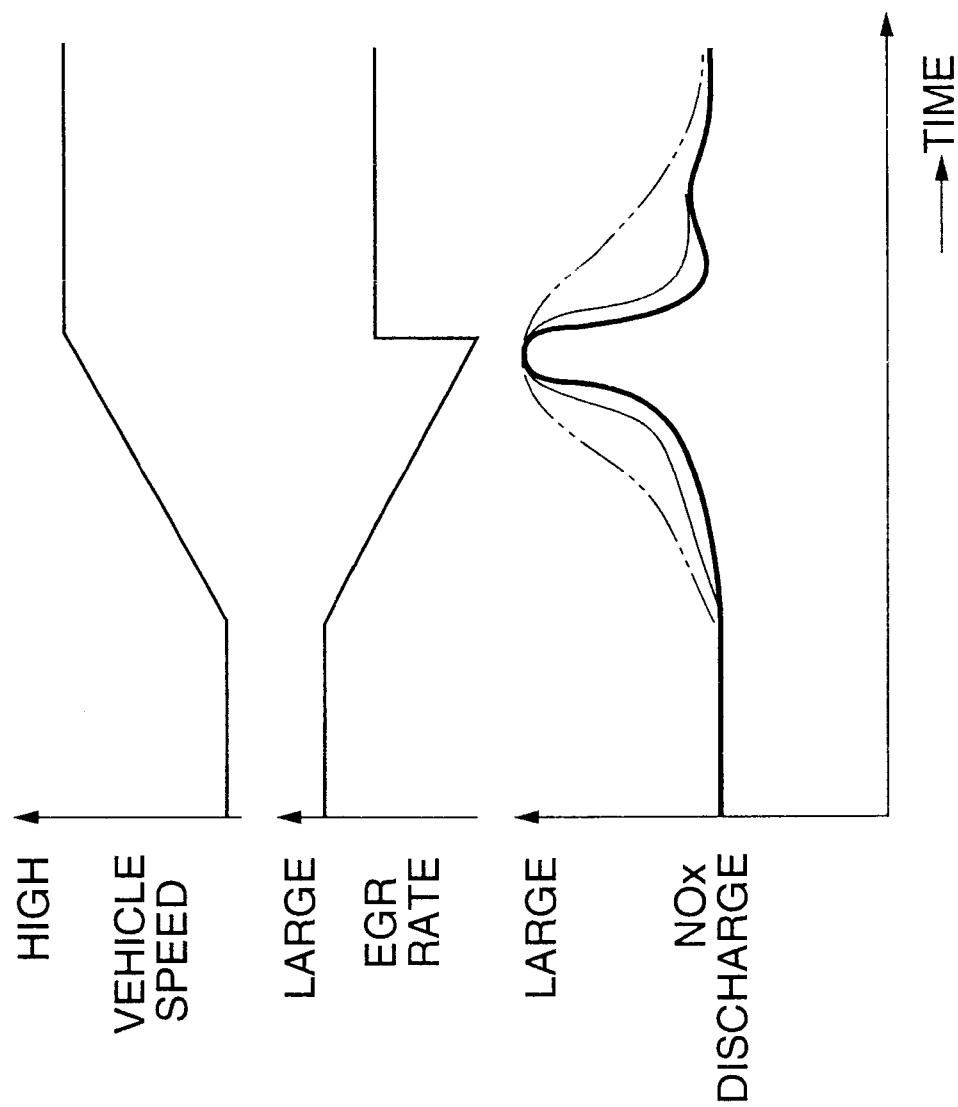
FIGS. 68A–68C are diagrams describing a vehicle speed change, a variation of the EGR rate and a nitrogen oxide (NOx) discharge amount, under the control according to this invention.

FIGS. 68A–68C show the relation between the variation of NOx discharge amount, the delay correction of the required EGR amount Mqec and the advance correction during acceleration in the case where smoke or particulate matter (PM) is at the same level. During acceleration, as the engine rotation speed Ne and engine load Qsol both increase, the EGR rate decreases as shown in the map of FIG. 12. When acceleration has finished, the engine rotation speed and engine load Qsol both decrease while the vehicle speed remains constant. Consequently, the EGR rate shown in FIG. 68B increases in stepwise fashion, and the NOx discharge amount increases at this time as shown in FIG. 68C.

The dot-and-dash line of FIG. 68C shows the case where the target EGR amount Tqec per cylinder is determined by adding only the delay correction of the step S24 of FIG. 7 to the required EGR amount Mqec, and the thin line shows the case where the target EGR amount Tqec per cylinder is determined by adding both the delay correction of the step S24 and the advance correction of the step S25 of FIG. 7 to the required EGR amount Mqec. In both cases, limiting processing is not performed on the target EGR amount Tqec. The bold line in the figure shows the NOx discharge amount under the control of this invention. As shown in the figure, by providing a variable physical limit, the NOx discharge amount can be reduced.

The EGR flow velocity Cqe used in the determination of the physical upper limit Tqelmh is a value which is not affected by the engine running states, i.e., steady state or transient state. Therefore, by setting the physical upper limit Tqelmh according to the EGR flow velocity Cqe, the delay in the control of the EGR amount in a transient state is eliminated, and the ability to converge to the target value of the EGR amount is enhanced.

In the aforesaid embodiments, the EGR flow velocity Cqe is predicted and the EGR valve 6 is controlled based on this predicted value, however the pressure difference upstream and downstream of the EGR valve 6 which has a correlation with the EGR flow velocity Cqe may also be predicted, and the EGR valve 6 controlled based on this pressure difference.

Figure 69:
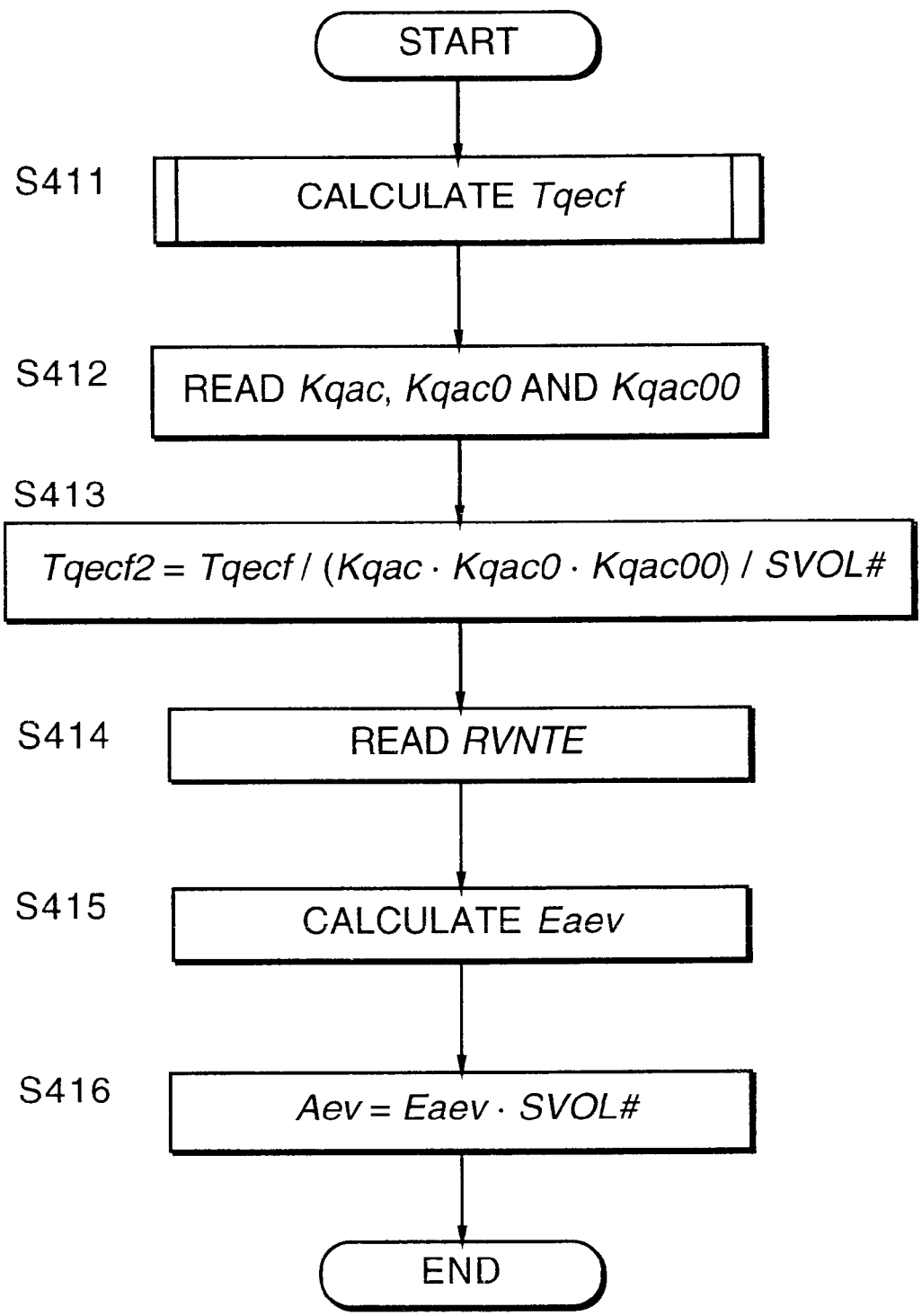
FIG. 69 is a flowchart describing a routine for calculating an EGR valve opening area Aev according to a third embodiment of this invention.

Next, a third embodiment of this invention will be described referring to FIGS. 69–76. FIG. 69 shows a routine for calculating the EGR valve opening area Aev used instead of the routine of FIG. 5 of the aforesaid first and second embodiments. This routine is also performed in synchronism with the REF signal as in the case of the routine of FIG. 5.

In the aforesaid first and second embodiments, the EGR valve opening area Aev is calculated based on the target EGR amount Tqek of the EGR valve 6, but in this embodiment, the target EGR valve opening area Aev is calculated from the target opening Rvnt and the limited target EGR amount Tqecf per cylinder.

Figure 70:
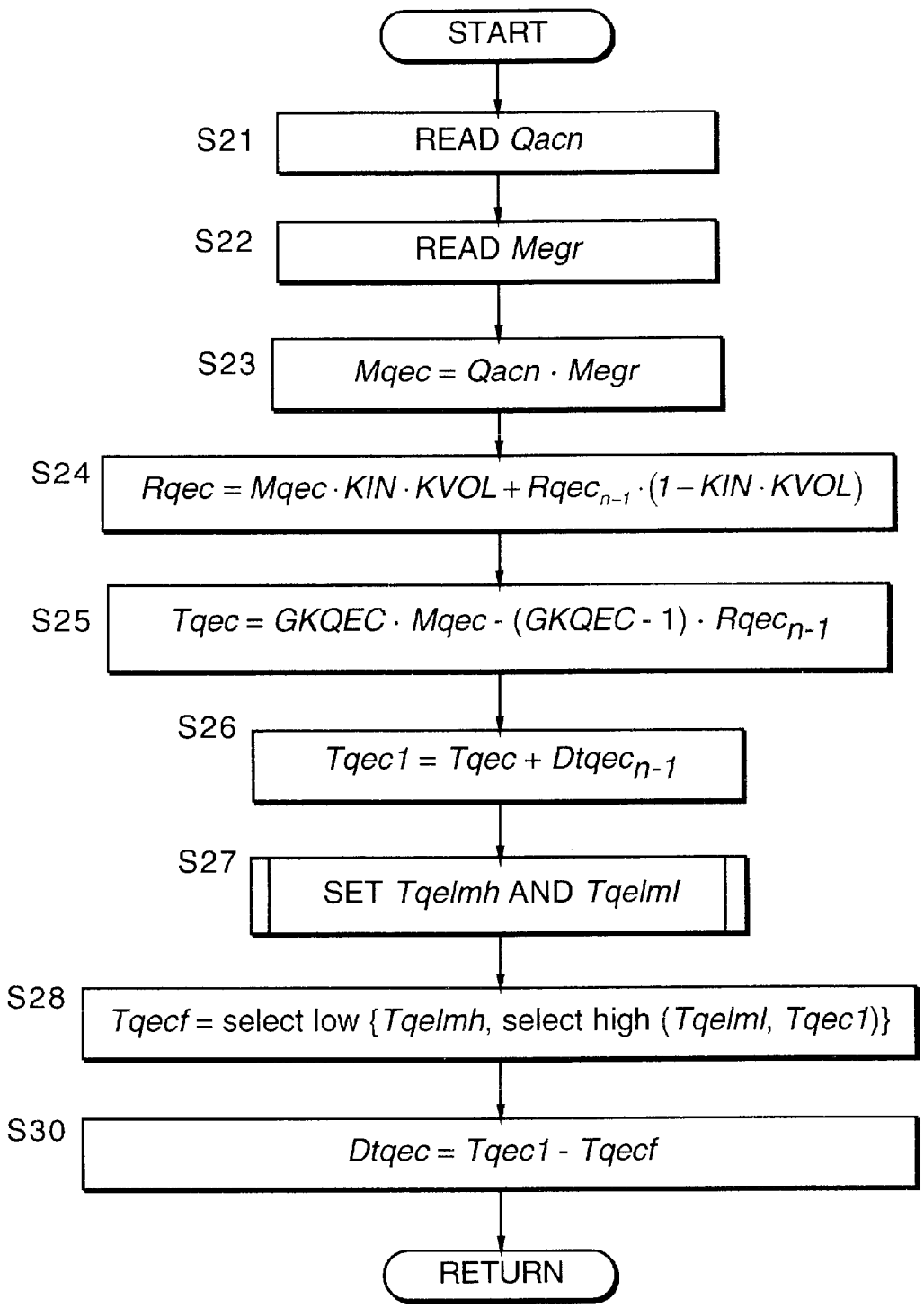
FIG. 70 is a flowchart describing a routine for calculating a limited target EGR amount Tqecf per cylinder according to the third embodiment of this invention.

In a step S411 of FIG. 69, the limited target EGR amount Tqecf per cylinder is computed using the subroutine of FIG. 70. FIG. 70 is the same as the routine of FIG. 7 without the step S29. The setting of the physical upper limit Tqelmh and physical lower limit Tqelmh performed in a step S27 of FIG. 70, is performed by the subroutine shown in FIG. 71.

Figure 71:
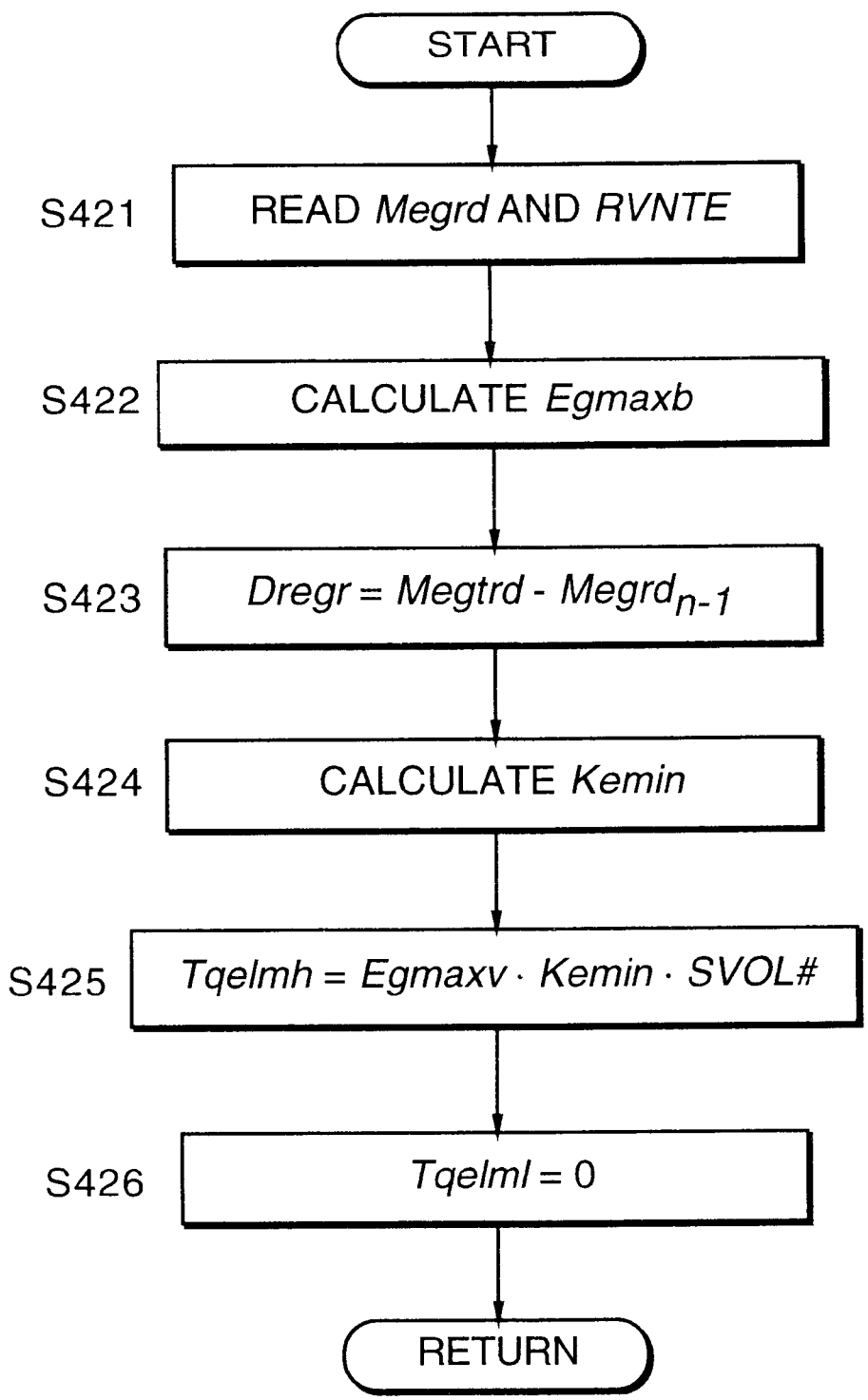
FIG. 71 is a flowchart describing a routine for setting a physical limiter according to the third embodiment of this invention.

Referring to FIG. 71, firstly in a step S421, the control unit 41 reads a delay processing value RVNTE of the real EGR rate Megrd and target opening Rvnt.

Figure 72:
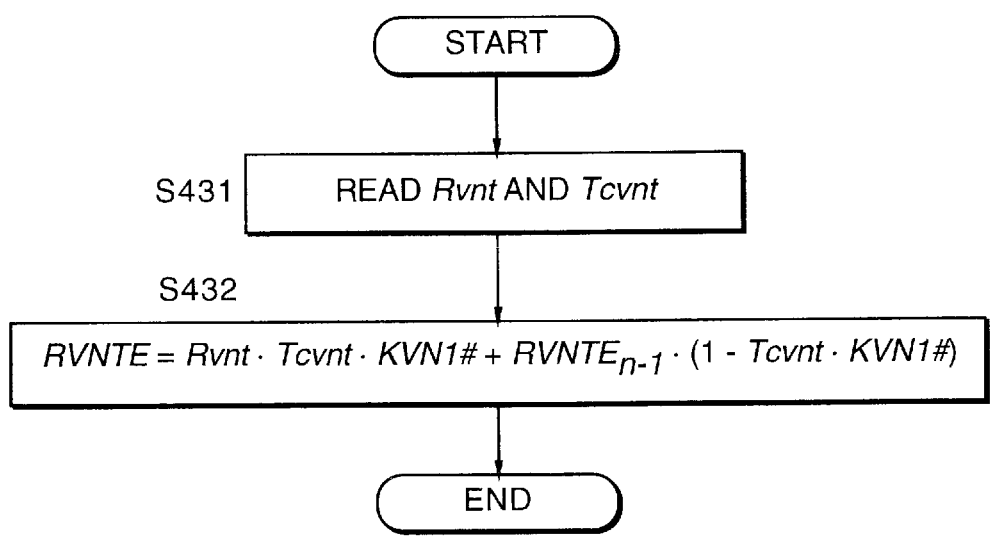
FIG. 72 is a flowchart describing a routine for calculating a delay processing value RVNTE according to the third embodiment of this invention.

Here, the delay processing value RVNTE is a value calculated by an independent routine shown in FIG. 72. This routine is performed in synchronism with the REF signal.

Referring to FIG. 72, firstly in a step S431, the control unit 41 reads the target opening Rvnt and an advance correction time constant equivalent value Tcvnt set in the step S144 of the subroutine of FIG. 29 to control the excess pressure. The advance correction time constant equivalent value Tcvnt is a value for compensating an operating delay of a variable nozzle 53, as described above.

In a next step S432, the delay processing value RVNTE is calculated by the following equation (30) from the target opening Rvnt and advance correction time constant equivalent value Tcvnt, and the routine is terminated.

$$RVNTE = Rvnt \cdot Tcvnt \cdot KVN1\# + RVNTE_{n-1} \cdot (1 - Tcvnt \cdot KVN1\#) \quad (30)$$

where,

KVN1#=constant, and $RVNTE_{n-1}$=RVNTE calculated on the immediately preceding occasion the subroutine was executed.

The delay processing value RVNTE calculated in equation (30) shows the real opening of the variable nozzle 53 based on the output of a duty signal to a pressure control valve 56 by the control unit 41.

Figure 73:
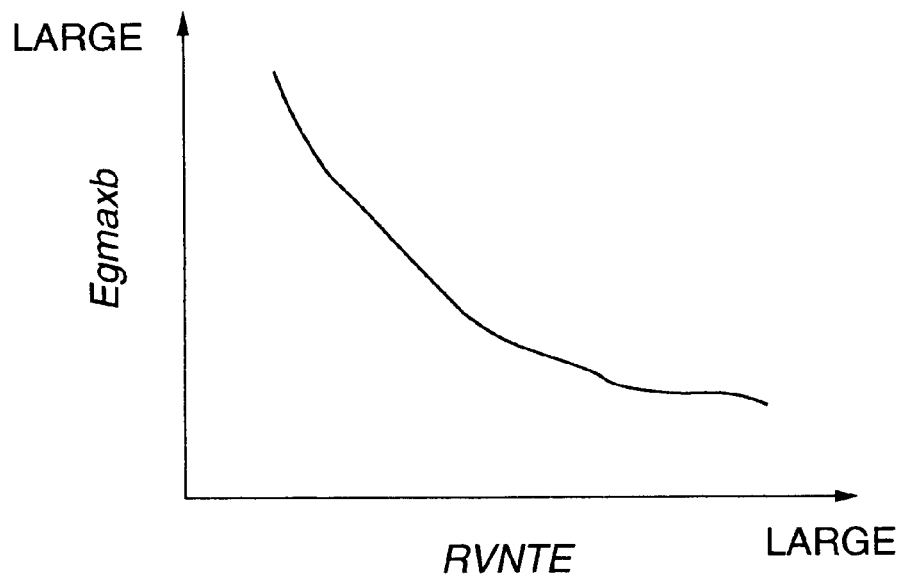
FIG. 73 is a diagram describing the contents of a map of a maximum flowrate basic value Egmaxb according to the third embodiment of this invention.

After the delay processing value RVNTE calculated by the routine of FIG. 72 is read, in a step S422 of FIG. 71, the control unit 41 calculates a maximum EGR flowrate basic value Eqmaxb per unit displacement by looking up a map shown in FIG. 73 based on the delay processing value RVNTE. This map is previously stored in the memory of the control unit 41. Here, the maximum EGR flowrate basic value Eqmaxb per unit displacement is set to give a larger value the smaller the delay processing value RVNTE of the target opening. This is because when the opening of the nozzle 53 is reduced and the turbocharging pressure is increased, the pressure difference upstream and downstream of the EGR valve 6 increases, and the maximum flowrate flowing through the EGR valve 6 increases.

In a following step S243, a variation amount Dregr of the real EGR rate Megrd is calculated by the following equation (31).

$$Dregr = Megrd - Megrd_{n-1} \quad (31)$$

where, Megrd=Megrd calculated on the immediately preceding occasion the subroutine was executed.

Figure 74:
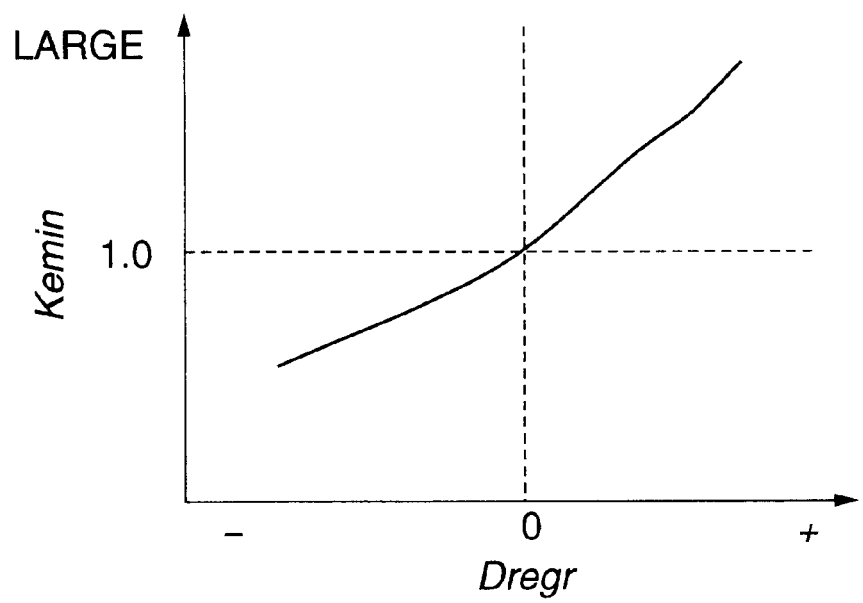
FIG. 74 is a diagram describing the contents of a map of a maximum flowrate correction coefficient Kemin according to the third embodiment of this invention.

In a next step S424, a maximum EGR flowrate correction Kemin is calculated referring to the map shown in FIG. 74, based on the variation amount Dregr.

In a step S425, the maximum EGR amount per cylinder is calculated by the following equation (32) from the correction coefficient Kemin and maximum EGR flowrate basic value Eqmaxb.

$$Tqelmh = Egmaxb \cdot Kemin \cdot SVOL\#. \quad (32)$$

where, SVOL#=displacement of diesel engine 1.

As shown in FIG. 74, when the EGR rate is increasing, i.e., when Dregr>0, the maximum flowrate correction coefficient Kemin is a value larger than 1.0. Conversely, when the EGR rate is decreasing, i.e., when Dregr<0, it is a positive value less than 1.0. According to equation (32), the physical upper limit increases according to the increase of EGR rate, and this is due to the following reason. When the EGR rate is increasing, the pressure difference upstream and downstream of the EGR valve 6 varies in the decreasing direction. The pressure difference gradually decreases as shown by the dotted line in FIG. 67C, and in this gradually decreasing interval, it exceeds the pressure difference in the steady state, i.e. as shown by the solid line in the figure. In other words, in this interval, more EGR can be performed than in the steady state. The reason why the physical upper limit is increased according to the increase of EGR rate, is to have this phenomenon reflected in actual behavior. Conversely, when the EGR rate decreases, the pressure different upstream and downstream of the EGR valve 6 varies in the increasing direction, but as this pressure difference gradually increases without varying in a stepwise fashion, in the gradually increasing interval, it is less than the pressure difference in the steady state. This is the reason why the physical upper limit decreases according to the decrease of EGR rate in equation (32).

In a final step S426, the physical lower limit Tqelml is set to 0 and the subroutine is terminated.

After the subroutine of FIG. 71 has terminated, in a step S28 of FIG. 70, the control unit 41 calculates the limited target EGR amount Tqecf per cylinder in the same way as in the aforesaid first embodiment. Also, in a step S30, the excess/deficiency amount Dtqec is calculated and the subroutine of FIG. 70 is terminated.

After these subroutines have ended, in a step S412 of FIG. 69, the control unit 41 reads the EGR amount feedback correction coefficient Kqac00, the EGR flow velocity feedback correction coefficient Kqac0 and the EGR flow velocity learning correction coefficient Kqac. These are values calculated by the subroutine of FIG. 50 of the first embodiment.

In a step S413, a limited target EGR amount Tqecf2 per unit discharge amount is calculated by equation (33).

$$Tqecf2 = Tqecf/(Kqac \cdot Kqac0 - Kqac00)/SVOL\# \quad (33)$$

where, SVOL#=displacement of diesel engine 1.

In a step S414, the delay processing value RVNTE of the target opening calculated in the routine of FIG. 72, is read.

Figure 75:
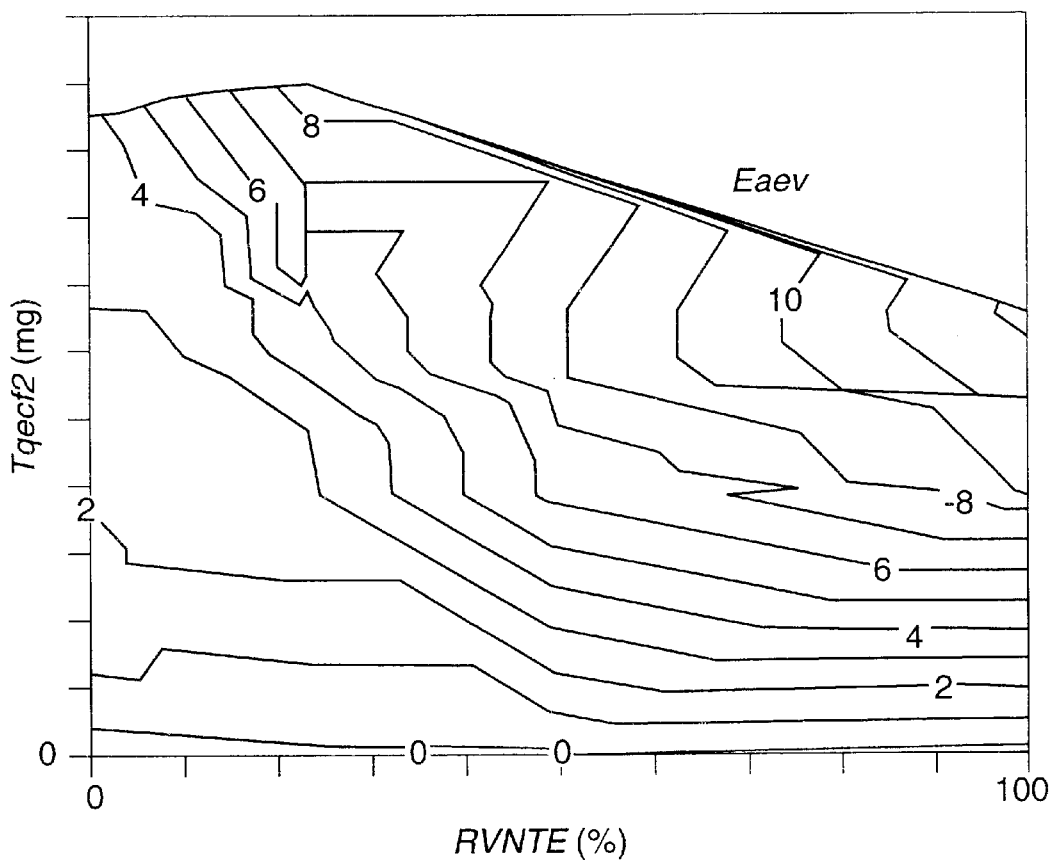
FIG. 75 is a diagram describing the contents of a map of an experimental value of an EGR valve opening area Eaev per unit displacement according to the third embodiment of this invention.

In a step S415, the target EGR valve opening area Eaev per unit discharge amount is calculated by looking up a map shown in FIG. 75, based on the limited target EGR amount Tqecf2 per unit discharge amount and the delay processing value RVNTE of the target opening. This map is previously stored in the memory of the control unit 41.

In the map of FIG. 75, the delay processing value RVNTE which is the horizontal axis, may be considered to be approximately equal to the differential pressure upstream and downstream of the EGR valve 6. For example, providing that the opening of the EGR valve 6 is set constant, the smaller the delay processing value RVNTE, the larger the opening of the variable nozzle 53 and the higher the turbocharging pressure. Consequently, the differential pressure upstream and downstream of the EGR valve 6 becomes large. Conversely, the larger the delay processing value RVNTE, the larger the opening of the variable nozzle 53 and the lower the turbocharging pressure. Consequently, the differential pressure upstream and downstream of the EGR valve 6 decreases.

Thus, the delay processing value RVNTE which is the horizontal axis may be considered to represent the differential pressure upstream and downstream of the EGR valve 6. By taking the EGR amount as the vertical axis, the opening of the EGR valve 6 can be specified with these parameters as can be understood from the map of FIG. 75.

The figures in FIG. 75 are temporary value assigned to show the relative magnitude of the opening of the EGR valve 6.

Figure 76:
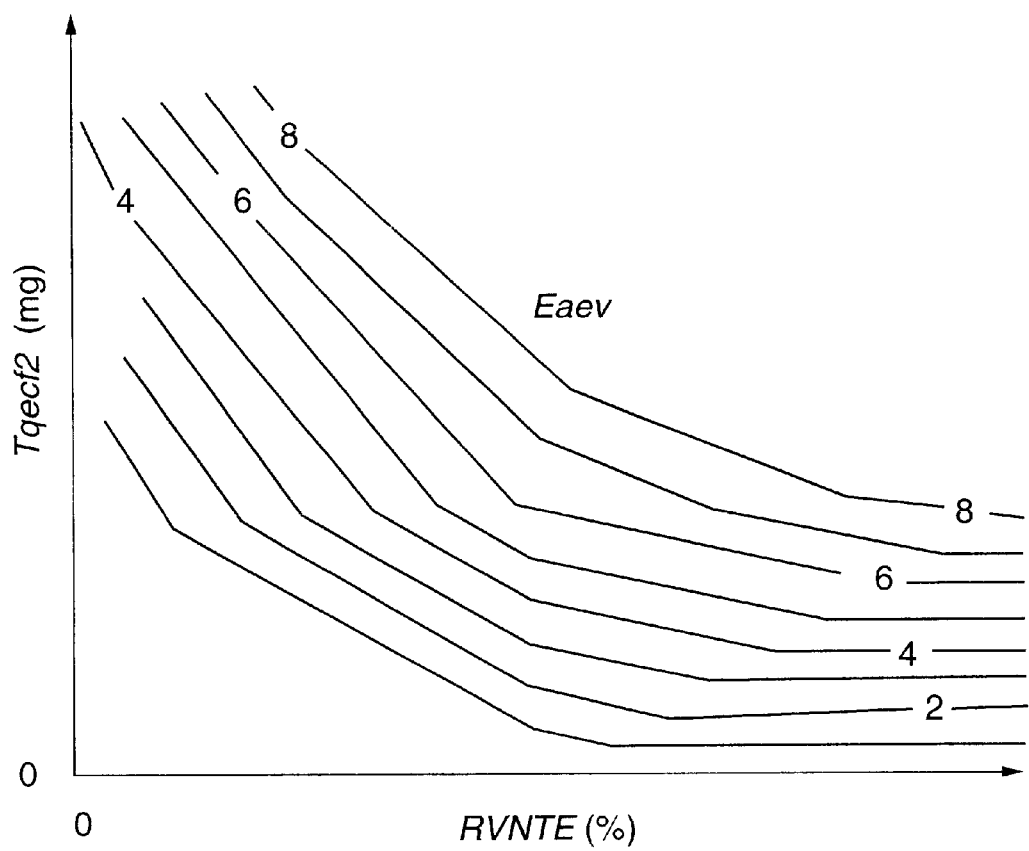
FIG. 76 is similar to FIG. 75, but showing a theoretical value.

The inventors obtained the map of FIG. 75 by experiment, but the EGR valve opening area Aev may also be determined using a theoretically defined map as shown in FIG. 76.

In FIG. 75 and FIG. 76, the characteristics largely differ in the region of the right-hand side of the map, but as control is not actually performed in this region, there is no effect on the control whichever map is used.

What is read from these maps is not the opening area of the EGR valve 6, but the target EGR valve opening area Eaev per unit piston displacement. This is in order to be able to apply the map without depending on the displacement of the diesel engine 1.

After the control unit 41 calculates the target EGR valve opening area Eaev per unit displacement volume in the step S415 of FIG. 69, the target EGR valve opening area Aev is calculated by multiplying Eaev by the displacement SLOV# of the diesel engine 1 in a step S416, and the routine of FIG. 69 is terminated.

The target EGR valve opening area Aev obtained by the routine of FIG. 69 is converted for example to a lift amount or a drive signal of the EGR valve 6 using a map of FIG. 6. The control unit 41 controls the opening of the EGR valve 6 to the target EGR valve opening area Aev by outputting a corresponding duty signal to the pressure control valve 5 which drives the EGR valve 6.

According to this embodiment, the physical upper limit Tqelmh is calculated based on the delay processing value RVNTE of the target opening, i.e. on the target value of turbocharging pressure control, so the physical upper limit varies according to the operating state of the turbocharger 50. Therefore, in this embodiment also, the EGR control delay during transient conditions is eliminated, and the ability to track the target value of the EGR amount is enhanced as in the first and second embodiments.

The vertical axis in the map of FIG. 75 shows the target EGR rate Tqecf2 per unit displacement, but the target EGR amount Tqek per unit time converted by the following equation (34) may also be used as the vertical axis.

$$Tqek = Tqecf \cdot (Ne/KCON\#)/(Kqac \cdot Kqac0 - Kqac00)/SVOL\# \quad (34)$$

where,

KCON#=constant,

Kqac00=EGR amount feedback correction coefficient,

Kqac0=EGR flow velocity feedback correction coefficient,

Kqac=EGR flow velocity learning correction coefficient, and

SVOL#=discharge of diesel engine 1.

According to experimental results obtained by the Inventors, when the value per unit time is used as the vertical axis, the characteristics of the map are more complex than when the value per unit displacement is used as the vertical axis. Therefore, it is desirable to use the value per unit displacement as the vertical axis.

In FIG. 75, the target opening Rvnt may be used instead of the delay processing value RVNTE on the horizontal axis.

In the above embodiments, the target opening Rvnt was used as the operating target value of the turbocharger 50. The target opening Rvnt represents a ratio of the opening area with respect to the full open area. It is however possible to use the target opening area of the variable nozzle 53 instead of the target opening Rvnt.

In the above embodiments, a delay processing and advance processing were added to the required EGR amount Mqec, but only the delay processing may be applied.

In the above embodiments, the physical upper limit Tqelmh was set to a variable value, the physical lower limit Tqelml was set to a fixed value, and the excess/deficiency Dtqec was added to the target EGR amount Tqec.

However, various variations can be made to this point. Specifically, both the physical upper limit Tqelmh and physical lower limit Tqelml may be set to fixed values, and the excess/deficiency amount Dtqec added to the target EGR amount Tqec.

It should be understood that the purpose of adding the excess/deficiency amount Dtqec to the target EGR amount Tqec is to maintain the opening of the EGR valve 6 at the opening corresponding to the physical upper limit Tqelmh for a while after the target EGR amount Tqec has fallen below the physical upper limit Tqelmh. It is also possible to directly control the EGR valve 6 to keep the opening corresponding to the physical upper limit Tqelmh for a predetermined time after the target EGR amount Tqec has fallen below the physical upper limit Tqelmh without adding the excess/deficiency amount Dtqec to the target EGR amount Tqec.

The above embodiments describe the application of this invention to a diesel engine running by low temperature pre-mixture combustion wherein the heat generation pattern is that of single stage combustion, but the invention may also be applied to an ordinary diesel engine which performs diffusion combustion after pre-mixture combustion.

Industrial Field of Application

As described above, this invention eliminates the delay of EGR control due to the time required for exhaust gas to flow from the EGR valve to the cylinder of the engine and improves the response of the EGR amount to track the target value. Thus this invention improves the exhaust emission of the diesel engine of an automobile.

What is claimed is:

1. A control device for an engine (1), the engine comprising a combustion chamber (1A), an intake passage (3) which aspirates air into the combustion chamber (3A), an exhaust passage (2) which discharges exhaust gas from the combustion chamber (3A), and an exhaust gas recirculation valve (6) which recirculates part of the exhaust gas of the exhaust passage (2) into the combustion chamber (1A), the device comprising:

a sensor (34, 39) which detects a running condition of the engine (1); and a microprocessor (41) programmed to:
set a target exhaust gas recirculation amount based on the running condition (S25, S26);
determine a maximum recirculation amount of the exhaust gas recirculation valve (6) (S27);
compare the target exhaust gas recirculation amount with the maximum recirculation amount (S28);
limit the target exhaust gas recirculation amount to be equal to the maximum recirculation amount when the target exhaust gas recirculation amount exceeds the maximum recirculation amount (S28);
control the opening of the exhaust gas recirculation valve (6) based on the target exhaust gas recirculation amount (S29); and
maintain the opening of the exhaust gas recirculation valve (6) at an opening corresponding to the maximum recirculation amount for a predetermined time after the target exhaust gas recirculation amount has fallen below the maximum recirculation amount (S26).

2. The control device as defined in claim 1, wherein the microprocessor (41) is further programmed to periodically control the opening of the exhaust gas recirculation valve (6) and maintain the opening of the exhaust gas recirculation valve (6) at the opening corresponding to the maximum recirculation amount for the predetermined time after the target exhaust gas recirculation amount has fallen below the maximum recirculation amount by the following process:

set the target exhaust gas recirculation amount based on the running condition on each control occasion (S25, S26);
calculate a difference between the target exhaust gas recirculation amount and the maximum recirculation amount as an excess amount when the target exhaust gas recirculation amount is larger than the maximum recirculation amount (S30); and
modify, on a next control occasion, the target exhaust gas recirculation amount by adding the excess amount to the target exhaust gas recirculation amount.

3. The control device as defined in claim 1, wherein the microprocessor (41) is further programmed to vary the maximum recirculation amount based on the running condition (S402, S425).

4. The control device as defined in claim 1, wherein the microprocessor (41) is further programmed to calculate a target exhaust gas recirculation rate based on the running condition (S22), estimate a real exhaust gas recirculation amount from the target exhaust gas recirculation rate and running condition (S113), calculate a flow velocity of the exhaust gas recirculation valve from the real exhaust recirculation amount and the target exhaust gas recirculation rate (S368), calculate a required exhaust gas recirculation amount from the running condition and the target exhaust recirculation rate (S23), calculate a delay processing value obtained by adding a delay processing corresponding to the response delay of the exhaust gas recirculation valve (6) to the required exhaust gas recirculation amount (S24), calculate the target exhaust gas recirculation amount obtained by adding advance processing corresponding to an exhaust gas arrival time from the exhaust gas recirculation valve (6) to the combustion chamber (1A), to the delay processing value (S25), determine the target valve opening of the exhaust gas recirculation valve (6) based on the target exhaust gas recirculation amount and the velocity (S13), and control the exhaust recirculation valve (6) according to the target valve opening (S13).

5. The control device as defined in claim 1, wherein the sensor (34, 39) which detects the running condition comprises a sensor (34) which detects a rotation speed of the engine (1), and a sensor (39) which detects an intake air amount of the intake passage (3).

6. A control device as defined in claim 1, wherein the microprocessor (41) is further programmed to determine a minimum recirculation amount of the exhaust gas recirculation valve (6) (S27), compare the target exhaust gas recirculation amount with the minimum recirculation amount (S28), limit the target exhaust gas recirculation amount to the minimum flowrate when the target exhaust gas recirculation amount is less than the minimum recirculation amount (S28), control the opening of the exhaust gas recirculation valve (6) based on the target exhaust gas recirculation amount (S29), and maintain the opening of the exhaust gas recirculation valve (6) at an opening corresponding to the minimum recirculation amount for a predetermined time after the target exhaust gas recirculation amount has become larger than the minimum flowrate (S26).

7. The control device as defined in claim 1, wherein the microprocessor (41) is further programmed to set the maximum recirculation amount to be larger as the target exhaust gas recirculation amount increases (S410, S27).

8. The control device as defined in claim 7, wherein the microprocessor (41) is further programmed to calculate the flow velocity of the exhaust gas recirculation valve (6) based on the running condition (S401), and the maximum recirculation amount is determined based on the flow velocity of the exhaust gas recirculation valve (6) (S27).

9. The control device as defined in claim 1, wherein the engine (1) comprises a diesel engine (1) comprising a turbocharger (50) which turbocharges the intake air of the intake passage (3) according to a pressure of the exhaust gas in the exhaust passage, and the microprocessor (41) is further programmed to calculate an operating target value of the turbocharger (50) based on the running condition (S124), and control the turbocharger (50) based on the operating target value (S75–S78).

10. The control device as defined in claim 9, wherein the microprocessor (41) is further programmed to determine the maximum recirculation amount based on the operating target value (S422, S425).

11. The control device as defined in claim 9, wherein the turbocharger (50) comprises an exhaust gas turbine (52) provided in the exhaust passage (2), a compressor (55) provided in the intake passage (3) for turbocharging intake air according to a rotation of the exhaust gas turbine (52), and a variable nozzle (53) which has a variable opening to adjust a cross-sectional area of the exhaust gas flowing into the exhaust gas turbine (52), the operating target value is the target opening of the variable nozzle (53), and the microprocessor (41) is further programmed to set the maximum recirculation amount to a larger value the larger the target opening of the variable nozzle (S416).

12. A control device for an engine (1), the engine comprising a combustion chamber (1A), an intake passage (3) which aspirates air into the combustion chamber (3A), an exhaust passage (2) which discharges exhaust gas from the combustion chamber (3A), and an exhaust gas recirculation valve (6) which recirculates part of the exhaust gas of the exhaust passage (2) into the combustion chamber (1A), the device comprising:

means (34, 39) for detecting a running condition of the engine (1);

means (41, S25, S26) for setting a target exhaust gas recirculation amount based on the running condition;

means (41, S27) for determining a maximum recirculation amount of the exhaust gas recirculation valve (6);

means for (41, S28) for comparing the target exhaust gas recirculation amount with the maximum recirculation amount;

means (41, S28) for limiting the target exhaust gas recirculation amount to be equal to the maximum recirculation amount when the target exhaust gas recirculation amount exceeds the maximum recirculation amount;

means (41, S29) for controlling the opening of the exhaust gas recirculation valve (6) based on the target exhaust gas recirculation amount; and means (41, S26) for maintaining the opening of the exhaust gas recirculation valve (6) at an opening corresponding to the maximum recirculation amount for a predetermined time after the target exhaust gas recirculation amount has fallen below the maximum recirculation amount.

13. A control method for an engine (1), the engine comprising a combustion chamber (1A), an intake passage (3) which aspirates air into the combustion chamber (3A), an exhaust passage (2) which discharges exhaust gas from the combustion chamber (3A), and an exhaust gas recirculation valve (6) which recirculates part of the exhaust gas of the exhaust passage (2) into the combustion chamber (1A), the method comprising:

detecting a running condition of the engine (1);

setting a target exhaust gas recirculation amount based on the running condition;

determining a maximum recirculation amount of the exhaust gas recirculation valve (6);

comparing the target exhaust gas recirculation amount with the maximum recirculation amount;

limiting the target exhaust gas recirculation amount to be equal to the maximum recirculation amount when the target exhaust gas recirculation amount exceeds the maximum recirculation amount;

controlling the opening of the exhaust gas recirculation valve (6) based on the target exhaust gas recirculation amount; and maintaining the opening of the exhaust gas recirculation valve (6) at an opening corresponding to the maximum recirculation amount for a predetermined time after the target exhaust gas recirculation amount has fallen below the maximum recirculation amount.

* * * * *